United States Patent
Hata et al.

(10) Patent No.: US 9,134,189 B2
(45) Date of Patent: Sep. 15, 2015

(54) DYNAMIC QUANTITY SENSOR AND DYNAMIC QUANTITY SENSOR SYSTEM

(71) Applicants: Toyota Jidosha Kabushiki Kaisha, Toyota-shi Aichi-ken (JP); Kabushiki Kaisha Toyota Chuo Kenkyusho, Nagakute-Shi, Aichi-ken (JP); Tohoku University, Aoba-Ku, Sendai-shi, Miyagi-ken (JP)

(72) Inventors: Yoshiyuki Hata, Nagoya (JP); Yutaka Nonomura, Nagoya (JP); Motohiro Fujiyoshi, Seto (JP); Hirofumi Funabashi, Nagoya (JP); Teruhisa Akashi, Nagoya (JP); Yoshiteru Omura, Seto (JP); Takahiro Nakayama, Nagoya (JP); Ui Yamaguchi, Toyoto (JP); Hitoshi Yamada, Nagakute (JP); Shuji Tanaka, Sendai (JP); Masayoshi Esashi, Sendai (JP); Masanori Muroyama, Sendai (JP); Mitsutoshi Makihata, Sendai (JP)

(73) Assignees: Toyota Jidosha Kabushiki Kaisha, Toyota-shi (JP); Kabushiki Kaisha Toyota Chuo Kenkyusho, Nagakute-shi (JP); Tohoku University, Sendai-shi (JP)

( * ) Notice: Subject to any disclaimer, the term of this patent is extended or adjusted under 35 U.S.C. 154(b) by 94 days.

(21) Appl. No.: 14/081,732

(22) Filed: Nov. 15, 2013

(65) Prior Publication Data

US 2014/0137670 A1 May 22, 2014

(30) Foreign Application Priority Data

Nov. 16, 2012 (JP) .................................. 2012-252600
May 23, 2013 (JP) .................................. 2013-109119

(51) Int. Cl.
  *G01L 1/04* (2006.01)
  *G01L 1/14* (2006.01)
  (Continued)

(52) U.S. Cl.
  CPC ................ *G01L 1/144* (2013.01); *G01L 1/148* (2013.01); *G01P 15/125* (2013.01); *G01P 15/18* (2013.01); *G01P 2015/084* (2013.01)

(58) Field of Classification Search
  CPC ................ G01P 15/18; G01P 15/0802; B81B 2201/0235; G01L 1/144
  USPC ................ 73/777, 862.381, 862.621, 862.625
  See application file for complete search history.

(56) References Cited

U.S. PATENT DOCUMENTS 5,656,781 A 8/1997 Kankkunen
2004/0025591 A1 2/2004 Yoshikawa et al.
(Continued)

FOREIGN PATENT DOCUMENTS

JP 7-55617 3/1995
JP 2002-174640 A 6/2002
(Continued)

OTHER PUBLICATIONS

Y. Hirata et al., "Improvement of the Collision Velocity Detection by the New Z-Axis Accelerometer with Mechanical Displacement Conversion Mechanism Using Damping Effect" IEEJ Transactions on Sensors and Micromachines, vol. 132, No. 9, pp. 296-302. Sep. 1, 2012.

*Primary Examiner* — Max Noori
(74) *Attorney, Agent, or Firm* — Gifford, Krass, Sprinkle, Anderson & Citkowski, P.C.

(57) ABSTRACT

A dynamic quantity sensor includes a force receiving portion, a first movable portion that rotates in a first rotational direction around a first rotational axis according to dynamic quantity in a first direction that the force receiving portion receives, and rotates in the first rotational direction around the first rotational axis according to dynamic quantity in a second direction different from the first direction that the force receiving portion receives; and a second movable portion that rotates in a second rotational direction around a second rotational axis according to the dynamic quantity in the first direction that the force receiving portion receives, and rotates in an opposite direction to the second rotational direction around the second rotational axis according to the dynamic quantity in the second direction that the force receiving portion receives.

24 Claims, 46 Drawing Sheets

(51) Int. Cl.
*G01P 15/125* (2006.01)
*G01P 15/18* (2013.01)
*G01P 15/08* (2006.01)

(56) References Cited

U.S. PATENT DOCUMENTS

| | | | |
|---|---|---|---|
| 2004/0079154 A1 | 4/2004 | Yoshikawa et al. | |
| 2007/0034007 A1* | 2/2007 | Acar | 73/514.01 |
| 2008/0110260 A1 | 5/2008 | Konno et al. | |
| 2008/0184819 A1 | 8/2008 | Morimoto | |
| 2010/0199783 A1 | 8/2010 | Sakurai | |
| 2010/0242600 A1* | 9/2010 | Lin et al. | 73/504.12 |
| 2012/0017678 A1* | 1/2012 | Rocchi | 73/504.12 |
| 2012/0111703 A1* | 5/2012 | Kwa | 200/61.53 |
| 2013/0042684 A1 | 2/2013 | Yoda | |

FOREIGN PATENT DOCUMENTS

| | | |
|---|---|---|
| JP | 2004061280 A | 2/2004 |
| JP | 3966223 B2 | 8/2007 |
| JP | 2008-096229 A | 4/2008 |
| JP | 2008139282 A | 6/2008 |
| JP | 2009-097918 A | 5/2009 |
| JP | 2010-185725 A | 8/2010 |
| JP | 2010-204069 A | 9/2010 |
| JP | 2011141186 A | 7/2011 |
| JP | 2012-117971 A | 6/2012 |
| JP | 2013040856 A | 2/2013 |
| WO | 2006/120776 A1 | 11/2006 |

* cited by examiner

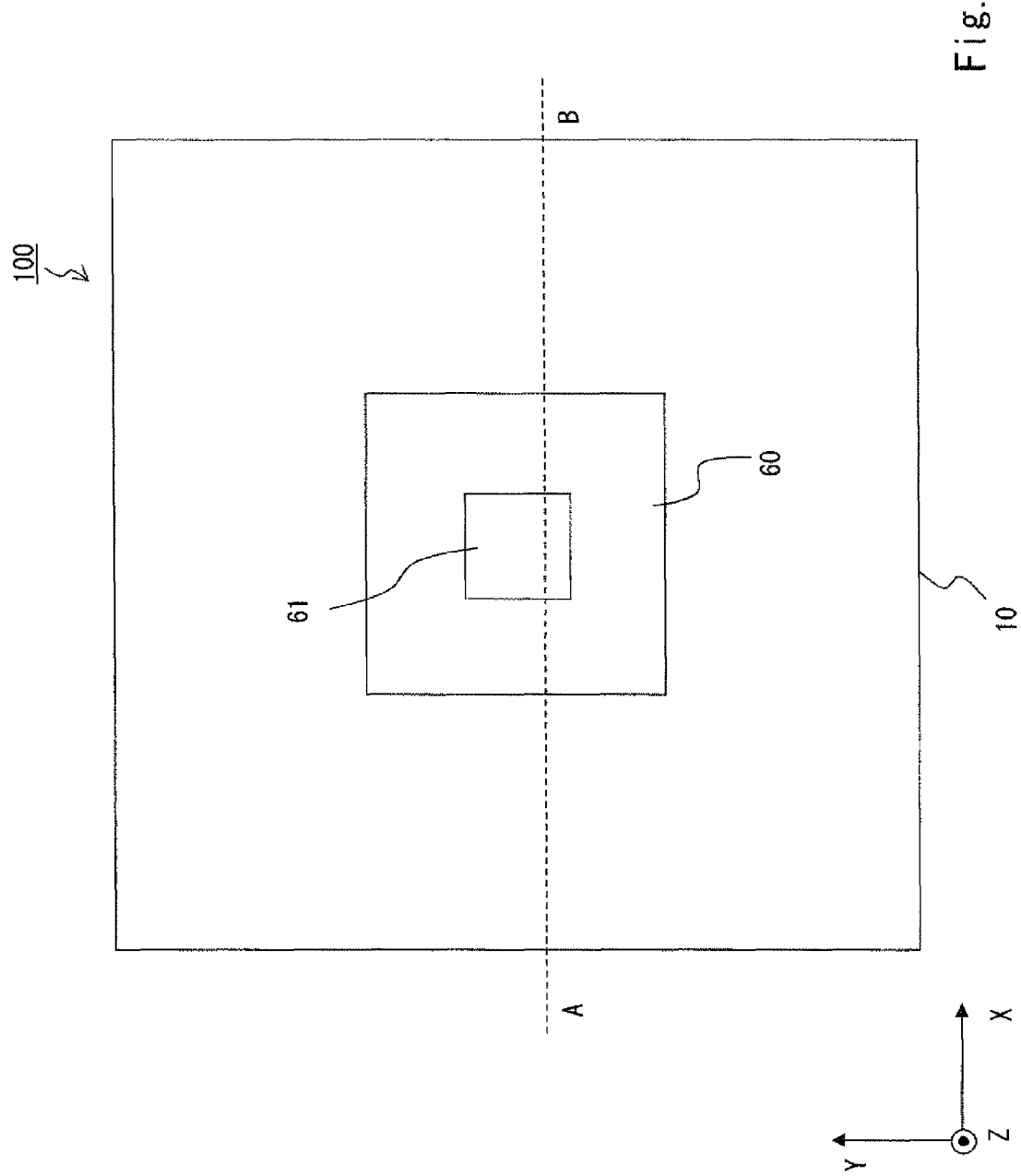

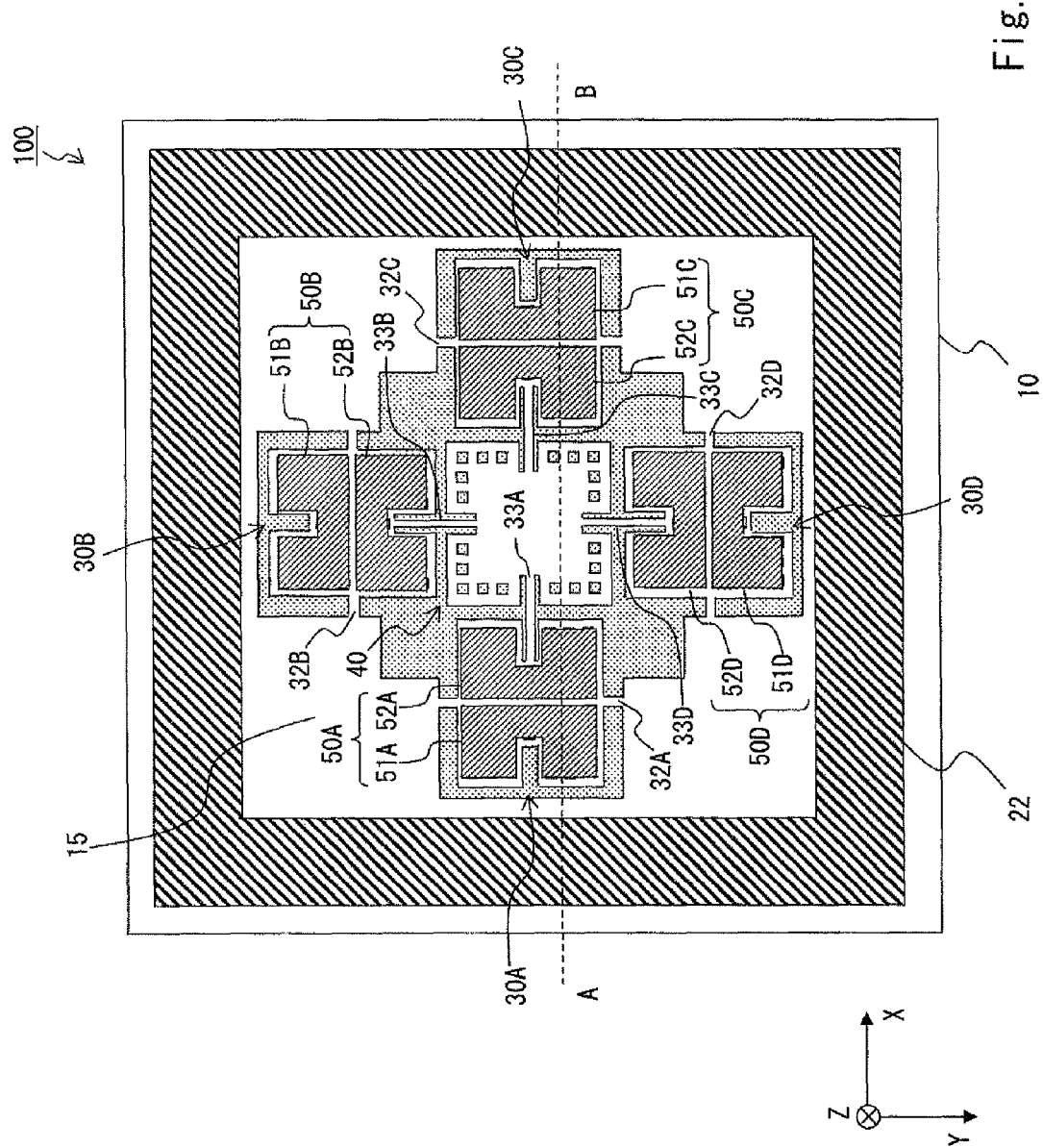

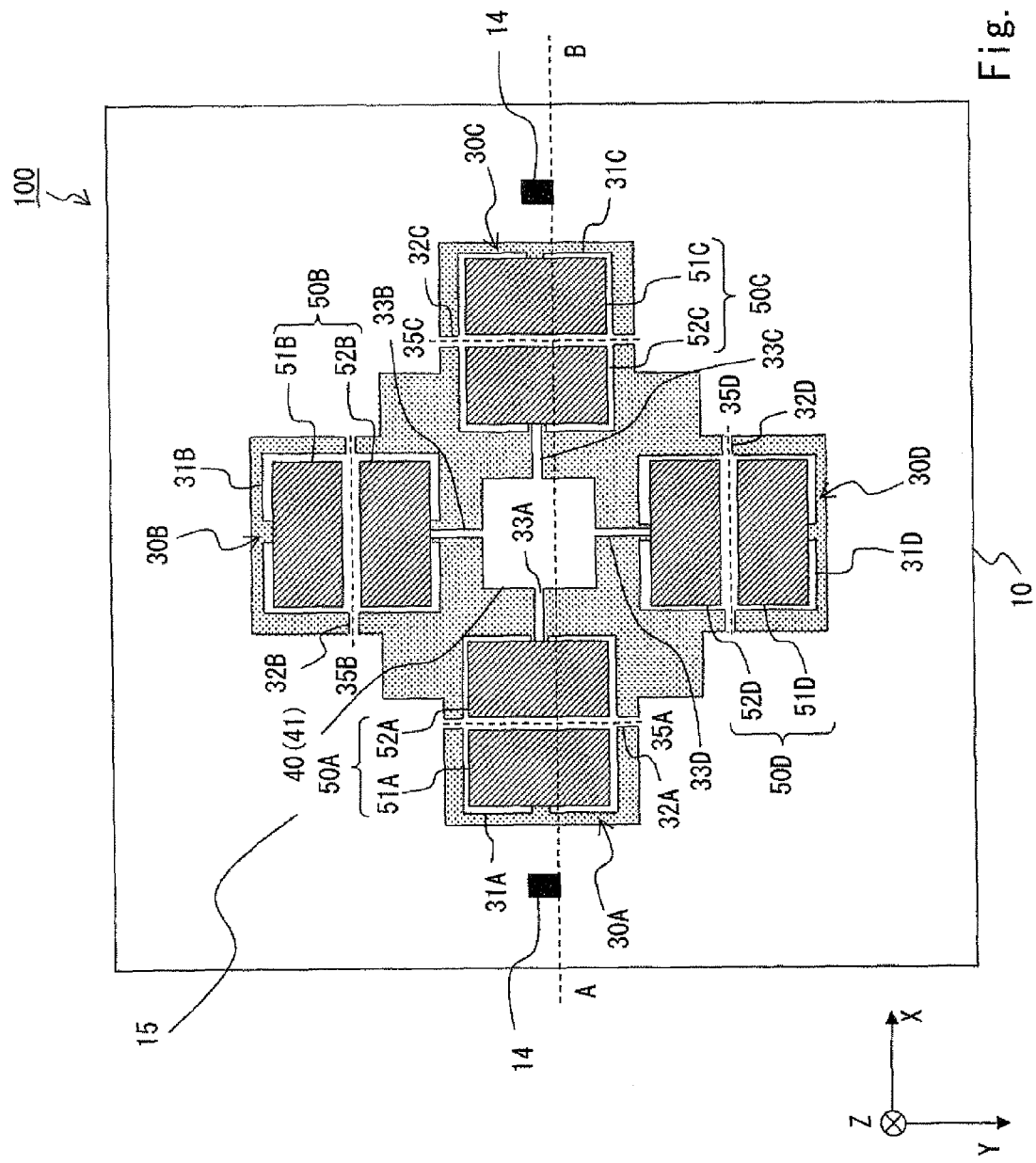

DYNAMIC QUANTITY SENSOR AND DYNAMIC QUANTITY SENSOR SYSTEM

INCORPORATION BY REFERENCE

This application is based upon and claims the benefit of priority from Japanese patent application No. 2012-252600, filed on Nov. 16, 2012, and Japanese patent application No. 2013-109119, filed on May 23, 2013, the disclosure of which is incorporated herein in its entirety by reference.

BACKGROUND OF THE INVENTION

1. Field of the Invention

The present invention relates to a dynamic quantity sensor and a dynamic quantity sensor system and, in particular, to a dynamic quantity sensor and a dynamic quantity sensor system that are provided with a movable portion that can move according to dynamic quantity.

2. Description of Related Art

Conventionally, a force sensor that detects a force, which is one of dynamic quantity, has been utilized in various systems. For example, advanced processing can be achieved by using a force sensor for a surface of a robot or the like as a tactile sensor. If the force sensor is applied to fingertips of the robot, the robot can perceive a shape of an object, or can grip the object. In addition, the force sensor is applied to a whole body surface of the robot, and the robot perceives by contact a target object and a surrounding situation that cannot be perceived only by visual and auditory senses, whereby it becomes possible for the robot to come in contact with a person, or to autonomously move in a place where various obstacles have been intricately arranged. In order to achieve the above, it is important to be able to accurately measure a state of a contact surface, such as a force of plural axes (multiple axes) or a shear force.

For example, a sensor described in Japanese Unexamined Patent Application Publication No. 2004-61280 has been known as a conventional force sensor.

SUMMARY OF THE INVENTION

Generally, most of conventional force sensors fabricated using a semiconductor micromachining technology take change of physical quantity as change of an electric capacity by a movable electrode (movable portion) that can move according to physical quantity. In FIG. 25, shown is comparison of detection schemes of such conventional electric capacity type force sensors.

A scheme 1 is the scheme to simply detect capacity change between a movable electrode and a fixed electrode, a scheme 2 is the scheme to deduct a basic capacity from a capacity of the movable electrode, with a capacity of a reference electrode being set as the basic capacity, and a scheme 3 is the scheme (differential detection scheme) to calculate a difference of capacities of both sides of the movable electrode. Although structures become simpler as the scheme is the former one, there are such problems that a good temperature characteristic is hard to secure since the structures are subjected to an effect of offset, and that detection accuracy is low since linearity of outputs is hard to keep.

Namely, as shown in FIG. 25, with the scheme without a differential as the scheme 1, detection accuracy is the lowest since an offset capacity is large, and linearity of the outputs is poor. With the scheme using a reference electrode as the scheme 2, detection accuracy is higher than the scheme 1 since the offset capacity is small, and linearity of the outputs is better than in the scheme 1. With the differential detection scheme as the scheme 3, detection accuracy is the highest since the offset capacity is small, a good temperature characteristic can be secured because of a symmetrical structure of electrodes that perform differential as compared with the scheme 2, and linearity of the outputs is better than the scheme 2. It is to be noted that while two conductor layers are needed in the schemes 1 and 2, three conductor layers are generally needed in the scheme 3, the conductor layers serving as electrodes.

There is a problem that since a conventional sensor described in Japanese Unexamined Patent Application Publication No. 2004-61280 can detect forces (Fx, Fy, Fz) in a triaxial direction, but highly accurate detection as differential detection cannot be performed to the force Fz in a Z direction (vertical direction), detection accuracy of a Z axis is low.

Accordingly, there is a problem that it is difficult to accurately detect dynamic quantity by the conventional dynamic quantity sensor.

A first aspect of the present invention is a dynamic quantity sensor including: a force receiving portion; a first movable portion that rotates in a first rotational direction around a first rotational axis according to dynamic quantity in a first direction that the force receiving portion receives, and rotates in the first rotational direction around the first rotational axis according to dynamic quantity in a second direction different from the first direction that the force receiving portion receives; and a second movable portion that rotates in a second rotational direction around a second rotational axis according to the dynamic quantity in the first direction that the force receiving portion receives, and rotates in an opposite direction to the second rotational direction around the second rotational axis according to the dynamic quantity in the second direction that the force receiving portion receives. Further, the dynamic quantity sensor can detect at least the dynamic quantity in the first direction and the dynamic quantity in the second direction.

According to the present invention, can be provided a dynamic quantity sensor and a dynamic quantity sensor system that can accurately detect dynamic quantity.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 1A is a schematic top view of a force sensor according to an embodiment 1;

FIG. 1B is a schematic perspective view of a bottom surface of the force sensor according to an embodiment 1;

FIG. 12A is a schematic perspective view of a bottom surface of a force sensor according to an embodiment 6;

DESCRIPTION OF THE EXEMPLARY EMBODIMENTS

Hereinafter, embodiments of the present invention will be explained with reference to drawings. Each embodiment explained hereinafter is not individually independent, but can be appropriately combined with one another, and an effect of the combination shall be able to be claimed. The same symbol is given to the same component, and explanation is appropriately omitted.

Embodiment 1

Figure 1C:
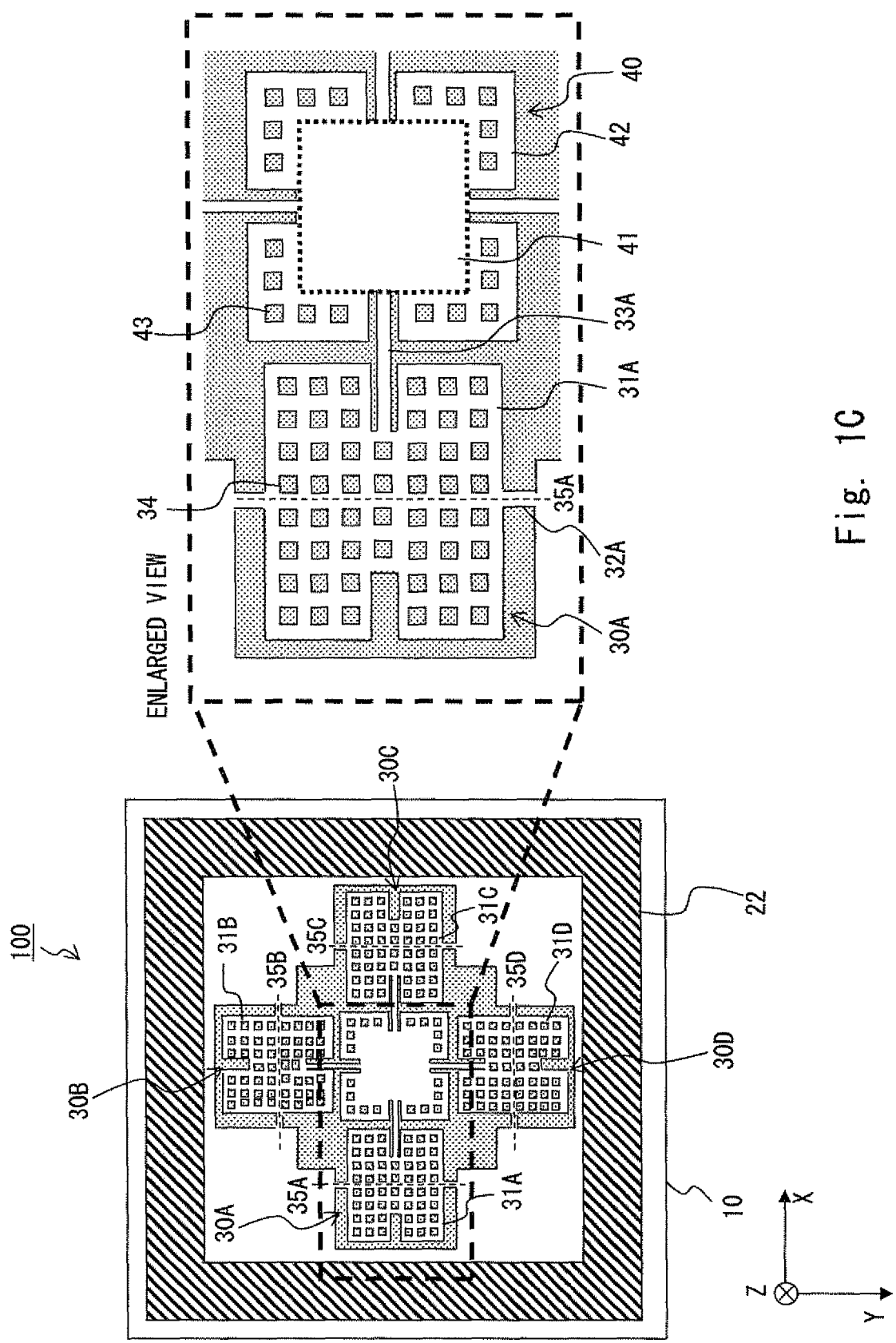
FIG. 1C is a schematic perspective view of the bottom surface of the force sensor according to an embodiment 1 and an enlarged view thereof.
Figure 1D:
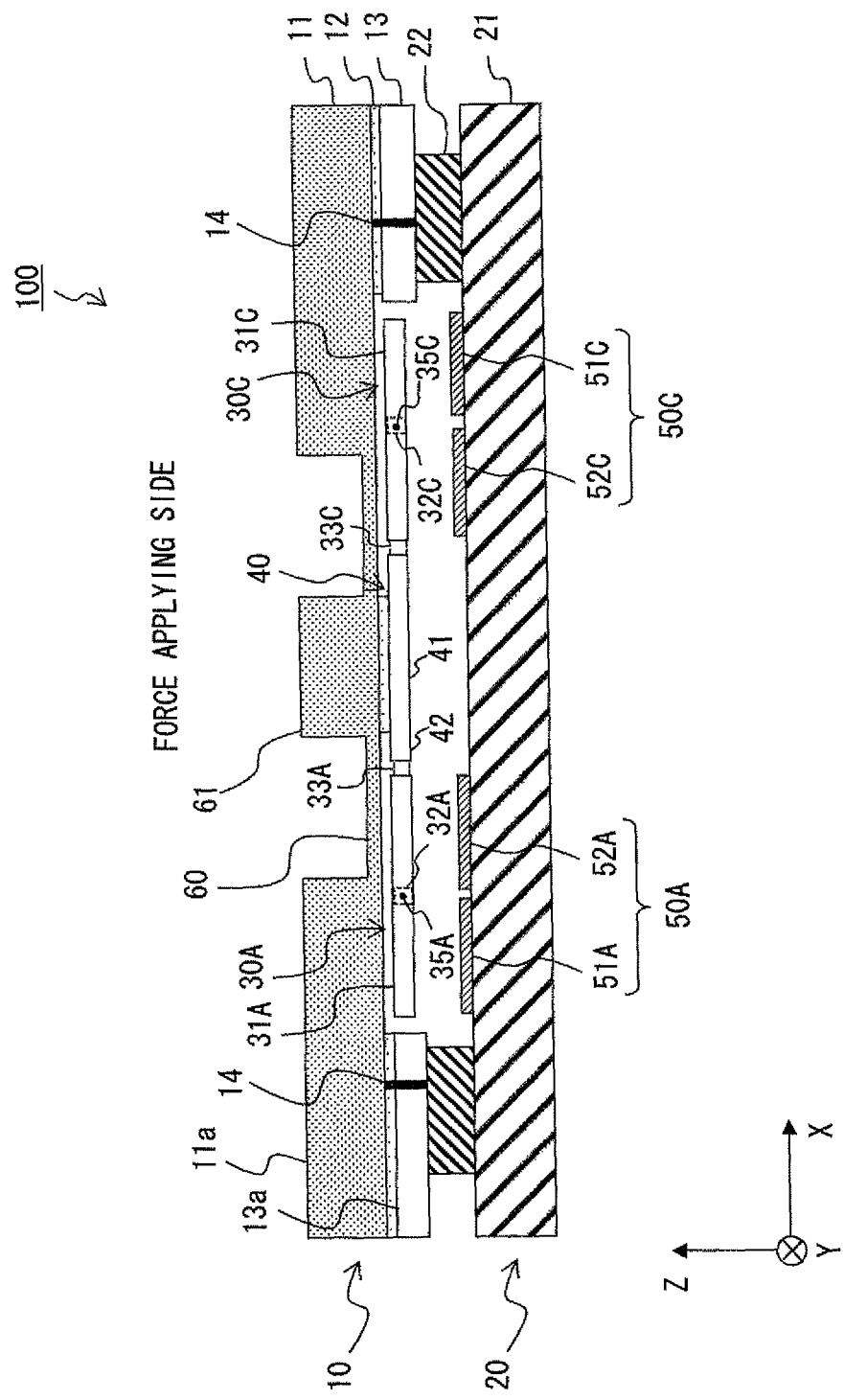
FIG. 1D is a schematic cross-sectional side view of the force sensor according to an embodiment 1.

Hereinafter, an embodiment 1 will be explained with reference to the drawings. The embodiment is an example of a force sensor that detects a force, which is one of dynamic quantity, by triple axes as a multiaxial dynamic quantity sensor. The triaxial force sensor can detect forces in an X direction, a Y direction, and a Z direction. FIG. 1A is a top view of a force sensor 100 pertaining to an embodiment of the present invention. FIG. 1B is a perspective view of a bottom surface of the force sensor 100 in which a sealing substrate has been omitted. FIG. 1C is a perspective view of the bottom surface of the force sensor 100 in which the sealing substrate and a fixed electrode have been omitted. FIG. 1D is a cross-sectional side view taken along a line A-B of the force sensor 100 in FIG. 1A.

As shown in FIGS. 1A to 1D, the force sensor 100 pertaining to the embodiment is provided with a movable support portion 10 and a sealing portion 20, and the movable support portion 10 and the sealing portion 20 are sealed and bonded by the bonding portion 22. The movable support portion 10 and the sealing portion 20 are substantially square shapes in a top view, and have substantially the same size.

The movable support portion 10 is mainly provided with: seesaw portions (movable portions) 30A to 30D (any one of them is also referred to as a seesaw portion 30); a force receiving portion 40; a diaphragm 60; and a projection 61. The sealing portion 20 is mainly provided with a sealing substrate 21 and fixed electrode pairs (opposed electrode pairs) 50A to 50D (any one of them is also referred to as a fixed electrode pair 50).

It is to be noted that a surface direction of the force sensor is a horizontal direction, the X direction (X-axis direction), or the Y direction (Y-axis direction), and that a thickness direction of the force sensor is a vertical direction or the Z direction (Z-axis direction). A surface on a positive side in the Z direction may be referred to as the top surface, a surface on a negative side in the Z direction as the bottom surface, a surface on a side to which a force is applied as a force applying surface, and a surface on a opposite side, which is opposed to the force applying surface, as a force non-applying surface. In the embodiment, the top surface is a force applying surface, and the bottom surface is a force non-applying surface. In addition, in each substrate (each layer) of the movable support portion 10 and the sealing portion 20, a surface on a side where a movable electrode or a fixed electrode is formed is also referred to as a main surface (front surface), and a surface on an opposite side, which is opposed to the main surface, is as a back surface (rear surface). In the movable support portion 10 and the sealing portion 20, a center side is referred to as an inside, and a peripheral end side is as an outside in the top view or the bottom view.

The movable support portion 10 includes an SOI (Silicon on Insulator) substrate. The SOI substrate is a three-layer-structured substrate, and a first silicon layer 11, an $SiO_2$ insulator film 12, and a second silicon layer 13 are laminated and formed in order from a top surface side (force applying side).

The first silicon layer 11 is also a support substrate to support the seesaw portion 30. In addition, the first silicon layer 11 is the silicon layer having conductivity.

The diaphragm 60 is formed in a center portion of a back surface of the first silicon layer 11, and further the projection 61 is formed in a center portion inside the diaphragm 60. The diaphragm 60 and the projection 61 have substantially square shapes in the top view similarly to an outline of the first silicon layer 11.

The diaphragm 60 is a thin portion that has a thinner film thickness than a periphery 11a of the first silicon layer 11, has flexibility, and elastically deforms according to apply of a force to the projection 61. The first silicon layer 11 has a predetermined film thickness, the film thickness of the center portion excluding a portion of the projection 61 is made thinner from the back surface side by etching, and thereby the diaphragm 60 is formed.

The projection 61 is thicker than the diaphragm 60 and, for example, it has the same thickness as the periphery 11a of the first silicon layer 11. Since the projection 61 is thicker than the diaphragm 60 and projects, a force can be made to be easily received, an applying point of the force can be specified, and thus detection accuracy of the force improves.

The force receiving portion 40 is formed in a center portion of the second silicon layer 13 on a main surface side (bottom surface side) of the first silicon layer 11, and the four seesaw portions 30A to 30D are formed around the force receiving portion 40. It can be also said that the force receiving portion 40 is surrounded by the seesaw portions 30A to 30D. The seesaw portions 30A and 30C are arranged on both sides in the X direction of the force receiving portion 40, and the seesaw portions 30B and 30D are arranged on both sides in the Y direction of the force receiving portion 40. The force receiving portion 40 and the seesaw portions 30A to 30D are coupled to one another by hinge beams 33A to 33D (any one of them is also referred to as a hinge beam 33), respectively.

The second silicon layer 13 has a predetermined film thickness, and the force receiving portion 40, the seesaw portions 30A to 30D, the hinge beams 33A to 33D, and the like are formed by etching from a main surface side. For this reason, the force receiving portion 40, the seesaw portions 30A to 30D, the hinge beams 33A to 33D, and the like of the second silicon layer 13 have substantially the same thickness. The second silicon layer 13 is the silicon layer having conductivity similarly to the first silicon layer 11, the whole force receiving portion 40, seesaw portions 30A to 30D, hinge beams 33A to 33D, and the like are conducted, and are electrically connected to one another.

The force receiving portion 40 has a force receiving plate 41 and a stopper 42. The force receiving plate 41 is formed in a substantially square shape in a center of the force receiving portion 40. The force receiving plate 41 (force receiving portion 40) is formed at a position corresponding to the projection 61. It can be also said that the projection 61 is formed at a position corresponding to the force receiving plate 41 (force receiving portion 40). The force receiving plate 41 (force receiving portion 40) is formed on the projection 61 (on the main surface) through the insulator film 12, and is fixed and supported by the projection 61 (first silicon layer 11) through the insulator film 12. Namely, when a force is applied to the projection 61, the applied force is transmitted to the force receiving plate 41 through the insulator film 12.

The stopper 42 is formed substantially in an L shape at each of corner portions (four corners) around the force receiving plate 41 so as to extend the force receiving plate 41. The stopper 42 is a contact portion that comes into contact with a sealing portion 20 side, when a position of the force receiving portion 40 is inclined and displaced. Etching holes 43 are formed in the stopper 42. The etching hole 43 is a through hole that penetrates the stopper 42, and an opening thereof has a substantially square shape. The etching holes 43 are arranged in accordance with the shape of the stopper 42 so as to be able to perform sacrifice layer etching of the insulator film 12. The insulator film 12 is etched through the etching hole 43 from the main surface side, and thereby the insulator film 12 under the stopper 42 is removed. As a result of this, the stopper 42 is spaced aside from the first silicon layer 11, and then a structure supported by the force receiving plate 41 is obtained.

The stopper 42 is not formed in a center portion of each side (end) of the force receiving plate 41, but the hinge beams 33A to 33D are combined with the center portion of each side. It can be also said that a concave portion is formed at each side (end) of the force receiving portion 41, and that the hinge beams 33A to 33D are combined with a hollow of the concave portion.

Cross sections of the hinge beams (coupling portions) 33A to 33D each have a substantially quadrangular shape, the each hinge beam is formed in an elongated beam shape, and is a combination support member having flexibility and twistability (torsionability). The hinge beams 33A to 33D bend according to displacement of the force receiving portion 40, and rotates and displaces the seesaw portions 30A to 30D.

The seesaw portions 30A to 30D are each arranged at a place opposed to each side (end) of the force receiving portion 40. The seesaw portions 30A to 30D have the same structure, and have a shape and arrangement of a symmetrical structure centering on the force receiving portion 40. The seesaw portions 30A to 30D have movable electrodes 31A to 31D (any one of them is also referred to as a movable electrode 31), and the movable electrodes 31A to 31D are supported by torsion beams 32A to 32D (any one of them is also referred to as a torsion beam 32). It can be also said that the seesaw portions 30A to 30D have the movable electrodes 31A to 31D and the torsion beams 32A to 32D.

The movable electrodes 31A to 31D each has a quadrangular shape in the top view, and each have a concave portion in a center of opposed two sides (ends) of a quadrangle. It can be also said that the movable electrodes 31A to 31D are each formed substantially in an H shape. The hinge beams 33A to 33D are combined with hollows of the concave portions of the movable electrodes 31A to 31D. The movable electrodes 31A to 31D are combined and supported with/by a fixing portion 15 by the torsion beams 32A to 32D in centers of two sides (ends) without the concave portion thereof. Formation points of the torsion beams 32A to 32D serve as rotational axes 35A to 35D (any one of them is also referred to as a rotational axis 35) that the movable electrodes 31A to 31D (seesaw portions 30A to 30D) rotate and move.

An etching hole 34 is formed in the movable electrodes 31A to 31D. The etching hole 34 is formed similarly to the etching hole 43 of the force receiving portion 40. Namely, the etching hole 34 is a through hole that penetrates the movable electrodes 31A to 31D, and an opening thereof has a substantially square shape. The etching holes 34 are arranged in accordance with the shape of the movable electrodes 31A to 31D so as to be able to perform sacrifice layer etching of the insulator film 12. The insulator film 12 is etched through the etching hole 34 from the main surface side, and thereby the insulator film 12 under the movable electrodes 31A to 31D is removed. As a result of this, the movable electrodes 31A to 31D are spaced aside from the first silicon layer 11, and a structure supported by the fixing portion 15 is obtained by means of the torsion beams 32A to 32D.

Cross sections of the torsion beams 32A to 32D each have a substantially quadrangular shape, the each torsion beam is formed in an elongated beam shape, and is a combination support member having twistability (torsionability). The torsion beams 32A to 32D support the seesaw portions 30A to 30D so that they are twisted around the rotational axes 35A to 35D. Namely, the seesaw portions 30A to 30D are supported by the fixing portion 15 through the torsion beams 32A to 32D so as to be rotatable centering on the rotational axes 35A to 35D.

The torsion beam 32 preferably has a shape of a narrow width, a short length, and a thick thickness. Namely, the torsion beam 32 is narrow so as to be rotatable, and it is short and thick so as to be unable to be displaced in the Z direction. As a result of this, since translation rigidity can be made high, and rotational rigidity can be made low, translation displacement of the seesaw portion 30 can be suppressed, and only capacity change due to rotation of the seesaw portion 30 can be detected. A detection principle of the force sensor 100 will be mentioned later.

In addition, rotational rigidity of the hinge beam 33 is preferably not more than the rotational rigidity of the torsion beam. Since the seesaw portion 30 is easy to rotate, and is hard to affect an other axis even though the seesaw portion 30 is arranged at the triple axes as in the embodiment, a force can be accurately detected.

It is to be noted that in a relationship of spring rigidity in the Z direction of the diaphragm 60, the torsion beam 32, and the hinge beam 33 that are elastically displaced, the diaphragm 60 is preferably higher than the torsion beam 32 and the hinge beam 33 (Z rigidity of the diaphragm 60>>Z rigidity of the torsion beam 32 and the hinge beam 33). As a result of this, sensor sensitivity can be prescribed by a size of the diaphragm 60.

The fixing portion 15 is formed in an arbitrary shape at a periphery 13a of the second silicon layer 13. In this example, the fixing portion 15 is formed continuously from an outer periphery to the vicinity of the seesaw portions 30A to 30D. The fixing portion 15 is formed through the insulator film 12 on the periphery 11a (on the main surface) of the first silicon layer 11. The fixing portion 15 is fixed and supported to/by the first silicon layer 11 through the insulator film 12, and thereby supports the seesaw portions 30A to 30D.

The seesaw portions 30A to 30D, the hinge beams 33A to 33D, and the force receiving portion 40 have the same thickness, and the periphery 13a may have the same thickness as the each portion, but may be preferably slightly (several µm) thicker than the each portion. By making the periphery 13a thick, it is easy to form a gap with the fixed electrode and the like when the periphery 13a is sealed by the sealing portion 20.

A penetrating electrode 14 is formed at the periphery 13a outside the seesaw portions 30A to 30D among the second silicon layers 13. The penetrating electrode 14 penetrates the second silicon layer 13 and the insulator film 12, and electrically connects the first silicon layer 11 and the second silicon layer 13, and the bonding portion 22.

In a periphery of the force sensor 100, the bonding portion 22 seals and bonds the second silicon layer 13 of the movable support portion 10 and the sealing substrate 21 of the sealing portion 20 so as to surround the seesaw portion 30 and the force receiving portion 40. The bonding portion 22 is a metal diffusion bond member having conductivity, and is, for example, Cu—Sn (copper-tin) alloy or the like.

The sealing substrate 21 is the substrate that seals the whole movable support portion 10 including the seesaw portions 30A to 30D and the force receiving portion 40. The sealing substrate 21 is, for example, a silicon substrate, an LTCC (Low Temperature Co-fired Ceramic) substrate, or an LSI (Large Scale Integration). For example, a via (not shown) through which an electrode potential on the top surface side is pulled out to the bottom surface side is arranged in the sealing substrate 21, an external terminal (not shown) connected to this via is arranged at the back surface (bottom surface side) of the sealing substrate 21, and an external detection circuit and the like are connected to the external terminal. In addition, if needed, a circuit, such as a detection circuit, and wiring are provided inside the sealing substrate 21. The sealing substrate 21 preferably includes an LSI. As a result of this, since a processing circuit can be arranged at a portion near the sensor structure, it is unlikely to be affected by noise.

Fixed electrode pairs 50A to 50D are formed on the main surface (top surface side) of the sealing substrate 21. The fixed electrode pairs 50A to 50D include fixed electrodes 51A and 52A, 51B and 52B, 51C and 52C, and 51D and 52D (any one of them is also referred to as fixed electrodes 51 and 52), respectively. The fixed electrodes 51A to 51D and 52A to 52D are conductive films having conductivity, such as metal, and are patterned and formed on the sealing substrate 21.

The fixed electrodes 51A to 51D and 52A to 52D are arranged at positions corresponding to the movable electrodes 31A to 31D of the seesaw portions 30A to 30D, respectively, and are included in a capacitive element together with the movable electrodes 31A to 31D. The fixed electrodes 51A to 51D are arranged on the outside of the rotational axes 35A to 35D of the seesaw portions 30A to 30D, and the fixed electrodes 52A to 52D are arranged on the inside thereof. For example, electric capacities of these capacitive elements can be detected by the external detection circuit or the like through the via (not shown) arranged in the sealing substrate 21, or by the LSI included in the sealing substrate 21.

Figure 2:
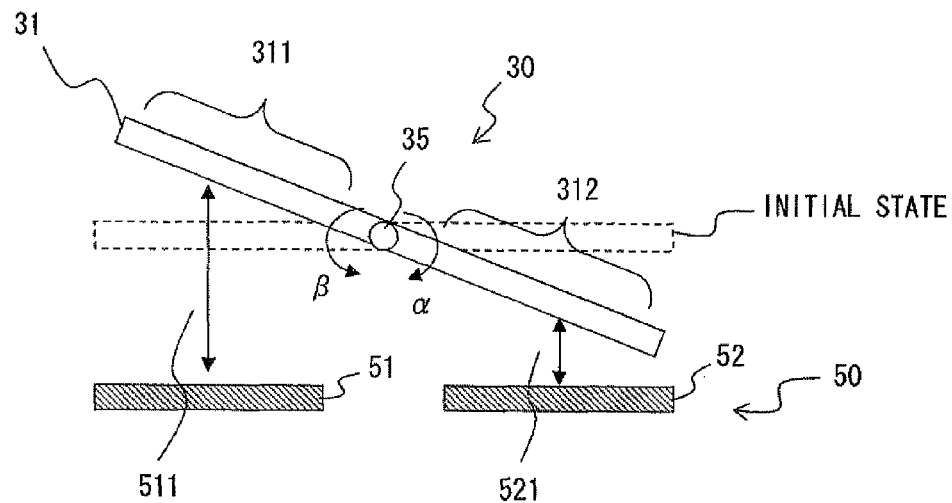
FIG. 2 is an explanation diagram for explaining the operating principle of the force sensor according to an embodiment 1.

Next, the operating principle of the force sensor 100 pertaining to the embodiment will be explained. FIG. 2 shows a relationship between displacement operation of the movable electrode and an electric capacity in the force sensor 100.

In the movable electrode 31 of the seesaw portion 30, a movable electrode portion 311 on one end side (outside) with respect to the rotational axis 35 and the fixed electrode 51 are opposed to each other, and the movable electrode portion 311 and the fixed electrode 51 are included in a first capacitive element 511. In the movable electrode 31, a movable electrode portion 312 on the other end side (inside) with respect to the rotational axis 35 and the fixed electrode 52 are opposed to each other, and the movable electrode portion 312 and the fixed electrode 52 are included in a second capacitive element 521. Although in the embodiment, an example of one movable electrode 31 that continues the whole seesaw portion 30 is explained, an electrode separately divided into the movable electrode portion 311 and the movable electrode portion 312 may be employed. For example, the seesaw portion 30 has the first movable electrode (movable electrode portion 311) and the second movable electrode (movable electrode portion 312) sandwiching the rotational axis 35 therebetween, the first movable electrode and the fixed electrode 51 may be included in the first capacitive element 511, and the second movable electrode and the fixed electrode 52 may be included in the second capacitive element 521.

The movable electrode 31 rotates and is displaced in an $\alpha$ direction or a $\beta$ direction centering on the rotational axis 35 according to an applied force. When a force is applied to the projection 61, the force receiving portion 40 acts, and a force of a positive side or a negative side of the Z axis is applied to an inner end (right side in FIG. 2) of the seesaw portion 30 through the hinge beam 33. As a result of this, the movable electrode 31 rotates centering on the rotational axis 35.

FIG. 2 is an example where the movable electrode 31 has rotated in the $\alpha$ direction from an initial state. In this case, since the movable electrode portion 311 of the movable electrode 31 and the fixed electrode 51 are separated, an electric capacity of the first capacitive element 511 between the movable electrode portion 311 and the fixed electrode 51 decreases (C−ΔC). In addition, since the movable electrode portion 312 of the movable electrode 31 and the fixed electrode 52 get closer to each other, an electric capacity of the second capacitive element 521 between the movable electrode portion 312 and the fixed electrode 52 increases (C+ΔC).

Figure 25:
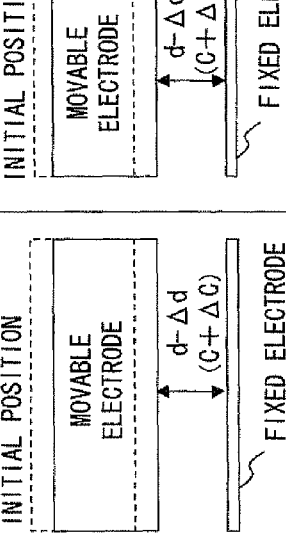
FIG. 25 is a comparison table showing a comparison of detection schemes of conventional force sensors.

A capacity difference between the first capacitive element 511 and the second capacitive element 521 (Cs=(C+ΔC)−(C−ΔC)=2ΔC) is calculated, and thereby a force is detected by the differential detection scheme. While three conductor layers have been needed in a general differential detection scheme as in FIG. 25, the differential detection scheme can be achieved by two conductor layers in a scheme of FIG. 2. Furthermore, in the embodiment, a difference in a deformation mode of a seesaw structure (rotational direction of the seesaw portion) is utilized using the plurality of seesaw portions 30, and a force in a triaxial direction is detected by the differential detection scheme.

Figure 3:
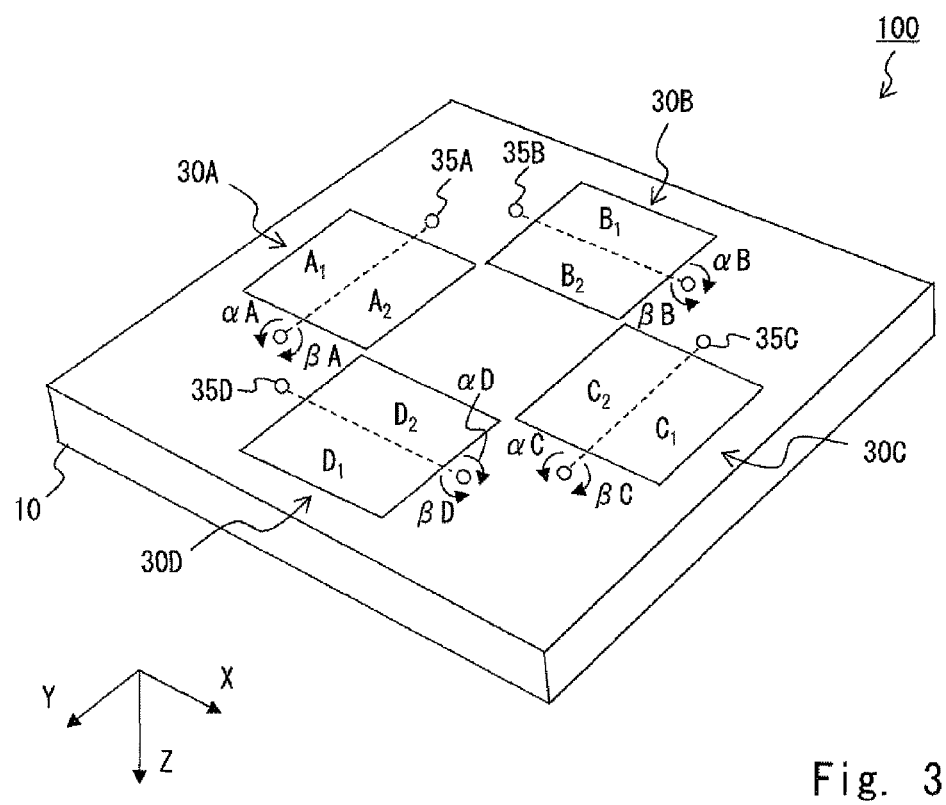
FIG. 3 is a perspective view showing schematically arrangement positions of the seesaw portion and a rotational axis in the force sensor according to an embodiment 1.

FIG. 3 shows an arrangement image of the seesaw portion 30 and the rotational axis 35 in the force sensor 100. FIG. 3 is a perspective view when only the movable support portion 10 is viewed from the main surface side (bottom surface side).

In the seesaw portion 30A, the rotational axis 35A extends in the Y direction. For this reason, the seesaw portion 30A rotates in an $\alpha$A direction or in a $\beta$A direction centering on the rotational axis 35A according to forces in the X direction and the Z direction. A capacity outside the rotational axis 35A of the seesaw portion 30A is set as a capacity $A_1$, and a capacity inside the rotational axis 35A is as a capacity $A_2$. When the seesaw portion 30A rotates in the $\alpha$A direction, the capacity $A_2$ increases while the capacity $A_1$ decreasing, and when the seesaw portion 30A rotates in the $\beta$A direction, the capacity $A_2$ decreases while the capacity $A_1$ increasing.

When a force is applied in a negative direction of the Z axis, the seesaw portion 30A rotates in the $\alpha$A direction, and when a force is applied in a positive direction of the Z axis, the seesaw portion 30A rotates in the $\beta$A direction. When a force is applied in a positive direction of the X axis, the seesaw portion 30A rotates in the $\beta$A direction, and when a force is applied in a negative direction of the X axis, the seesaw portion 30A rotates in the $\alpha$A direction. The seesaw portion 30A is not displaced by a force in the Y direction since the hinge beam 33A is twisted around the X axis.

In the seesaw portion 30C, the rotational axis 35C extends in the Y direction. For this reason, the seesaw portion 30C rotates in an $\alpha$C direction or in a $\beta$C direction centering on the rotational axis 35C according to forces in the X direction and the Z direction. A capacity outside the rotational axis 35C of the seesaw portion 30C is set as a capacity $C_1$, and a capacity inside the rotational axis 35C is as a capacity $C_2$. When the seesaw portion 30C rotates in the $\alpha$C direction, the capacity $C_2$ decreases while the capacity $C_1$ increasing, and when the seesaw portion 30C rotates in the $\beta$C direction, the capacity $C_2$ increases while the capacity $C_1$ decreasing.

When a force is applied in the negative direction of the Z axis, the seesaw portion 30C rotates in the $\beta$C direction, and when a force is applied in the positive direction of the Z axis, the seesaw portion 30C rotates in the $\alpha$C direction. When a force is applied in the positive direction of the X axis, the seesaw portion 30C rotates in the $\beta$C direction, and when a force is applied in the negative direction of the X axis, the seesaw portion 30C rotates in the $\alpha$C direction. The seesaw portion 30C is not displaced by the force in the Y direction since the hinge beam 33C is twisted around the X axis.

In the seesaw portion 30B, the rotational axis 35B extends in the X direction. For this reason, the seesaw portion 30B rotates in an $\alpha$B direction or in a $\beta$B direction centering on the rotational axis 35B according to forces in the Y direction and the Z direction. A capacity outside the rotational axis 35B of the seesaw portion 30B is set as a capacity $B_1$, and a capacity inside the rotational axis 35B is as a capacity $B_2$. When the seesaw portion 30B rotates in the $\alpha$B direction, the capacity $B_2$ increases while the capacity $B_1$ decreasing, and when the seesaw portion 30B rotates in the $\beta$B direction, the capacity $B_2$ decreases while the capacity $B_1$ increasing.

When a force is applied in the negative direction of the Z axis, the seesaw portion 30B rotates in the $\alpha$B direction, and when a force is applied in the positive direction of the Z axis, the seesaw portion 30B rotates in the $\beta$B direction. When a force is applied in a positive direction of the Y axis, the seesaw portion 30B rotates in the $\beta$B direction, and when a force is applied in a negative direction of the Y axis, the seesaw portion 30B rotates in the $\alpha$B direction. The seesaw portion 30B is not displaced by the force in the X direction since the hinge beam 33B is twisted around the Y axis.

In the seesaw portion 30D, the rotational axis 35D extends in the X direction. For this reason, the seesaw portion 30D rotates in an $\alpha$D direction or in a $\beta$D direction centering on the rotational axis 35D according to forces in the Y direction and the Z direction. A capacity outside the rotational axis 35D of the seesaw portion 30D is set as a capacity $D_1$, and a capacity inside the rotational axis 35D is as a capacity $D_2$. When the seesaw portion 30D rotates in the $\alpha$D direction, the capacity $D_2$ decreases while the capacity $D_1$ increasing, and when the seesaw portion 30D rotates in the βD direction, the capacity $D_2$ increases while the capacity $D_1$ decreasing.

When a force is applied in the negative direction of the Z axis, the seesaw portion 30D rotates in the βD direction, and when a force is applied in the positive direction of the Z axis, the seesaw portion 30D rotates in the αD direction. When a force is applied in the positive direction of the Y axis, the seesaw portion 30D rotates in the βD direction, and when a force is applied in the negative direction of the Y axis, the seesaw portion 30D rotates in the αD direction. The seesaw portion 30D is not displaced by the force in the X direction since the hinge beam 33D is twisted around the Y axis.

Figure 4A:
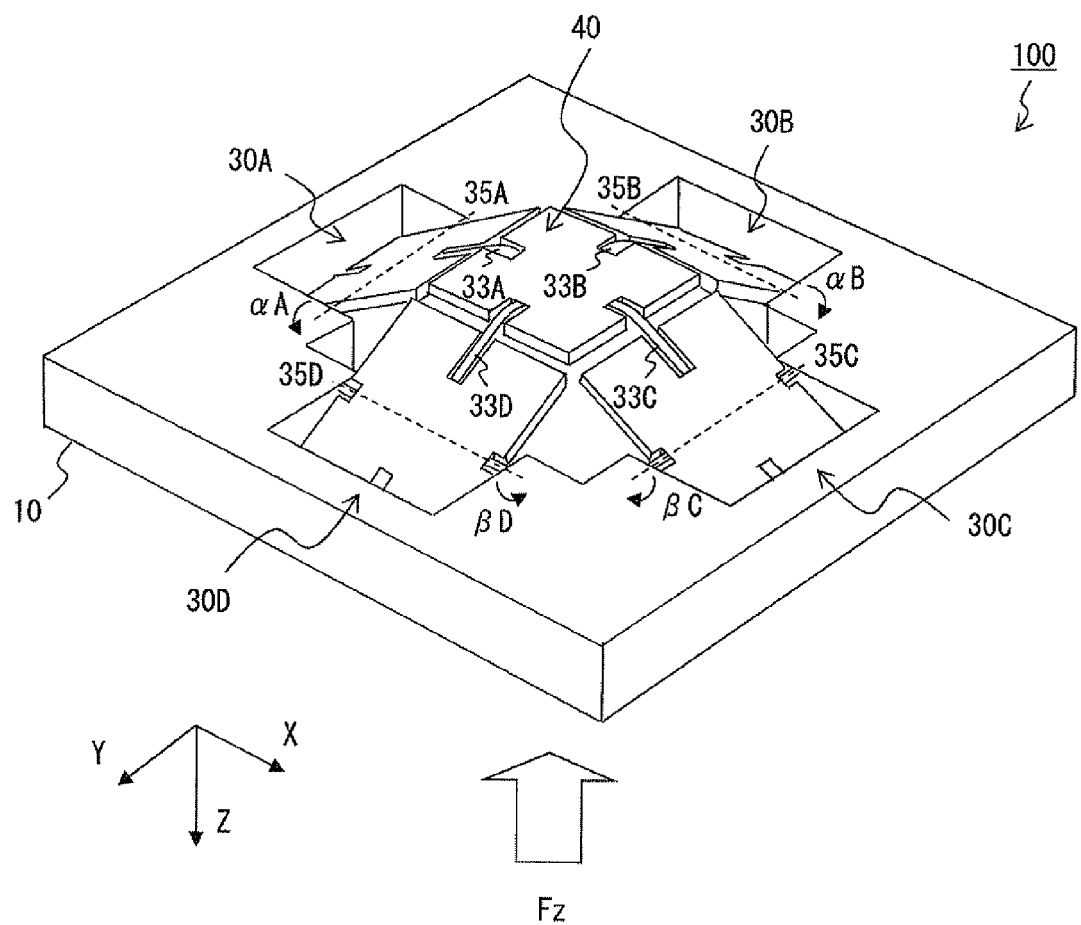
FIG. 4A is a perspective view showing schematically a state of the force sensor according to an embodiment 1 when a force has been applied to the direction of the Z axis.
Figure 4B:
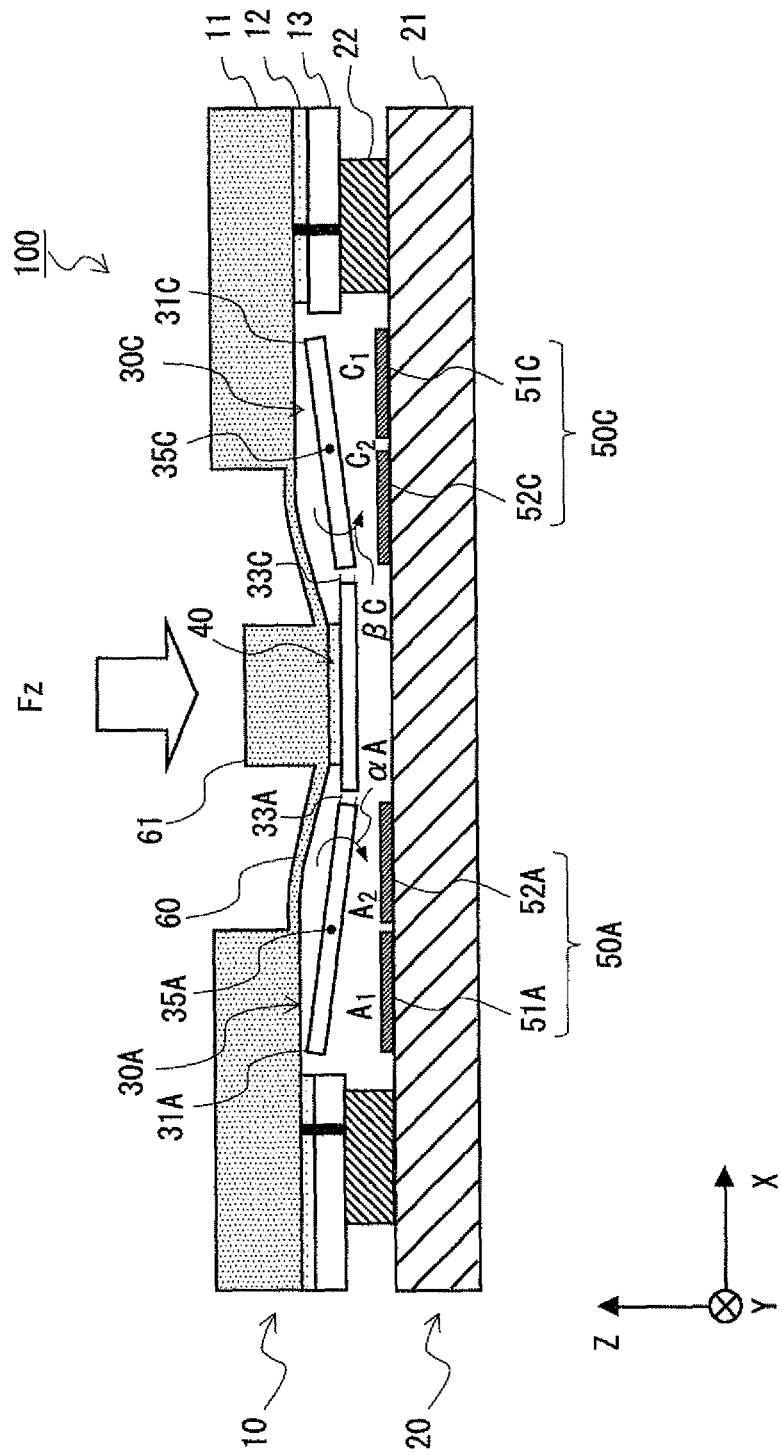
FIG. 4B is a cross-sectional side view showing schematically a state of the force sensor according to an embodiment 1 when a force has been applied to the direction of the Z axis.
Figure 4C:
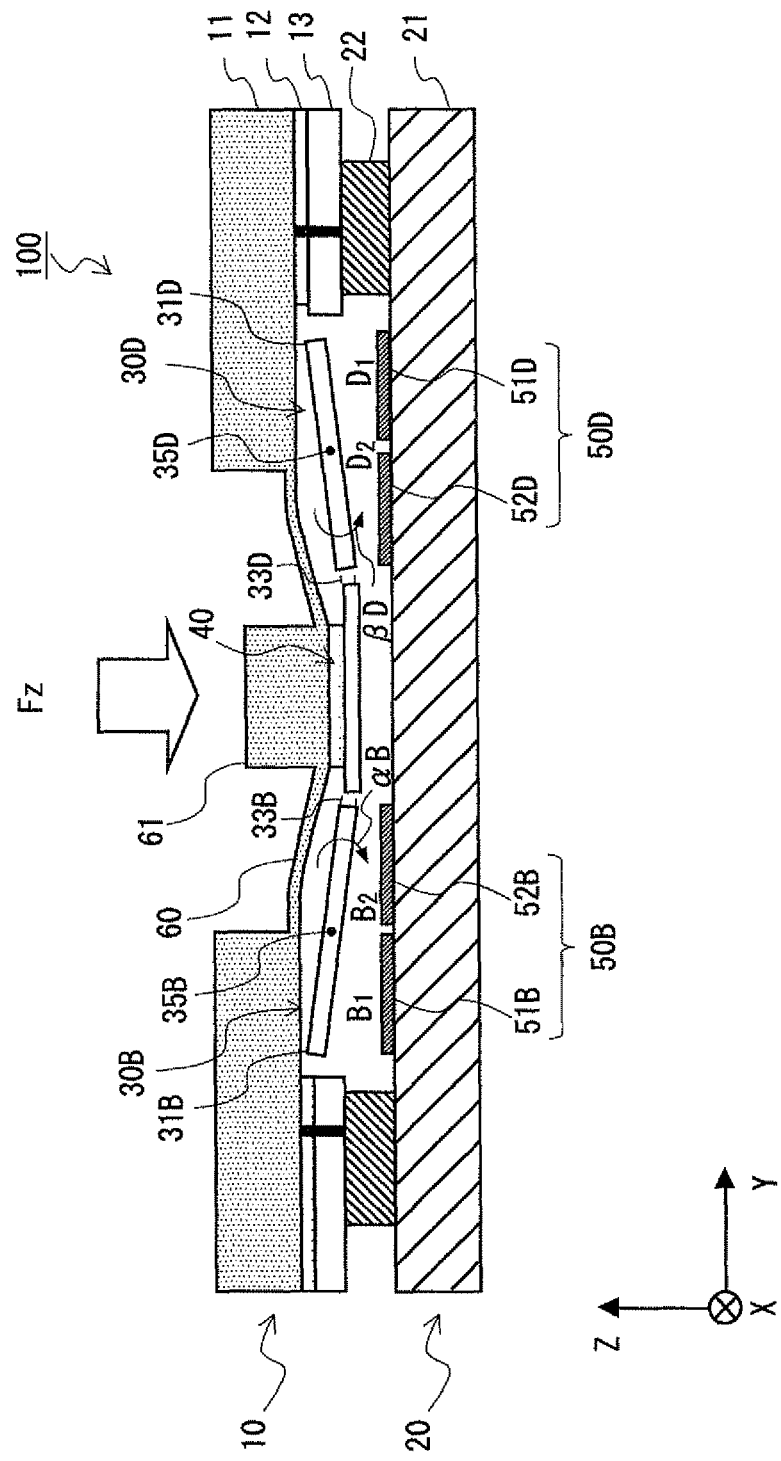
FIG. 4C is a cross-sectional side view showing schematically a state of the force sensor according to an embodiment 1 when a force has been applied to the direction of the Z axis.

Next, a specific operation example of the force sensor 100 pertaining to the embodiment will be explained. FIGS. 4A, 4B, and 4C show a state of the force sensor 100 when a force Fz has been applied to the negative direction of the Z axis. FIG. 4A is a perspective view when only the movable support portion 10 is viewed from the main surface side (bottom surface side), FIG. 4B is a cross-sectional side view viewed from the Y direction, and FIG. 4C is a cross-sectional side view viewed from the X direction. For example, when the force sensor 100 is arranged at robot skin as a tactile sensor, the force Fz can be detected as a pressure sense force.

As shown in FIGS. 4A to 4C, when the force Fz is applied in the negative direction of the Z axis, the force Fz acts on a top surface of the projection 61, and thus the projection 61 and the force receiving portion 40 are displaced so as to sink in the negative direction of the Z axis together with the diaphragm 60. All the hinge beams 33A to 33D are displaced in the negative direction of the Z axis, while bending in accordance with displacement of the force receiving portion 40.

As a result of it, as shown in FIG. 4B, since the seesaw portion 30A is pulled by the hinge beam 33A, the inner end of the seesaw portion 30A is displaced in the negative direction of the Z axis, and the seesaw portion 30A rotates and is displaced in the αA direction centering on the rotational axis 35A. For this reason, the capacity $A_2$ increases by the inner end of the seesaw portion 30A getting closer to the fixed electrode 52A, and the capacity $A_1$ decreases by the outer end of the seesaw portion 30A moving away from the fixed electrode 51A. In addition, since the seesaw portion 30C is pulled by the hinge beam 33C, an inner end of the seesaw portion 30C is displaced in the negative direction of the Z axis, and the seesaw portion 30C rotates and is displaced in the βC direction centering on the rotational axis 35C. For this reason, the capacity $C_2$ increases by the inner end of the seesaw portion 30C getting closer to the fixed electrode 52C, and the capacity $C_1$ decreases by the outer end of the seesaw portion 30C moving away from the fixed electrode 51C.

Furthermore, as shown in FIG. 4C, since the seesaw portion 30B is pulled by the hinge beam 33B, an inner end of the seesaw portion 30B is displaced in the negative direction of the Z axis, and the seesaw portion 30B rotates and is displaced in the αB direction centering on the rotational axis 35B. For this reason, the capacity $B_2$ increases by the inner end of the seesaw portion 30B getting closer to the fixed electrode 52B, and the capacity $B_1$ decreases by the outer end of the seesaw portion 30B moving away from the fixed electrode 51B. In addition, since the seesaw portion 30D is pulled by the hinge beam 33D, an inner end of the seesaw portion 30D is displaced in the negative direction of the Z axis, and the seesaw portion 30D rotates and is displaced in the βD direction centering on the rotational axis 35D. For this reason, the capacity $D_2$ increases by the inner end of the seesaw portion 30D getting closer to the fixed electrode 52D, and the capacity $D_1$ decreases by the outer end of the seesaw portion 30D moving away from the fixed electrode 51D.

As described above, when the force Fz is applied in the Z direction (an Fz mode), the seesaw portion 30C (first movable portion) rotates in the first direction (for example, βC), and the seesaw portion 30A (second movable portion) rotates in the second direction (for example, αA) opposite to the first direction. In addition, the seesaw portion 30D rotates in a third direction (for example, βD), and the seesaw portion 30B rotates in a fourth direction (for example, αB) opposite to the third direction. Namely, the seesaw portions 30A and 30C that are opposed to each other in the X direction, and the seesaw portions 30B and 30D that are opposed to each other in the Y direction respectively rotate in an opposite direction to each other, and result in opposite phase inclination, which is the inclination in the opposite direction. For this reason, the force Fz applied in the Z direction results in a sum of differentials of each seesaw portion 30 as the following (Expression 1).

$$F_z = \underbrace{(A_1 - A_2)}_{\text{differential}} + \underbrace{(C_1 - C_2)}_{\text{differential}} + \underbrace{(B_1 - B_2)}_{\text{differential}} + \underbrace{(D_1 - D_2)}_{\text{differential}} \quad \text{(Expression 1)}$$

Figure 5A:
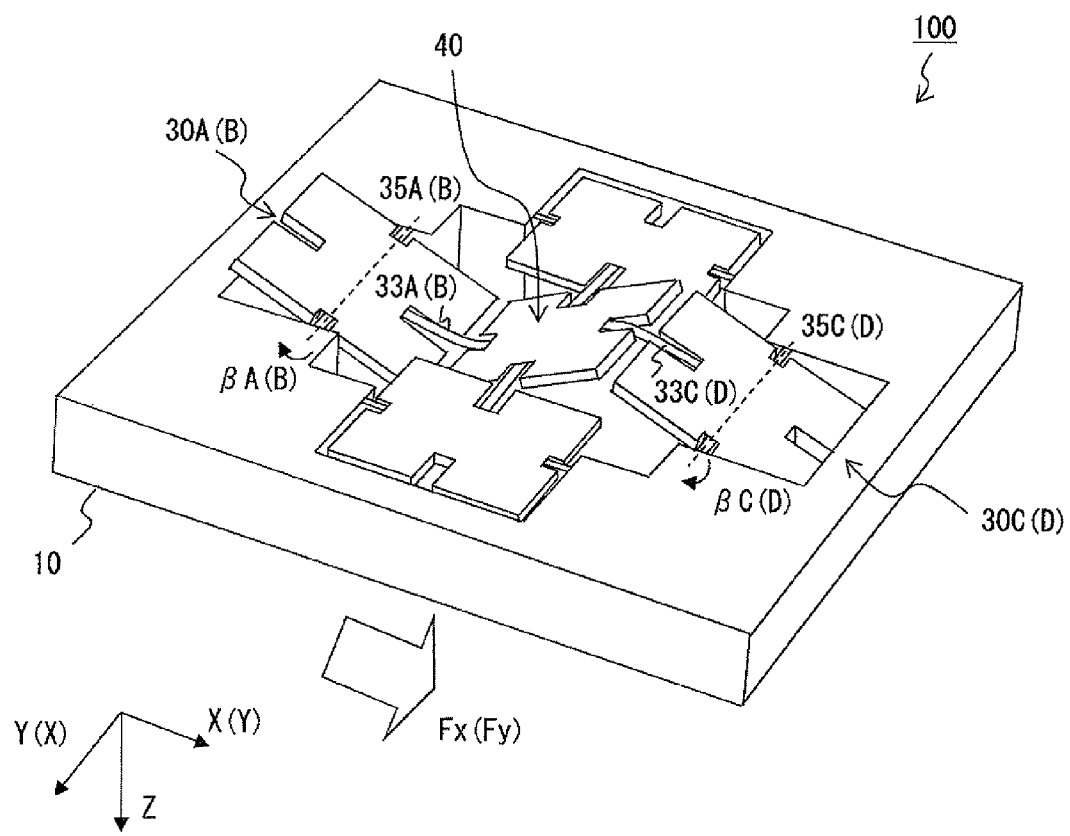
FIG. 5A is a perspective view showing schematically a state of the force sensor according to an embodiment 1 when a force has been applied to the direction of the X axis or the Y axis.
Figure 5B:
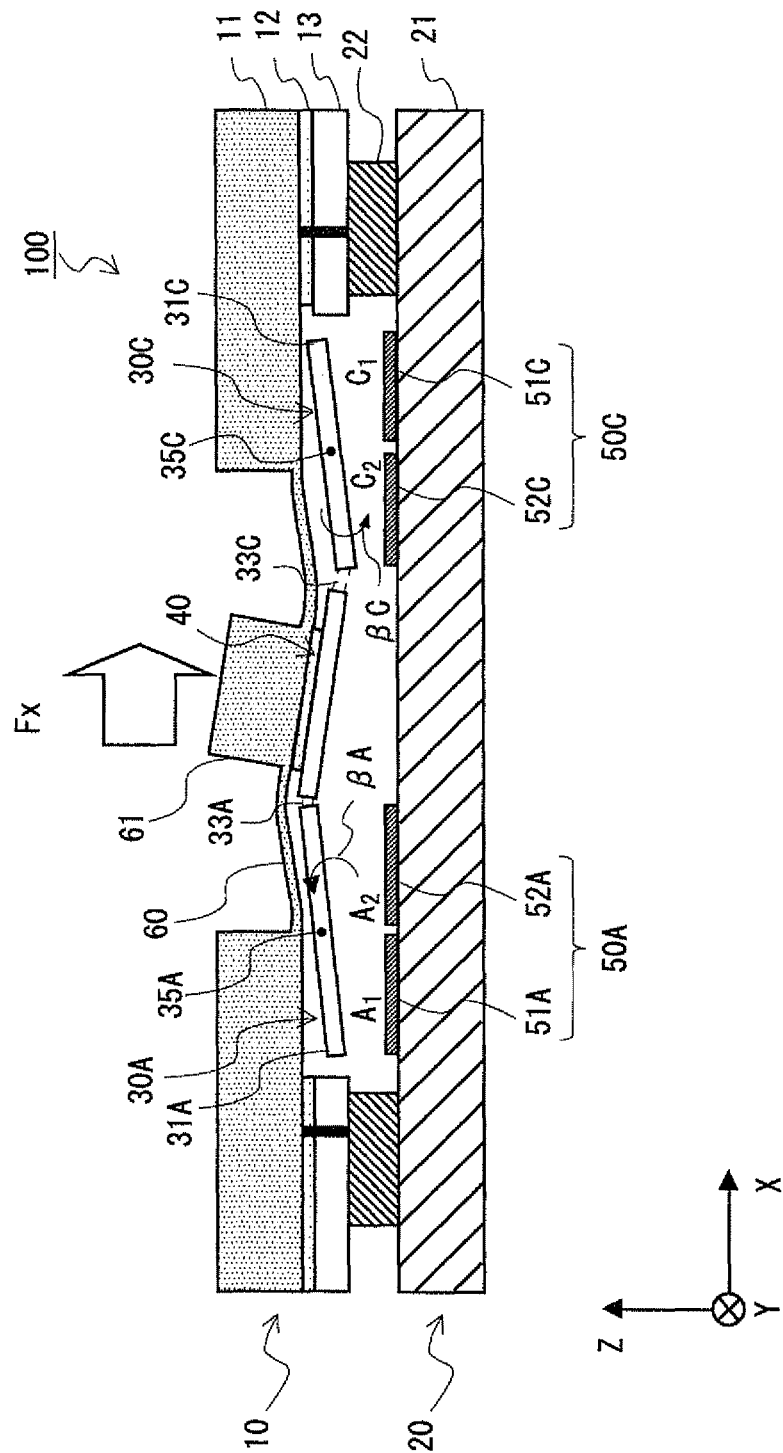
FIG. 5B is a cross-sectional side view showing schematically a state of the force sensor according to an embodiment 1 when a force has been applied to the direction of the X axis.
Figure 5C:
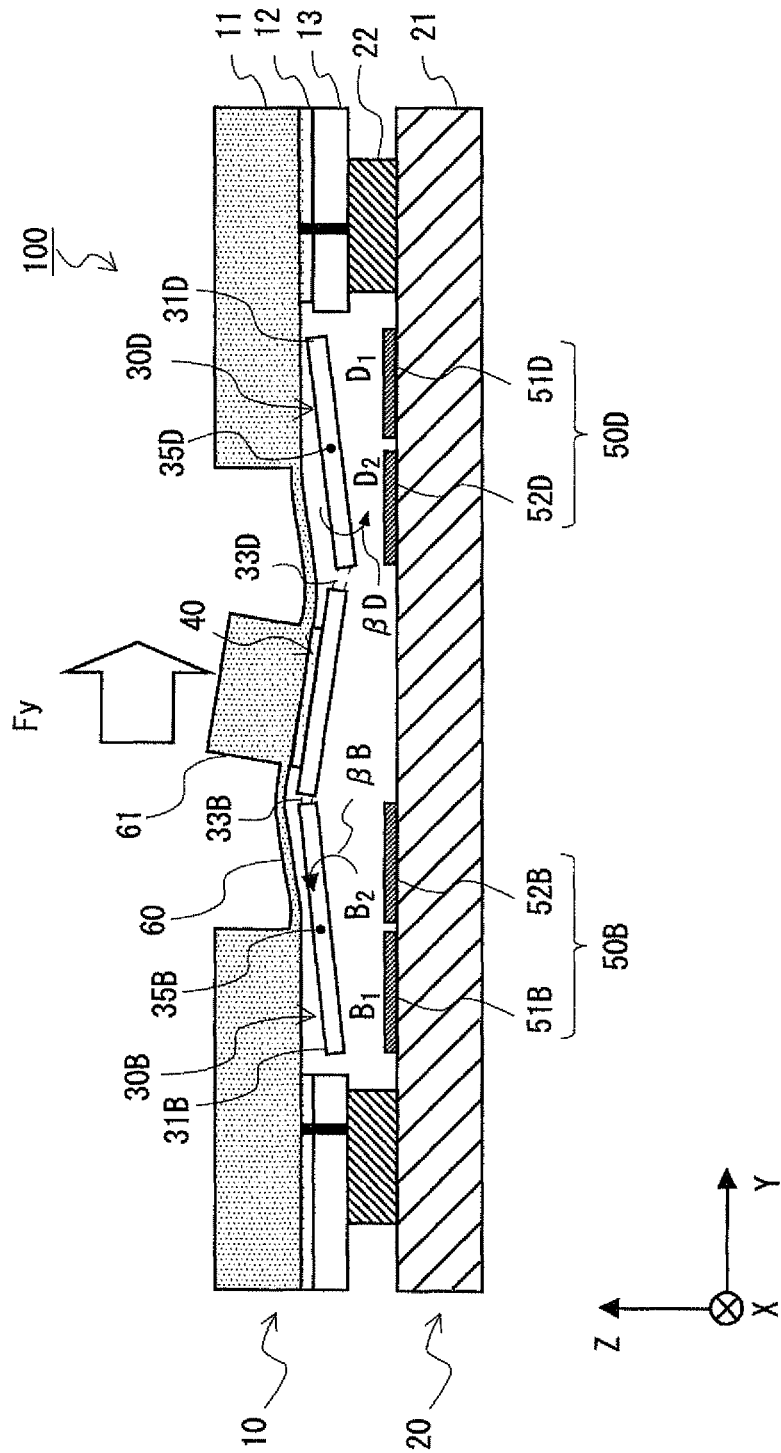
FIG. 5C is a cross-sectional side view showing schematically a state of the force sensor according to an embodiment 1 when a force has been applied to the direction of the Y axis.

FIGS. 5A, 5B, and 5C show a state of the force sensor 100 when a force Fx or a force Fy is applied in the positive direction of the X axis or the Y axis. FIG. 5A is a perspective view when only the movable support portion 10 at the time of applying the force Fx or the force Fy is viewed from the main surface side (bottom surface side), FIG. 5B is a cross-sectional side view viewed from the Y direction at the time of applying the force Fx, and FIG. 5C is a cross-sectional side view viewed from the X direction at the time of applying the force Fy. For example, when the force sensor 100 is arranged at robot skin as a tactile sensor, the force Fx or the force Fy can be detected as a shear force.

As shown in FIGS. 5A and 5B, when the force Fx is applied in the positive direction of the X axis, moment around the Y axis acts on the projection 61 according to a height of the projection 61 and the force Fx, and thus the projection 61 and the force receiving portion 40 are displaced so as to incline obliquely viewed from the Y direction. A negative side of the X axis of the force receiving portion 40 is uplifted to the positive side of the Z axis, and a positive side of the X axis of the force receiving portion 40 is sunk on the negative side of the Z axis. The hinge beam 33A on the X-axis negative side is displaced in the positive direction of the Z axis while bending according to displacement of the force receiving portion 40, and the hinge beam 33C on the X-axis positive side is displaced in the negative direction of the Z axis while bending.

As a result of it, as shown in FIG. 5B, since the seesaw portion 30A is pulled by the hinge beam 33A, the inner end of the seesaw portion 30A is displaced in the positive direction of the Z axis, and the seesaw portion 30A rotates and is displaced in the βA direction centering on the rotational axis 35A. For this reason, the capacity $A_2$ decreases by the inner end of the seesaw portion 30A moving away from the fixed electrode 52A, and the capacity $A_1$ increases by the outer end of the seesaw portion 30A getting closer to the fixed electrode 51A. In addition, since the seesaw portion 30C is pulled by the hinge beam 33C, the inner end of the seesaw portion 30C is displaced in the negative direction of the Z axis, and the seesaw portion 30C is rotated and displaced in the βC direction centering on the rotational axis 35C. For this reason, the capacity $C_2$ increases by the inner end of the seesaw portion 30C getting closer to the fixed electrode 52C, and the capacity $C_1$ decreases by the outer end of the seesaw portion 30C moving away from the fixed electrode 51C.

At this time, the force receiving portion 40 rotates and is displaced, with the hinge beams 33B and 33D extending in the Y direction being set as an axis. Since the hinge beams 33B and 33D can be easily twisted around the Y axis, they do not block rotation of the force receiving portion 40. In addition, the seesaw portions 30B and 30D are not displaced since the hinge beams 33B and 33D are twisted. As described above, the force Fx in the X-axis direction can be effectively detected, cross talk in the Y-axis direction can be suppressed.

As described above, when the force Fx is applied in the X direction (an Fx mode), the seesaw portion 30C (first movable portion) rotates in the first direction (for example, βC), and the seesaw portion 30A (second movable portion) rotates in the same direction as the first direction, or in the opposite direction (for example, βA) to the second direction (for example, αA). Namely, the seesaw portions 30A and 30C that are opposed to each other in the X direction rotate in the same direction, and result in the same phase inclination, which is the inclination in the same direction. In addition, the seesaw portions 30B and 30D are not displaced. For this reason, the force Fx is calculated by subtraction of differentials in the seesaw portions 30A and 30C as the following (Expression 2).

$$F_x = \underbrace{(A_1 - A_2)}_{\text{differential}} - \underbrace{(C_1 - C_2)}_{\text{differential}} \quad \text{(Expression 2)}$$

As shown in FIGS. 5A and 5C, when the force Fy is applied in the positive direction of the Y axis, moment around the X axis acts on the projection 61 according to the height of the projection 61 and the force Fy, and thus the projection 61 and the force receiving portion 40 are displaced so as to incline obliquely viewed from the X direction. A negative side of the Y axis of the force receiving portion 40 is uplifted to the positive side of the Z axis, and a positive side of the Y axis of the force receiving portion 40 is sunk on the negative side of the Z axis. The hinge beam 33B on the Y-axis negative side is displaced in the positive direction of the Z axis while bending according to displacement of the force receiving portion 40, and the hinge beam 33D on the Y-axis positive side is displaced in the negative direction of the Z axis while bending.

As a result of it, as shown in FIG. 5C, since the seesaw portion 30B is pulled by the hinge beam 33B, an inner end of the seesaw portion 30B is displaced in the positive direction of the Z axis, and the seesaw portion 30B rotates and is displaced in the βB direction centering on the rotational axis 35B. For this reason, the capacity $B_2$ decreases by the inner end of the seesaw portion 30B moving away from the fixed electrode 52B, and the capacity $B_1$ increases by the outer end of the seesaw portion 30B getting closer to the fixed electrode 51B. In addition, since the seesaw portion 30D is pulled by the hinge beam 33D, the inner end of the seesaw portion 30D is displaced in the negative direction of the Z axis, and the seesaw portion 30D rotates and is displaced in the βD direction centering on the rotational axis 35D. For this reason, the capacity $D_2$ increases by the inner end of the seesaw portion 30D getting closer to the fixed electrode 52D, and the capacity $D_1$ decreases by the outer end of the seesaw portion 30D moving away from the fixed electrode 51D.

At this time, the force receiving portion 40 rotates and is displaced, with the hinge beams 33A and 33C extending in the X direction being set as an axis. Since the hinge beams 33A and 33C can be easily twisted around the X axis, they do not block rotation of the force receiving portion 40. In addition, the seesaw portions 30A and 30C are not displaced since the hinge beams 33A and 33C are twisted. As described above, the force Fy in the Y-axis direction can be effectively detected, cross talk in the X-axis direction can be suppressed.

As described above, when the force Fy is applied in the Y direction (an Fy mode), the seesaw portion 30D rotates in the third direction (for example, βD), and the seesaw portion 30B rotates in the same direction as the third direction, or in the opposite direction (for example, βB) to the fourth direction (for example, αB). Namely, the seesaw portions 30B and 30D that are opposed to each other in the Y direction rotate in the same direction, and result in the same phase inclination, which is the inclination in the same direction. In addition, the seesaw portions 30A and 30C are not displaced. For this reason, the force Fy is calculated by subtraction of differentials in the seesaw portions 30B and 30D as the following (Expression 3).

$$F_y = \underbrace{(B_1 - B_2)}_{\text{differential}} - \underbrace{(D_1 - D_2)}_{\text{differential}} \quad \text{(Expression 3)}$$

According to (Expression 1) to (Expression 3), in the embodiment, matrix operation is performed as in the following (Expression 4) to calculate a force in each direction. Matrix operation can be achieved by a hardware including an analog circuit and a digital circuit, a software, or both thereof. For example, an operation circuit that performs matrix operation may be incorporated in the sealing substrate 21, or may be achieved by an external microcomputer or the like.

$$\begin{pmatrix} Fx \\ Fy \\ Fz \\ 0 \end{pmatrix} = \frac{1}{4} \cdot \underbrace{\begin{pmatrix} 2 & 0 & -2 & 0 \\ 0 & 2 & 0 & -2 \\ 1 & 1 & 1 & 1 \\ 0 & 0 & 0 & 0 \end{pmatrix}}_{\text{transformation matrix}} \cdot \underbrace{\begin{pmatrix} A_1 - A_2 \\ B_1 - B_2 \\ C_1 - C_2 \\ D_1 - D_2 \end{pmatrix}}_{\text{differential}} \quad \text{(Expression 4)}$$

As in (Expression 4), the force in each direction is obtained by multiplying a differential (capacity difference) of each capacity by a transformation matrix. In (Expression 4), a coefficient of each differential is set as 2 in operation of the force Fx and the force Fy, and a coefficient of each differential is set as 1 in operation of the force Fz. This is by the following reason: while the seesaw portions in all the directions can move and differential values of all the capacities change in the case of the force Fz, only two seesaw portions in the X direction or in the Y direction can move, and only two differential values change in the case of the force Fx and the force Fy, so that detection sensitivity of the force Fz becomes twice as large as detection sensitivity of the force Fx and the force Fy. The coefficient of the transformation matrix is set according to sensitivity in a direction of a force to be detected, and thereby a force can be accurately detected.

An effect of the embodiment in the above configuration will be explained. In the conventional technology, although a structure to be able to detect triaxial forces has been developed, there is a problem in accuracy of linearity of output values, an offset, and the like. In addition, a sealing structure for protecting a movable portion from an outside air at the time of use of a sensor is essential in a MEMS sensor having the movable portion. However, in a case where a structure is the one hard to be sealed, when the sensor is attached to a robot and is made to work, foreign matters enter a movable body or an electrode of a sensing portion, and a problem leading to malfunction occurs.

For example, in Japanese Unexamined Patent Application Publication No. 2004-61280, differential detection of the force Fz in the Z direction cannot be performed although the forces of triple axes (Fx, Fy, Fz) can be detected, thus affecting accuracy of the Z axis. In addition, in Japanese Unexamined Patent Application Publication No. 2004-61280, a structure is employed where sealing at the time of implementation is hard to perform since a sensor has a structure where both sides thereof penetrate to each other. Accordingly, when the structure is used for a force sensor that directly comes into contact with an object, there is a possibility that foreign matters enter the movable body.

Consequently, in the embodiment, a movable electrode is set as a seesaw portion having a seesaw structure, the two seesaw portions are arranged in the X direction and the Y direction, respectively, and a fixed electrode is arranged at a position opposed to the seesaw portion. Furthermore, matrix operation of a differential capacity of each seesaw portion is performed, and the differential capacity is resolved into forces in triaxial directions. As a result of this, since using an electric capacity scheme, the triaxial forces in the X direction, the Y direction, and the Z direction can be detected, and differential detection can be performed to all the axes, forces can be accurately detected in all the triple axes.

In addition, since the seesaw structure is employed, the force sensor can be made to have the sealing structure by utilizing a diaphragm. Furthermore, since a microstructure as a comb is not needed, the structure is hard to break. Furthermore, a force receiving portion is provided, thereby a point on which a force acts can be specified, and detection accuracy improves.

Embodiment 2

Figure 6A:
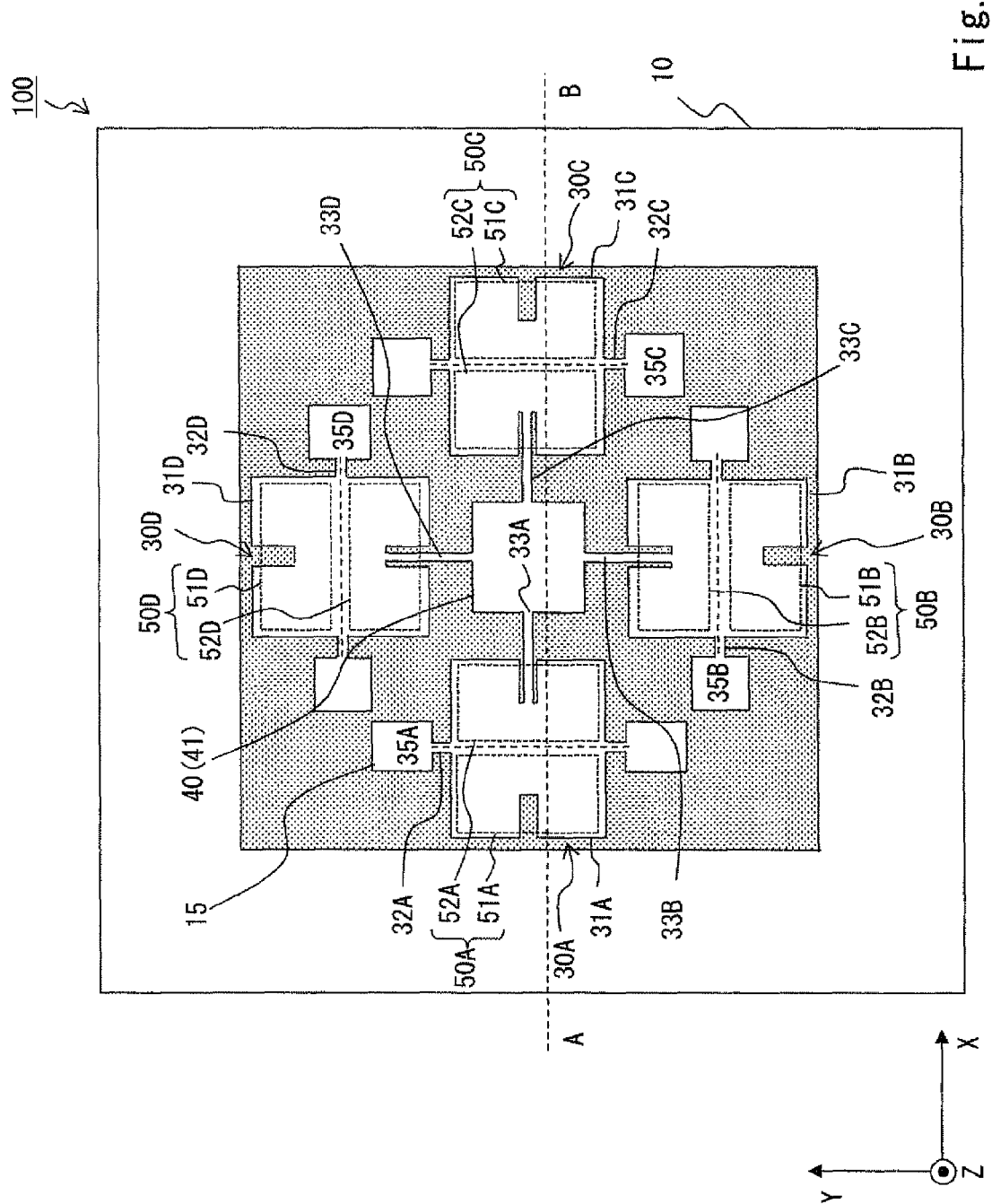
FIG. 6A is a schematic top view of a force sensor according to an embodiment 2.
Figure 6B:
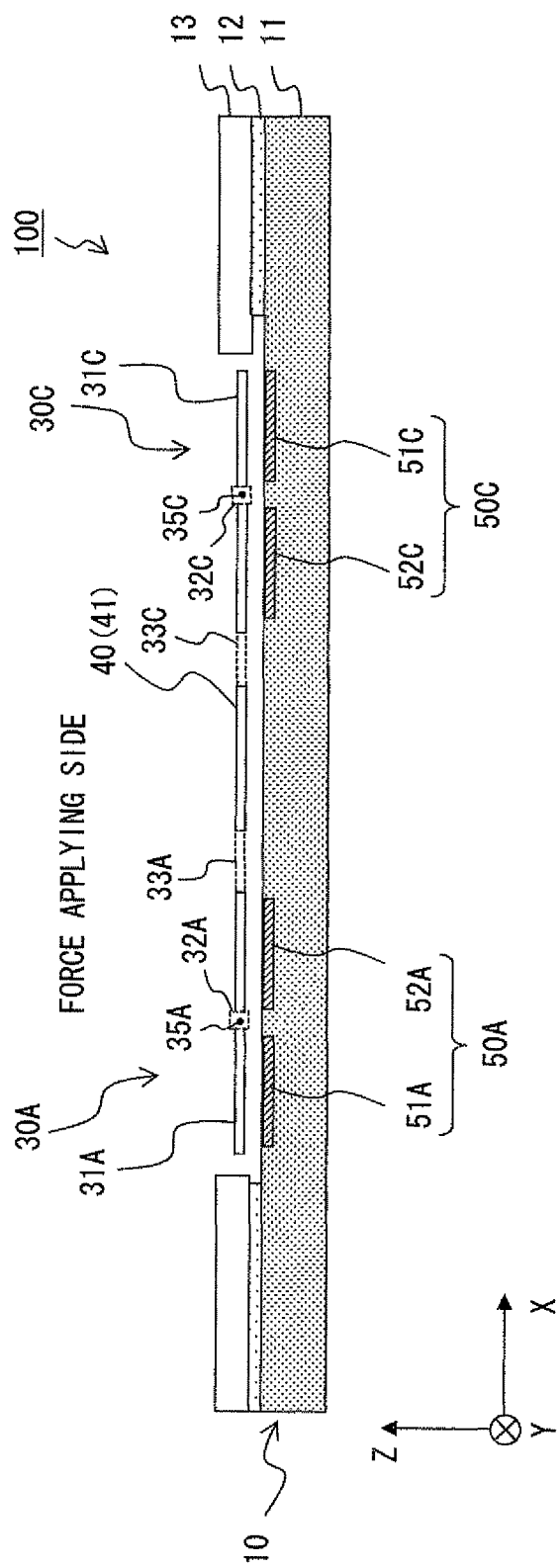
FIG. 6B is a schematic cross-sectional side view of the force sensor according to an embodiment 2.

Hereinafter, an embodiment 2 will be explained with reference to the drawings. The embodiment is an example where the force sensor includes only a movable support portion with respect to the embodiment 1. FIG. 6A is a top view of the force sensor 100 pertaining to the embodiment. FIG. 6B is a cross-sectional side view taken along the line A-B of the force sensor 100 in FIG. 6A.

As shown in FIGS. 6A and 6B, the force sensor 100 according to the embodiment does not have a sealing portion, but is provided with only the movable support portion 10. In addition, since a force is applied from a side (main surface side) on which a force receiving portion and a seesaw portion are arranged, a force applying direction (orientation of the Z direction) is opposite as compared with the embodiment 1.

The movable support portion 10 is mainly provided with the seesaw portions 30A to 30D, the force receiving portion 40, and the fixed electrode pairs 50A to 50D, and is not provided with a diaphragm and a projection. Similarly to the embodiment 1, the movable support portion 10 is provided with the first silicon layer 11, the insulator film 12, and the second silicon layer 13. At the second silicon layer 13, the force receiving portion 40 is formed in a center, and the four seesaw portions 30A to 30D are formed around the force receiving portion 40. The force receiving portion 40 and the seesaw portions 30A to 30D are coupled to one another by the hinge beams 33A to 33D, respectively. In this example, the force receiving portion 40 does not have the stopper 42, but includes only the force receiving plate 41. Since not bonded to the first silicon layer 11, the force receiving portion 40 has a structure supported by the seesaw portions 30A to 30D by means of the hinge beams 33A to 33D.

The movable electrodes 31A to 31D of the seesaw portions 30A to 30D are fixed to the fixing portion 15 by the torsion beams 32A to 32D. In the embodiment, the fixing portion 15 is formed for each torsion beam 32 (for each seesaw portion). The fixing portion 15 has a quadrangular shape in a top view, and is formed by etching the second silicon layer 13.

In addition, in the embodiment, the fixed electrode pairs 50A to 50D are formed on a main surface of the first silicon layer 11. Similarly to the embodiment 1, the fixed electrode pairs 50A to 50D include the fixed electrodes 51A and 52A, 51B and 52B, 51C and 52C, and 51D and 52D, respectively, and are arranged at positions corresponding to the movable electrodes 31A to 31D of the seesaw portions 30A to 30D. The fixed electrodes 51A to 51D and 52A to 52D, for example, each have a substantially rectangular shape in a top view, and are formed by implant or the like. For example, an external connection terminal is fabricated around the second silicon layer 13, a TSV (Through Silicon Via) connected to the fixed electrodes 51 and 52 is fabricated in a thickness direction of the first silicon layer 11, the TSV is connected to an external detection circuit or the like, and thereby electric capacities between the movable electrode 31, and the fixed electrodes 51 and 52 can be detected.

Figure 7:
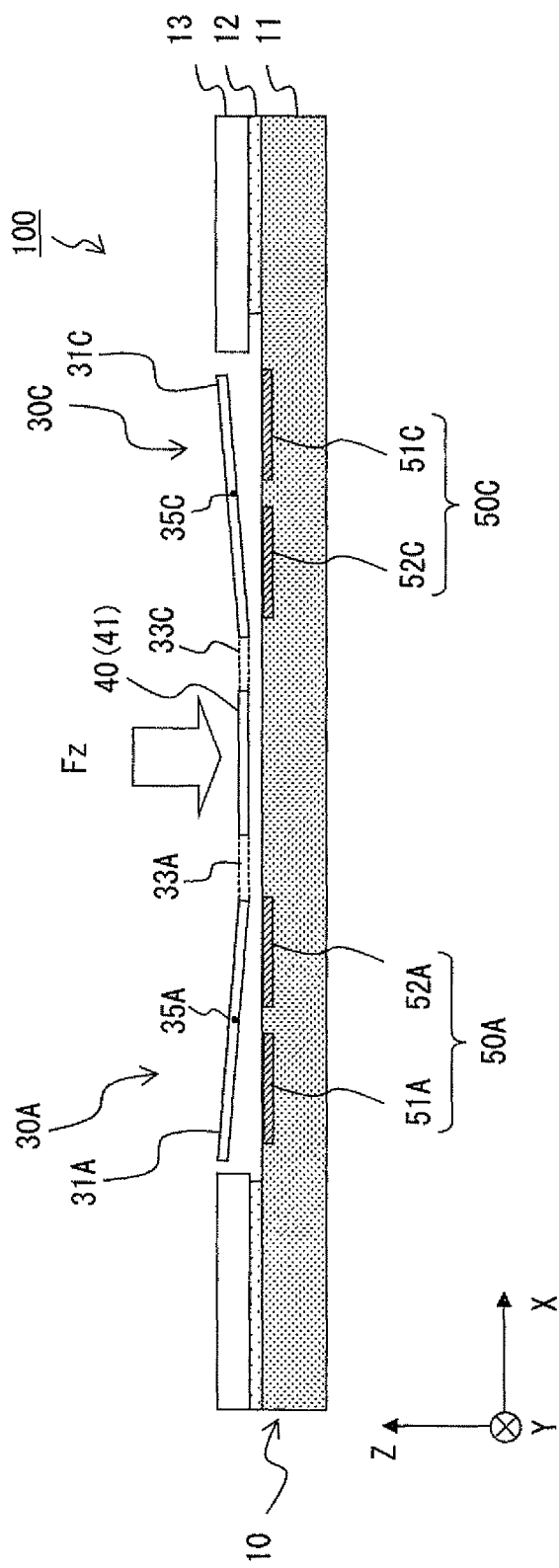
FIG. 7 is a cross-sectional side view showing schematically a state of the force sensor according to an embodiment 2 when a force has been applied to the direction of the Z axis.

An operating principle of the embodiment is similar to that of the embodiment 1. For example, in a state where the force Fz is applied in the negative direction of the Z axis, the seesaw portions 30A and 30C operate as FIG. 7. When the force Fz is applied in the negative direction of the Z axis, the force receiving portion 40 is displaced so as to sink in the negative direction of the Z axis according to the applied force. The inner ends of the seesaw portions 30A to 30D are displaced in the negative direction of the Z axis according to displacement of the force receiving portion 40, and the outer ends of the seesaw portions 30A to 30D are displaced in the positive direction of the Z axis. Namely, when the force Fz is applied in the Z direction (an Fz mode), the seesaw portions 30A and 30C, and the seesaw portions 30B and 30D mutually rotate in opposite directions.

In addition, also when the force Fx is applied in the X-axis direction, and the force Fy is in the Y-axis direction, similarly to the embodiment 1, the seesaw portions 30A and 30C, or the seesaw portions 30B and 30D rotate in the same direction. Accordingly, also in the embodiment, triaxial forces can be detected by the similar principle to the embodiment 1.

As described above, in the embodiment, in a force sensor not having a sealing portion, a movable electrode is set as a seesaw portion having a seesaw structure, the two seesaw portions are arranged in the X direction and the Y direction, respectively, and a fixed electrode pair is arranged at a position opposed to the seesaw portion. In addition, four seesaw portions and the force receiving portions are coupled to one another by the hinge beams. As a result of this, similarly to the embodiment 1, since using the electric capacity scheme, the triaxial forces in the X direction, the Y direction, and the Z direction can be detected, and differential detection can be performed to all the axes, forces can be accurately detected in all the triple axes. In addition, since a microstructure as a comb is not needed, the structure is hard to break. Furthermore, a point on which a force acts can be specified by the force receiving portion, and detection accuracy improves.

In addition, the hinge beam that couples the force receiving portion and the seesaw portion has a structure to be able to bend and is twisted, and it extends vertically to a rotational axis of a torsion beam. As a result of this, displacement of the force receiving portion can be accurately transmitted to the seesaw portion, and destruction of each member due to force application can be prevented.

In addition, the force receiving portion has a centrosymmetry structure by being surrounded by the four seesaw portions, and the seesaw portions are orthogonally arranged. As a result of this, symmetrical deformation can be made according to a force, and the force can be accurately detected.

Embodiment 3

Figure 8A:
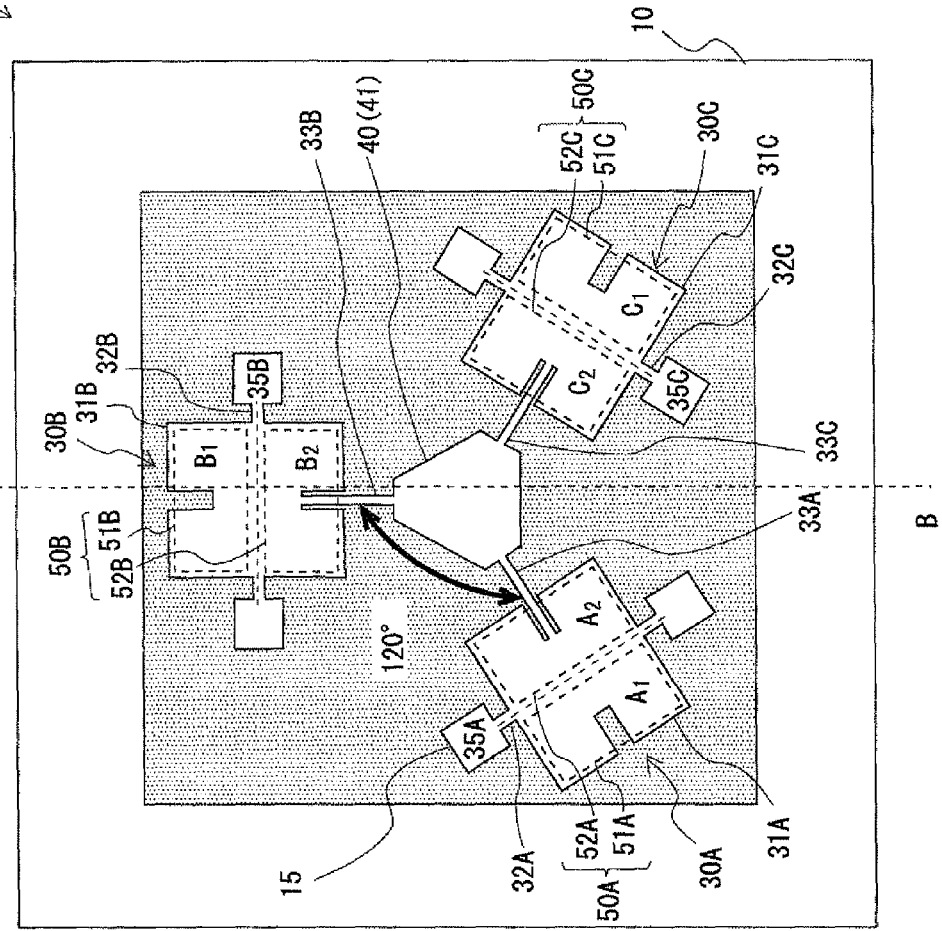
FIG. 8A is a schematic top view of a force sensor according to an embodiment 3.
Figure 8B:
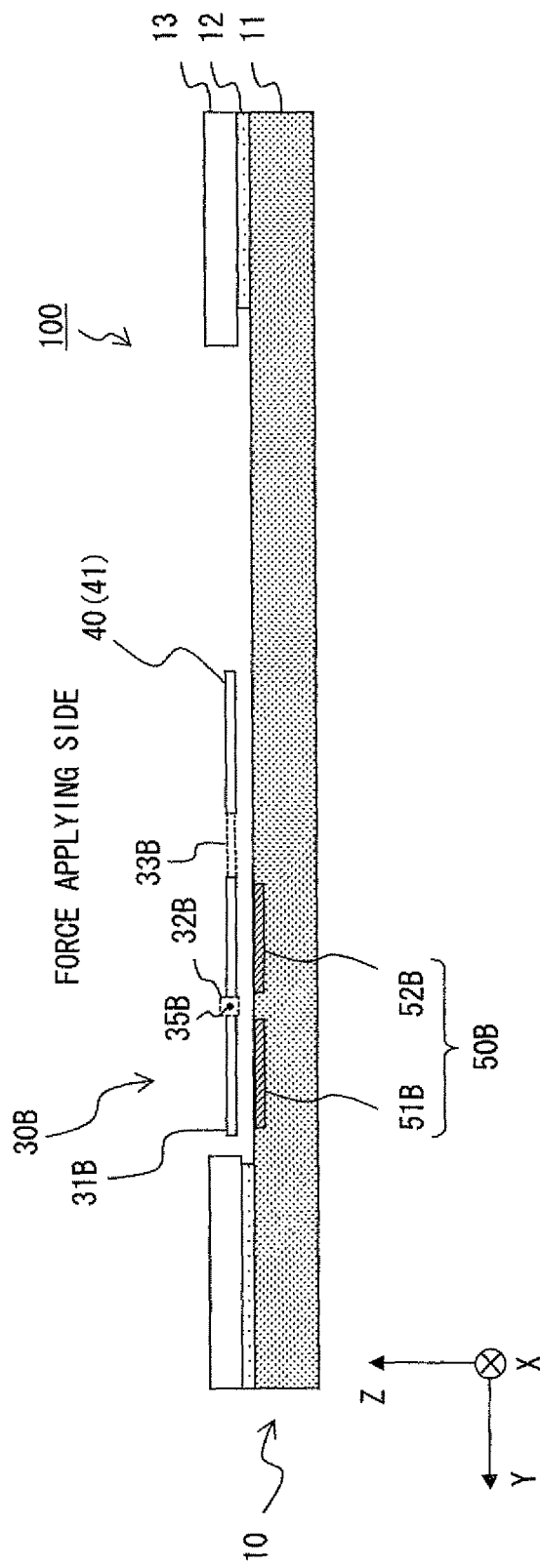
FIG. 8B is a schematic cross-sectional side view of the force sensor according to an embodiment 3.

Hereinafter, an embodiment 3 will be explained with reference to the drawings. The embodiment is an example where the force sensor includes three seesaw portions with respect to the embodiment 2. FIG. 8A is a top view of the force sensor 100 pertaining to the embodiment. FIG. 8B is a cross-sectional side view taken along the line A-B of the force sensor 100 in FIG. 8A.

As shown in FIGS. 8A and 8B, the force sensor 100 according to the embodiment is provided with only the movable support portion 10 similarly to the embodiment 2. The movable support portion 10 is mainly provided with the seesaw portions 30A to 30C, the force receiving portion 40, and the fixed electrode pairs 50A to 50C. The movable support portion 10 is provided with the first silicon layer 11, the insulator film 12, and the second silicon layer 13. At the second silicon layer 13, the force receiving portion 40 is formed in a center, and the three seesaw portions 30A to 30C are formed around the force receiving portion 40. In order to form a symmetrical structure centering on the force receiving portion 40, the seesaw portions 30A to 30C are arranged at an interval of 120 degrees centering on the force receiving portion 40.

The force receiving portion 40 and the seesaw portions 30A to 30C are coupled to one another by the hinge beams 33A to 33C, respectively. Similarly to the embodiment 2, the force receiving portion 40 includes only the force receiving plate 41, and is supported by the seesaw portions 30A to 30C by means of the hinge beams 33A to 33C. In order to equally transmit a force to the three seesaw portions 30A to 30C, the force receiving portion 40 is formed substantially in a triangular shape in a top view, and the hinge beams 33A to 33C are combined with each top portion of the triangle. The movable electrodes 31A to 31C of the seesaw portions 30A to 30C are fixed to the fixing portion 15 by the torsion beams 32. Similarly to the embodiment 2, the fixing portion 15 is formed for each torsion beam 32 (for each seesaw portion).

The fixed electrode pairs 50A to 50C are formed on the main surface of the first silicon layer 11. The fixed electrode pairs 50A to 50C include the fixed electrodes 51A and 52A, 51B and 52B, and 51C and 52C, respectively, and are arranged at positions corresponding to the movable electrodes 31A to 31C of the seesaw portions 30A to 30C.

An operating principle of the embodiment is similar to those of the embodiments 1 and 2. For example, when the force Fz is applied in the negative direction of the Z axis, according to displacement of the force receiving portion 40, the inner ends of the seesaw portions 30A to 30C are displaced in the negative direction of the Z axis, and the outer ends of the seesaw portions 30A to 30C are displaced in the positive direction of the Z axis. In addition, when the force Fx is applied in the positive direction of the X axis, according to displacement of the force receiving portion 40, the inner end of the seesaw portion 30A is displaced in the positive direction of the Z axis, the inner end of the seesaw portion 30C is displaced in the negative direction of the Z axis, and the seesaw portions 30B is not displaced. In addition, when the force Fy is applied in the positive direction of the Y axis, according to displacement of the force receiving portion 40, the inner ends of the seesaw portions 30A and 30C are displaced in the positive direction of the Z axis, and the inner end of the seesaw portion 30B is displaced in the negative direction of the Z axis.

For this reason, in the embodiment, matrix operation is performed as in the following (Expression 5) to calculate a force in each direction.

$$\begin{pmatrix} Fx \\ Fy \\ Fz \end{pmatrix} = \underbrace{\begin{pmatrix} \frac{1}{2} & 0 & -\frac{1}{2} \\ -\frac{1}{4} & \frac{1}{2} & -\frac{1}{4} \\ \frac{1}{3} & \frac{1}{3} & \frac{1}{3} \end{pmatrix}}_{\text{transformation matrix}} \cdot \underbrace{\begin{pmatrix} A_1 - A_2 \\ B_1 - B_2 \\ C_1 - C_2 \end{pmatrix}}_{\text{differential}} \quad \text{(Expression 5)}$$

As in (Expression 5), forces in the three directions are obtained by multiplying a differential (capacity difference) of three capacities by a transformation matrix. A coefficient used for operation is decided by positions (angles) where the seesaw portions 30A to 30C are arranged, and operation of the seesaw portions 30A to 30C according to orientation of an added force.

As described above, even when at least three seesaw portions are provided, similarly to the embodiments 1 and 2, triaxial forces can be detected, and differential detection can be performed to all the axes, and thus the forces can be accurately detected. In addition, since a microstructure as a comb is not needed, the structure is hard to break. Furthermore, a point on which a force acts can be specified by the force receiving portion, and detection accuracy improves.

Embodiment 4

Figure 9A:
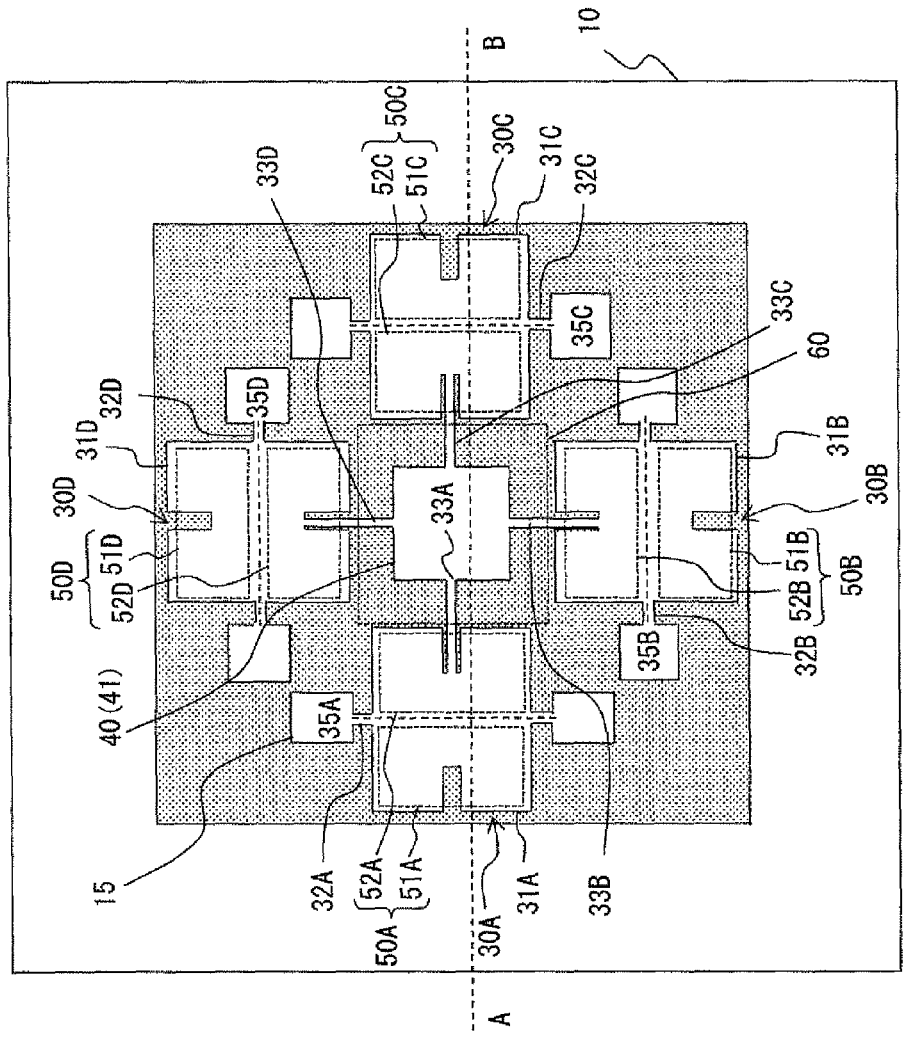
FIG. 9A is a schematic top view of a force sensor according to an embodiment 4.
Figure 9B:
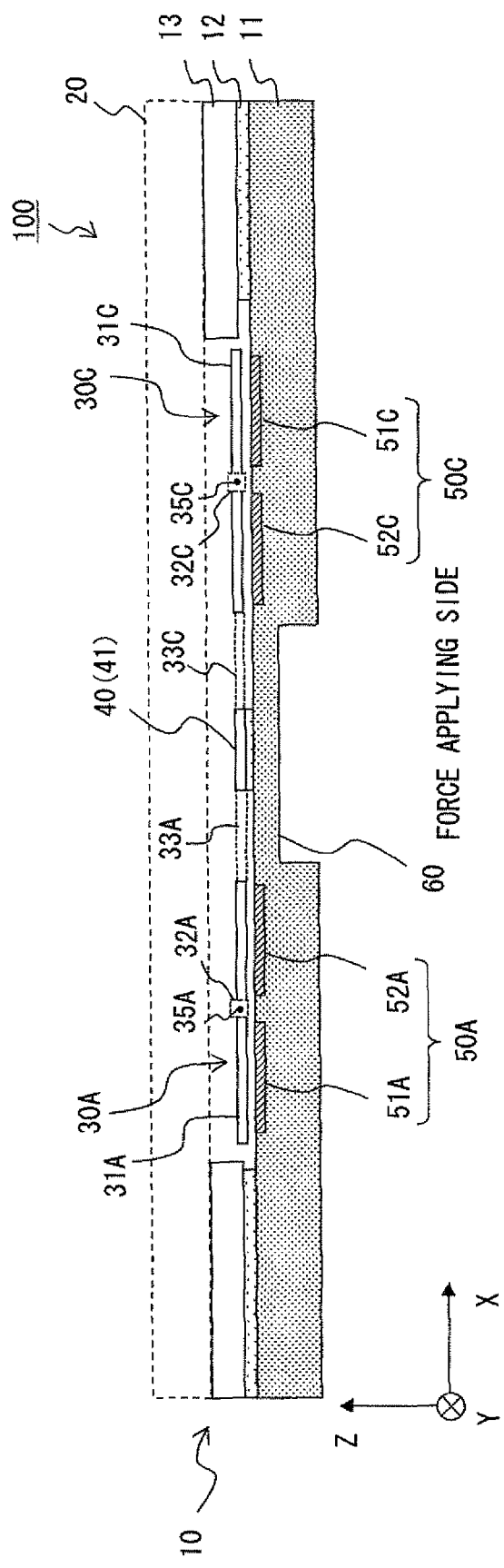
FIG. 9B is a schematic cross-sectional side view of the force sensor according to an embodiment 4.

Hereinafter, an embodiment 4 will be explained with reference to the drawings. The embodiment is an example where a diaphragm has been formed at a support substrate with respect to the force sensor of the embodiment 2. FIG. 9A is a top view of the force sensor 100 pertaining to the embodiment. FIG. 9B is a cross-sectional side view taken along the line A-B of the force sensor 100 in FIG. 9A.

As shown in FIGS. 9A and 9B, the force sensor 100 according to the embodiment is provided with only the movable support portion 10. In order to apply a force from the first silicon layer side (back surface side), a force applying direction is opposite as compared with the embodiment 2.

The movable support portion 10 is mainly provided with the seesaw portions 30A to 30D, the force receiving portion 40, the fixed electrode pairs 50A to 50D, and the diaphragm 60. Similarly to the embodiment 1, the diaphragm 60 is formed in the center of the first silicon layer 11. A force is applied to this diaphragm 60.

In addition, the force receiving portion 40 is bonded to the diaphragm 60 (first silicon layer 11) through the insulator film 12. As a result of this, the force applied to the diaphragm 60 is transmitted to the force receiving portion 40.

The other operation is similar to the embodiment 2. In addition, in order to apply a force to the diaphragm 60, the force receiving portion and the main surface on the seesaw portion side may be sealed by the sealing portion 20. An operating principle of the embodiment is similar to those of the embodiments 1 and 2.

As described above, in the embodiment, the diaphragm is formed at the first silicon layer with respect to a configuration of the embodiment 2. As a result of this, force application from a surface opposite to a seesaw portion fabricating surface can be performed in addition to the effect of the embodiment 2. Accordingly, there is no possibility that a force applying object comes into contact with machine structures, such as the seesaw portion, and a force can be transmitted even if the force receiving portion and the main surface on the seesaw portion side are implemented so as to be sealed.

Embodiment 5

Hereinafter, an embodiment 5 will be explained with reference to the drawings. The embodiment is an example where a projection has been formed with respect to the force sensor of the embodiments 2 and 4.

Figure 10:
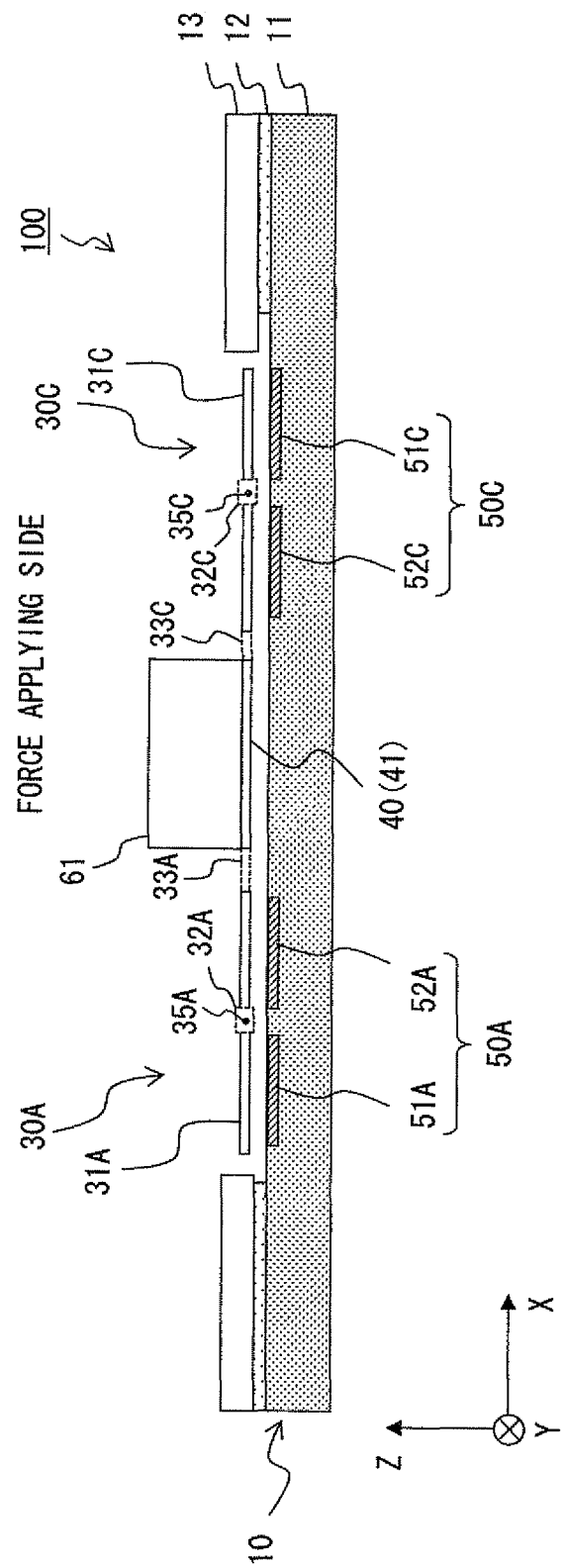
FIG. 10 is a schematic cross-sectional side view of a force sensor according to an embodiment 5.

FIG. 10 is one example of a cross-sectional side view of the force sensor 100 pertaining to the embodiment. FIG. 10 is the example where the projection has been added to the force sensor of FIG. 6B of the embodiment 2. As shown in FIG. 10, in the embodiment, the projection 61 is formed on a force applying side (positive side of the Z axis) of the force receiving portion 40. The projection 61 has the same substantially square shape as the force receiving portion 40 in a top view. A thickness (height) of the projection 61 is thicker than that of the second silicon layer 13, and the projection 61 projects. Force detection sensitivity can be improved by forming the projection 61 thicker.

Figure 11:
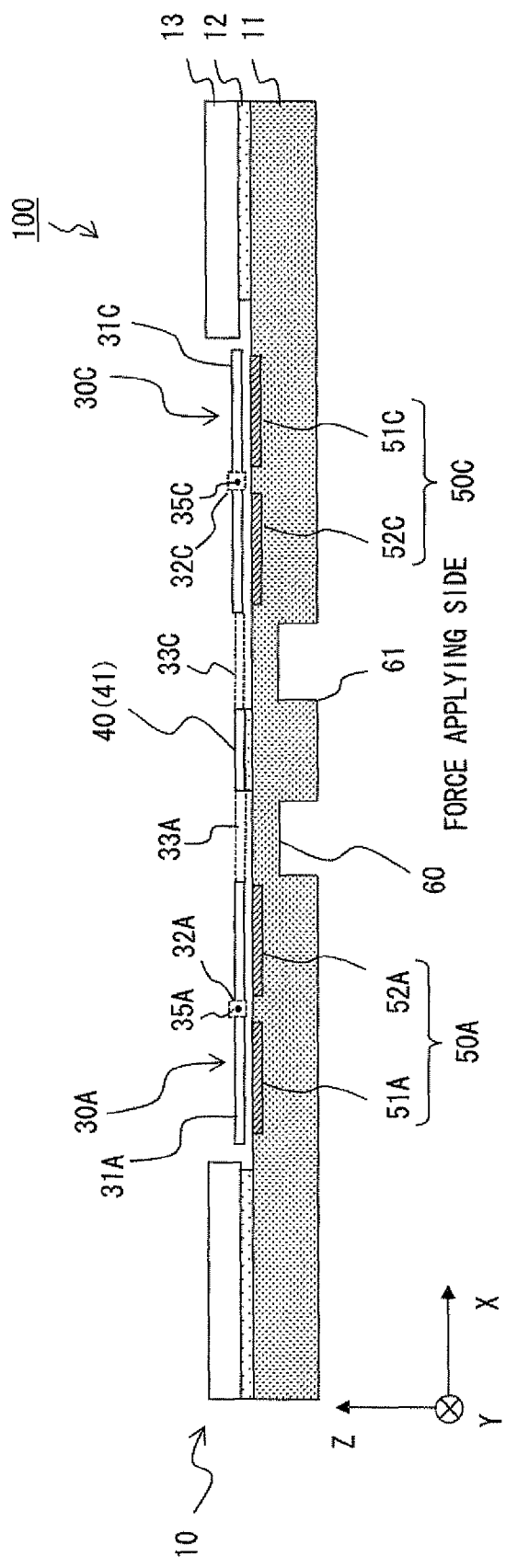
FIG. 11 is a schematic cross-sectional side view of the force sensor according to an embodiment 5.

FIG. 11 is an other example of a cross-sectional side view of the force sensor 100 pertaining to the embodiment. FIG. 11 is the example where the projection has been added to the force sensor of FIG. 9B of the embodiment 4. As shown in FIG. 11, similarly to the embodiment 1, the projection 61 is formed on a force applying side (negative side of the Z axis) in the center of the diaphragm 60. The projection 61 has the same substantially square shape as the force receiving portion 40 in a bottom view. A thickness (height) of the projection 61 is substantially the same as the first silicon layer 11. Since the projection 61 is thicker than the diaphragm 60 and projects, force detection sensitivity improves. The projection 61 may be made thicker to further improve the force detection sensitivity.

As described above, in the embodiment, the projection connected to the force receiving portion is formed with respect to the embodiments 2 and 4. As a result of this, since a height of a surface of the force receiving portion can be increased in addition to effects of the embodiments 2 and 4, when the force sensor 100 receives the forces Fx and Fy, moment becomes larger, inclination of the force receiving portion is expanded, and thereby force sensitivity improves. In addition, since a force applying portion can be limited by the projection, a force can be accurately detected.

Embodiment 6

Hereinafter, an embodiment 6 will be explained with reference to the drawings. The embodiment is an example where the force sensor of FIG. 11 of the embodiment 5 is further provided with the sealing portion 20. FIG. 12A is a perspective view of a bottom surface of the force sensor 100 according to the embodiment in which a sealing substrate has been omitted.

Figure 12B:
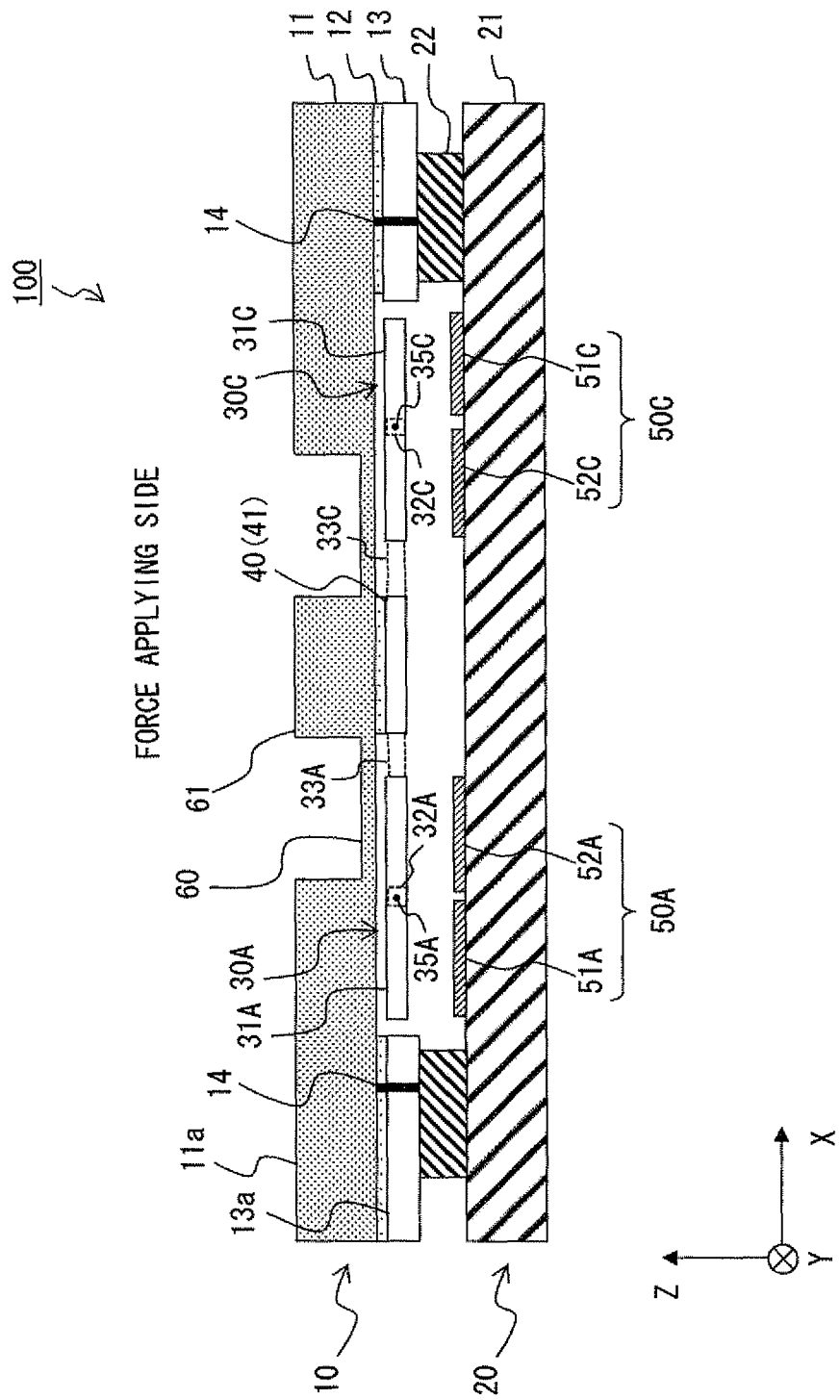
FIG. 12B is a schematic cross-sectional side view of the force sensor according to an embodiment 6.

FIG. 12B is a cross-sectional side view taken along the line A-B of the force sensor 100 in FIG. 12A.

As shown in FIGS. 12A and 12B, the force sensor 100 according to the embodiment is provided with the movable support portion 10 and the sealing portion 20 similarly to the embodiment 1, and the movable support portion 10 and the sealing portion 20 are sealed and bonded by the bonding portion 22.

The movable support portion 10 is mainly provided with the seesaw portions 30A to 30D, the force receiving portion 40, the diaphragm 60, and the projection 61. The sealing portion 20 is mainly provided with the sealing substrate 21 and the fixed electrode pairs 50A to 50D. Similarly to the embodiment 1, the fixed electrode pairs 50A to 50D including the fixed electrodes 51A to 51D and 52A to 52D are formed on the main surface of the sealing substrate 21. The fixed electrodes 51A to 51D and 52A to 52D each have a substantially rectangular shape in a top view. In addition, similarly to the embodiment 1, the penetrating electrodes 14 are formed in the periphery 13a of the second silicon layer 13.

As described above, in the embodiment, the force sensor 100 is provided with the sealing portion 20 with respect to the configurations of the embodiments 4 and 5, and the fixed electrode is formed on a sealing portion side. As a result of this, the force sensor can be sealed in addition to the effects of the embodiments 4 and 5, and mixing of dirt in the seesaw portion or the like, and breakage can be prevented. Deformation of the fixed electrode due to deformation of the support substrate can be prevented by fabricating the fixed electrode on the sealing substrate, and a force can be accurately detected. Since the fixed electrode is fabricated on the sealing substrate, the diaphragm on the support substrate side can be widely fabricated.

Embodiment 7

Figure 13A:
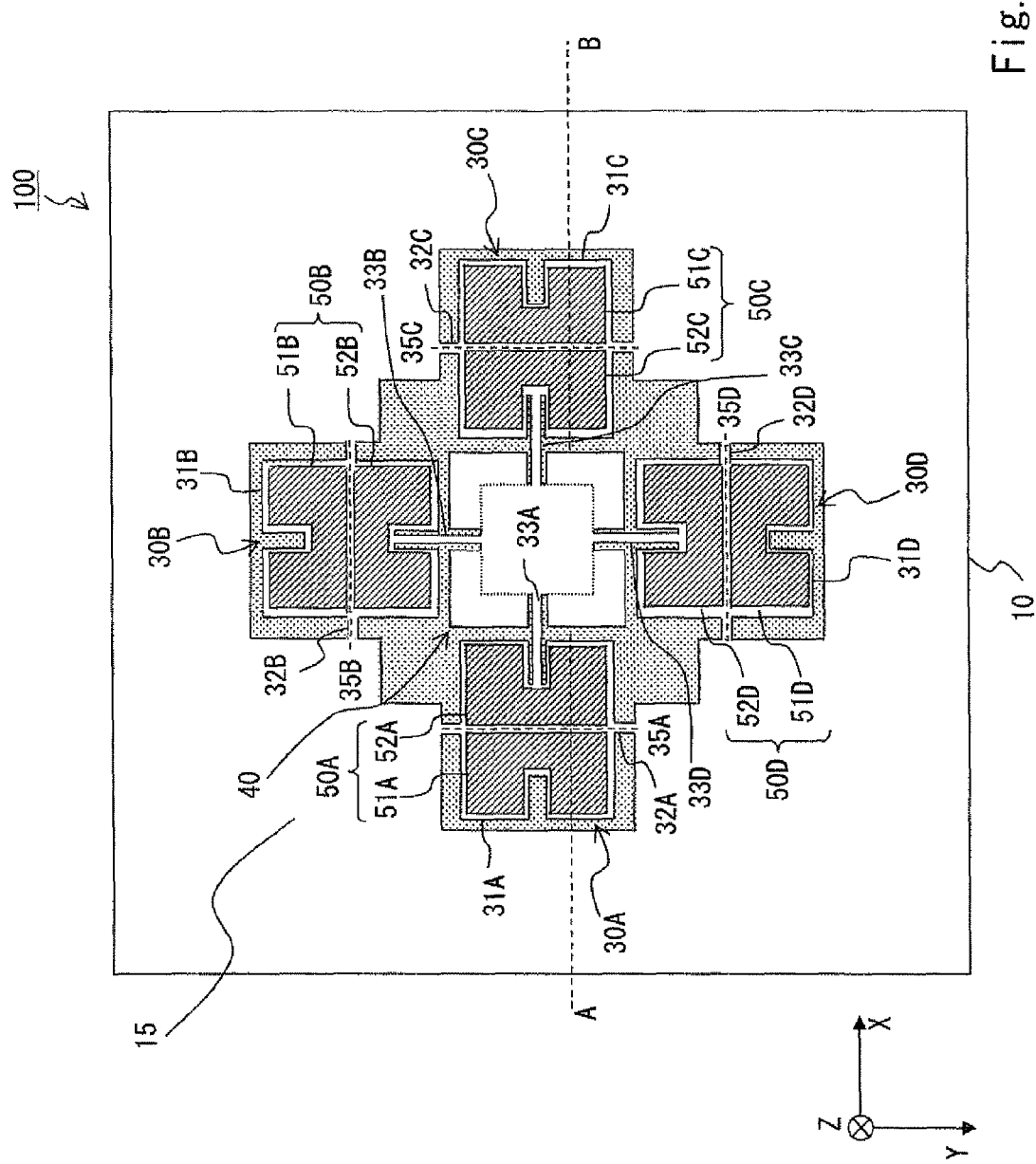
FIG. 13A is a schematic perspective view of a bottom surface of a force sensor according to an embodiment 7.
Figure 13B:
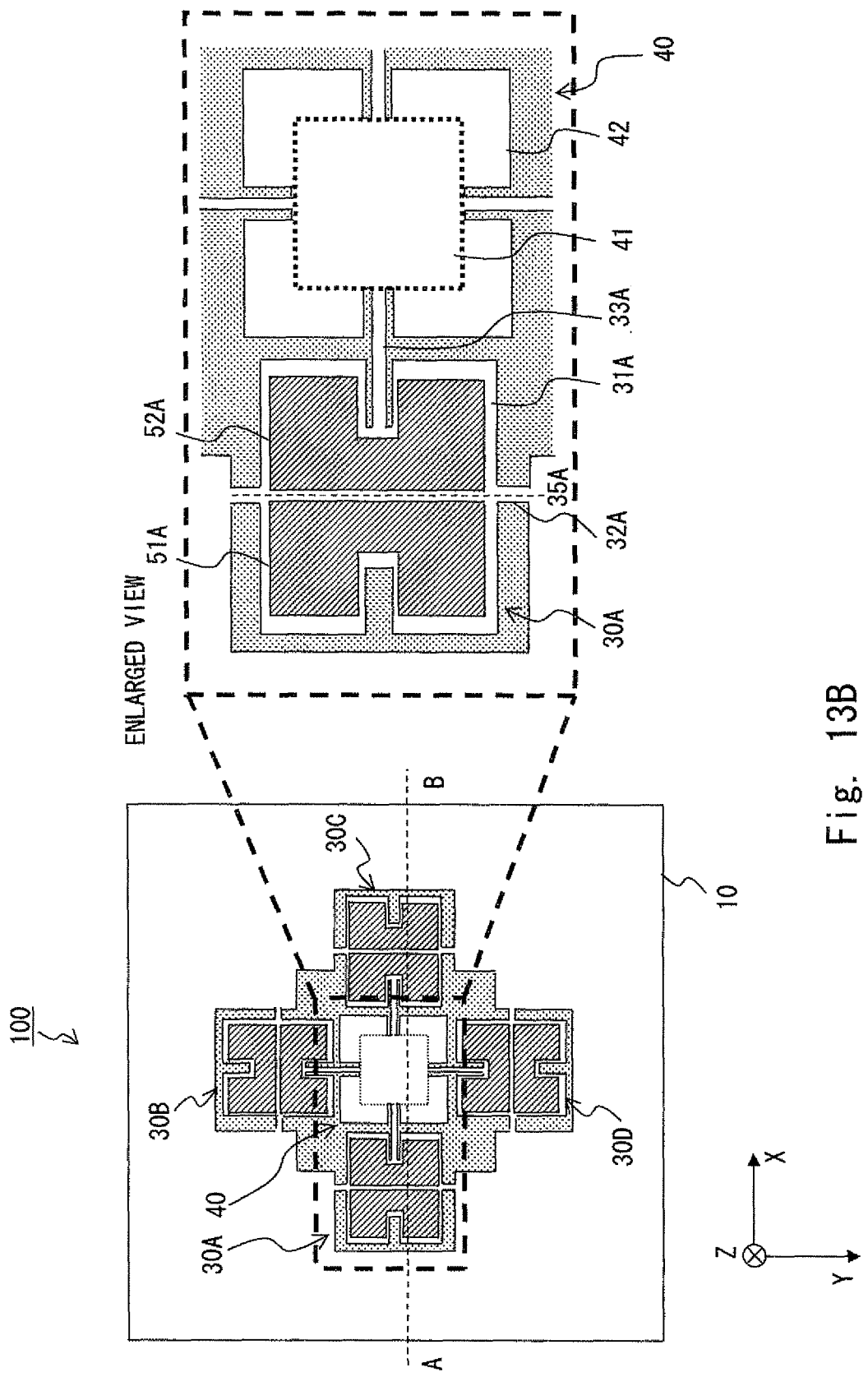
FIG. 13B is a schematic perspective view of the bottom surface of the force sensor according to an embodiment 7 and an enlarged view thereof.
Figure 13C:
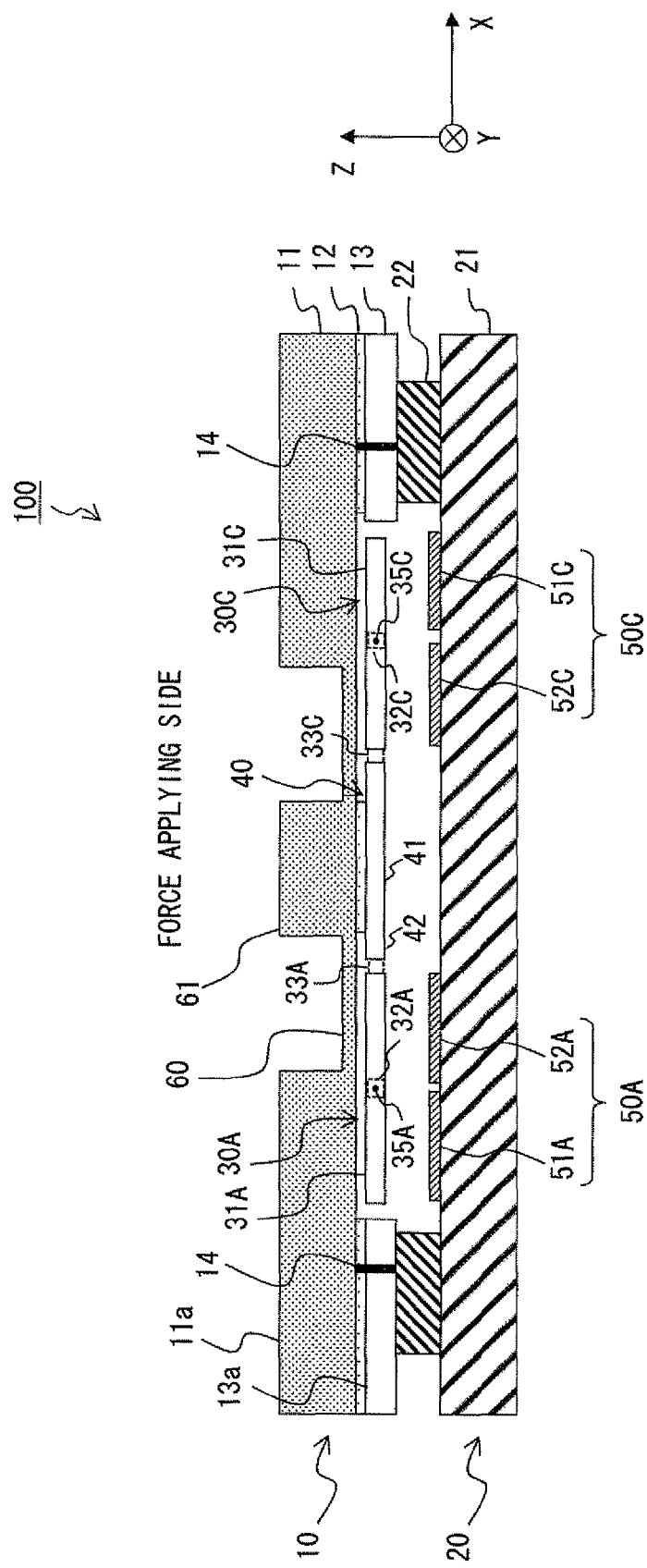
FIG. 13C is a schematic cross-sectional side view of the force sensor according to an embodiment 7.

Hereinafter, an embodiment 7 will be explained with reference to the drawings. The embodiment is an example where a stopper has been formed at a force receiving portion with respect to the force sensor of the embodiment 6. FIG. 13A is a perspective view of the bottom surface of the force sensor 100 according to the embodiment in which a sealing substrate has been omitted, and FIG. 13B is an enlarged view thereof. FIG. 13C is a cross-sectional side view taken along the line A-B of the force sensor 100 in FIG. 13A.

As shown in FIGS. 13A to 13C, the force sensor 100 according to the embodiment is provided with the movable support portion 10 and the sealing portion 20 similarly to the embodiment 1, and the movable support portion 10 and the sealing portion 20 are sealed and bonded by the bonding portion 22. The movable support portion 10 is mainly provided with the seesaw portions 30A to 30D, the force receiving portion 40, the diaphragm 60, and the projection 61.

The force receiving portion 40 has the force receiving plate 41 and the stopper 42 similarly to the embodiment 1. The stopper 42 is formed substantially in an L shape at each of corner portions (four corners) around the force receiving plate 41 so as to extend the force receiving plate 41. It can be also said that the stopper 42 extends auricularly or pinnately around the force receiving plate 41. When a position of the force receiving portion 40 is inclined and displaced, the stopper 42 comes into contact with the sealing portion 20 side, and stops displacement of the seesaw portion 30.

Figure 13D:
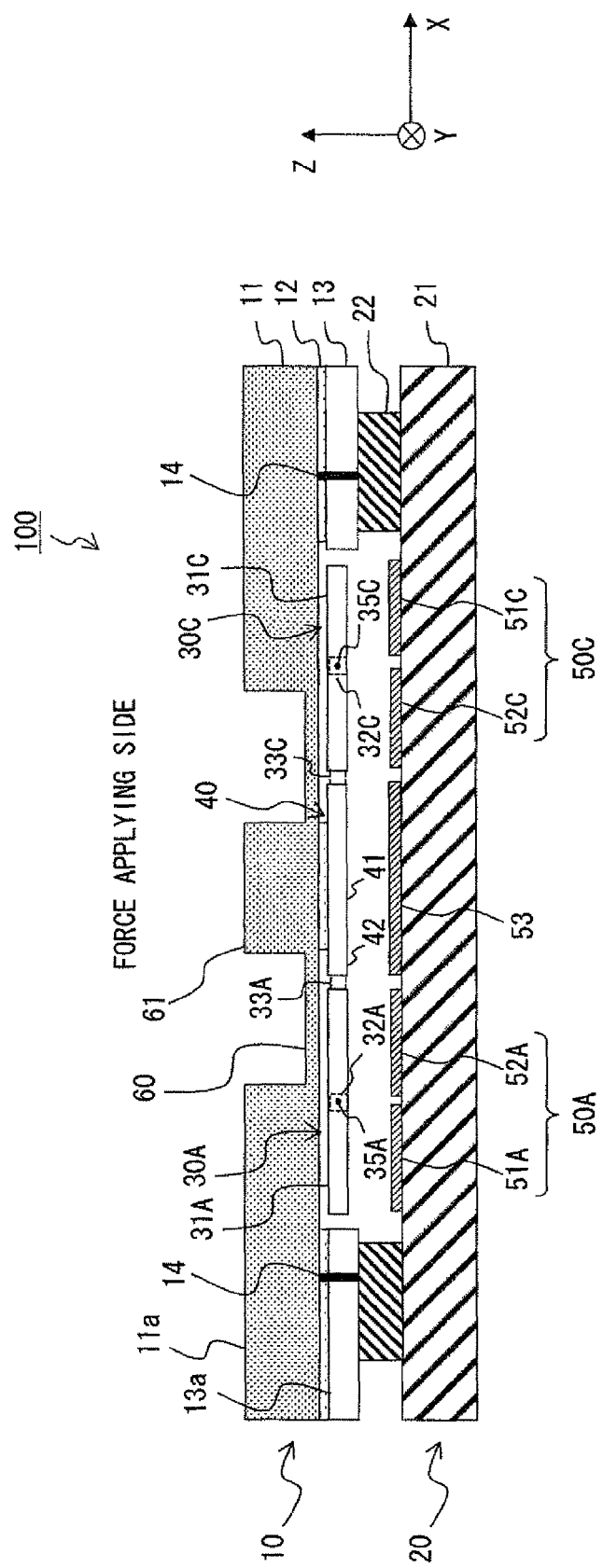
FIG. 13D is a schematic cross-sectional side view of the force sensor according to an embodiment 7.

In addition, instead of FIG. 13C, as shown in FIG. 13D, a dummy electrode 53 may be formed at a position opposed to the force receiving portion 40 on the main surface of the sealing substrate 21. The dummy electrode 53 has substantially the same size as the force receiving portion 40 including the stopper 42, and is formed as a substantially square shape in a top view. The dummy electrode 53 has the same potential as the force receiving portion 40. A thickness of the dummy electrode 53 is substantially the same as those of the fixed electrodes 51 and 52.

Figure 14:
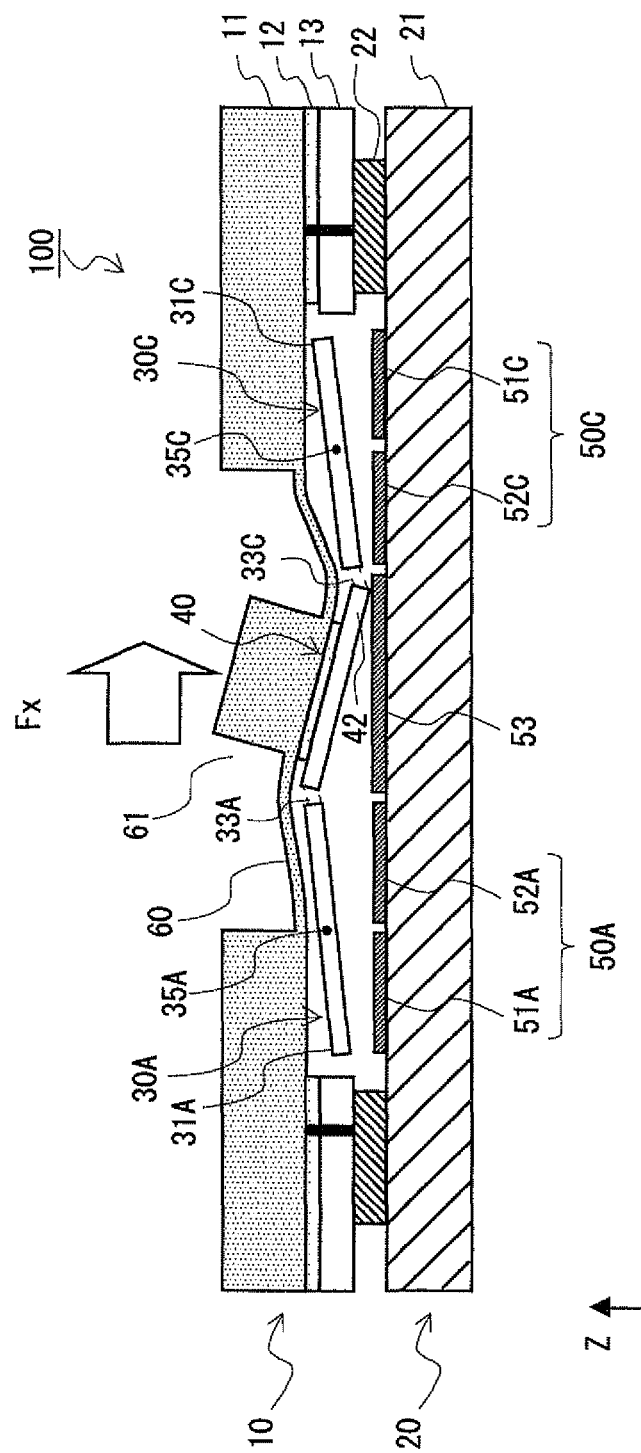
FIG. 14 is a cross-sectional side view showing schematically a state of the force sensor according to an embodiment 7 when a force has been applied to the direction of the X axis.

When the force Fx (or the force Fy) is applied, there is a fear that a tip of the seesaw portion 30 comes into contact with the fixed electrodes 51 and 52, and electrically shorts out. Consequently, since in the embodiment, the stopper 42 is formed at the force receiving portion 40 as shown in FIG. 14, at the time of overload application, the stopper 42 comes into contact with the sealing substrate 21 (an insulator) or the dummy electrode 53 (the same potential electrode), before the tip of the seesaw portion 30 comes into contact with the fixed electrodes 51 and 52. As a result of this, since the seesaw portion 30 does not come into contact with the fixed electrodes 51 and 52, electrical short can be prevented. A contact partner on a sealing portion side of the stopper 42 is desirably the one without a potential difference with the stopper 42, or an insulator. As a result of this, short of a stopper portion can also be prevented.

In addition, as shown in the enlarged view of FIG. 13B, the movable electrode 31 of the seesaw portion 30 has a concave portion in which an inner end of the movable electrode 31 hollows toward the rotational axis 35, and the hinge beam 33 is coupled to a hollow of the concave portion. The movable electrode 31 has a symmetrical structure centering on the rotational axis 35, and has the same concave portion also in the outside thereof. Furthermore, the fixed electrodes 51 and 52 also have the same shape as the movable electrode 31, and they have a concave portion in the inside and the outside thereof. As a result of this, since capacities of the outer fixed electrode 51 and the inner fixed electrode 52 are matched, sensitivity becomes the same, and accuracy of differential detection improves.

As described above, in the embodiment, the stopper is formed at the force receiving portion in addition to the configuration of the embodiment 6. As a result of this, since contact of the seesaw portion and the fixed electrode is suppressed, electrical short can be prevented.

In addition, the movable electrode of the seesaw portion 30 hollows toward the rotational axis, and the hinge beam is connected to this hollow. Since a rotational angle of the seesaw portion becomes large by connecting the hinge beam near the rotational axis of the seesaw portion, detection sensitivity improves.

In addition, since the hinge beam can be formed to be long, rotational rigidity of the hinge beam becomes low, and the force receiving portion is easy to rotate. As shown in FIG. 5A, since the hinge beam arranged in the X-axis direction is twisted around the X axis at the time of the force sensor 100 receiving the force Fy, the force receiving portion is easy to rotate, and sensitivity improves. In addition, simultaneously, since the seesaw portion arranged in the X-axis direction is not displaced, cross talk can be suppressed.

In addition, the hinge beam is likely to deform by lengthening the hinge beam. Accordingly, stress concentration at the time of deformation of the hinge beam can be prevented, and destruction of the hinge beam can be prevented.

Embodiment 8

Figure 15A:
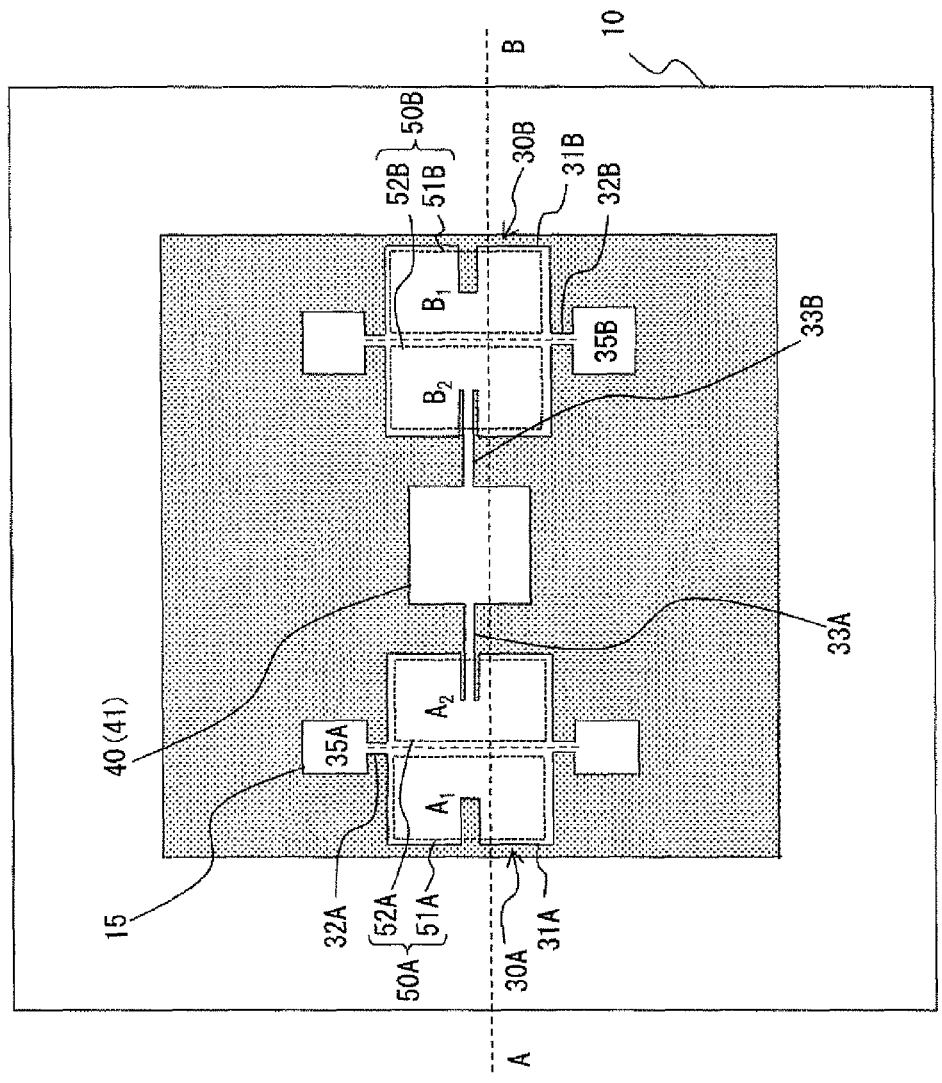
FIG. 15A is a schematic top view of a force sensor according to an embodiment 8.
Figure 15B:
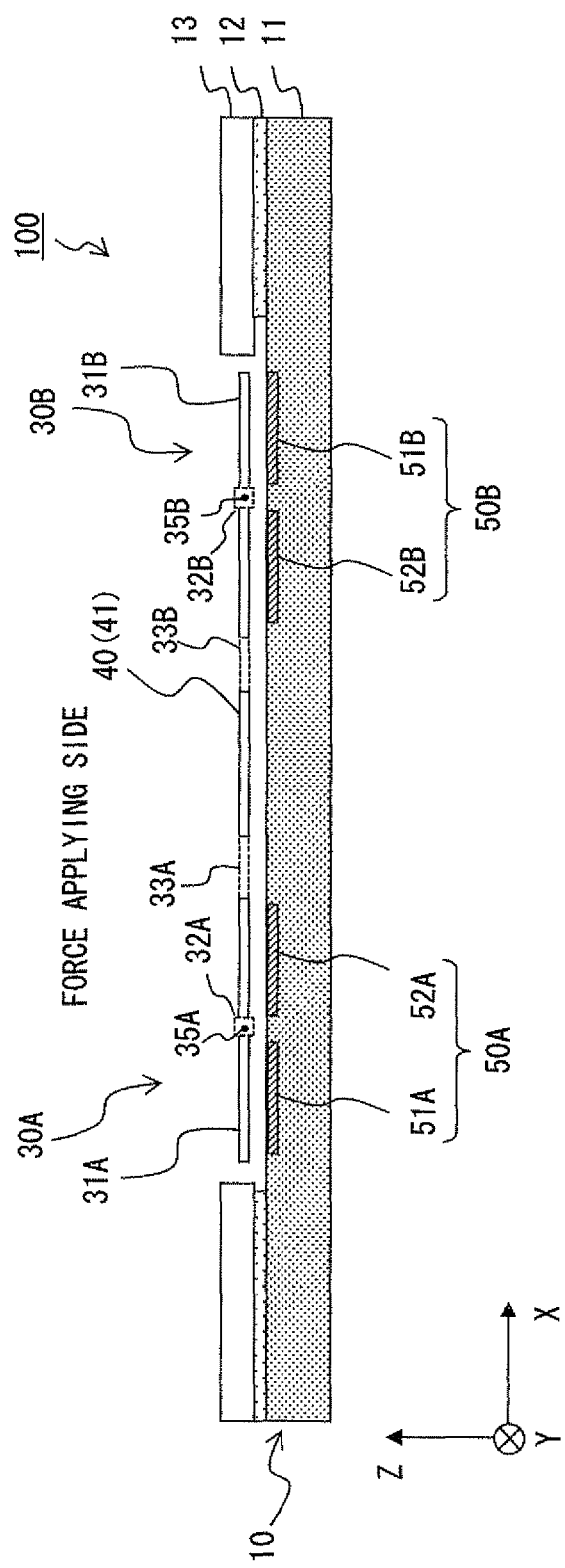
FIG. 15B is a schematic cross-sectional side view of the force sensor according to an embodiment 8.

Hereinafter, an embodiment 8 will be explained with reference to the drawings. The embodiment is an example where a force sensor that detects biaxial forces by two seesaw portions with respect to the embodiment 2. A biaxial force sensor, for example, can detect forces in the X direction and the Z direction. FIG. 15A is a top view of the force sensor 100 pertaining to the embodiment. FIG. 15B is a cross-sectional side view taken along the line A-B of the force sensor 100 in FIG. 15A.

As shown in FIGS. 15A and 15B, the force sensor 100 according to the embodiment is provided with only the movable support portion 10 similarly to the embodiment 2. The movable support portion 10 is mainly provided with the seesaw portions 30A and 30B, the force receiving portion 40, and the fixed electrode pairs 50A and 50B. The movable support portion 10 is provided with the first silicon layer 11, the insulator film 12, and the second silicon layer 13. At the second silicon layer 13, the force receiving portion 40 is formed in a center, and the two seesaw portions 30A and 30B are formed around the force receiving portion 40. In this example, the seesaw portions 30A and 30B are formed on both sides in the X direction.

The force receiving portion 40 and the seesaw portions 30A and 30B are coupled to each other by the hinge beams 33A and 33B, respectively. Similarly to the embodiment 2, the force receiving portion 40 includes only the force receiving plate 41, and is supported by the seesaw portions 30A and 30B by means of the hinge beams 33A and 33B.

Figure 16:
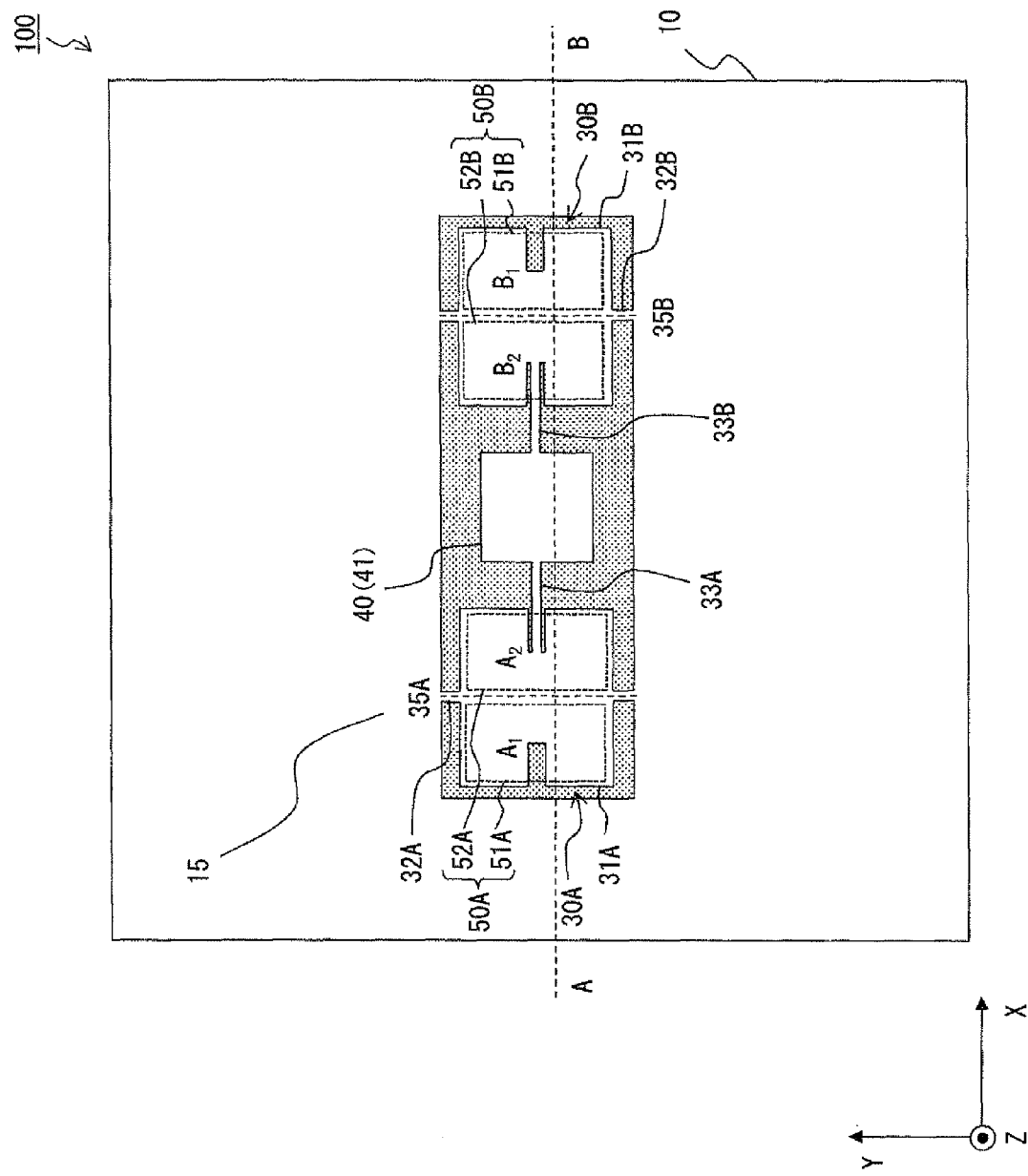
FIG. 16 is a schematic top view of the force sensor according to an embodiment 8.

The movable electrodes 31A and 31B of the seesaw portions 30A and 30B are fixed to the fixing portion 15 by the torsion beams 32A and 32B. In the example of FIG. 15A, the fixing portion 15 is formed for each torsion beam 32 (for each seesaw portion). It is to be noted that the fixing portion 15 may be formed as one continuously from the torsion beams 32A to 32B as in FIG. 16.

In addition, the fixed electrode pairs 50A and 50B are formed on the main surface of the first silicon layer 11. The fixed electrode pairs 50A and 50B include the fixed electrodes 51A and 52A, and 51B and 52B, respectively, and are arranged at positions corresponding to the movable electrodes 31A and 31B of the seesaw portions 30A and 30B.

An operating principle of the embodiment is similar to those of the embodiments 1 and 2. While the triaxial forces are detected in the embodiments 1 and 2, the biaxial forces in the Z direction and the X direction can be detected in the embodiment.

For example, when the force Fz is applied in the negative direction of the Z axis, according to displacement of the force receiving portion 40, the inner ends of the seesaw portions 30A and 30B are displaced in the negative direction of the Z axis, and the outer ends of the seesaw portions 30A and 30B are displaced in the positive direction of the Z axis. Namely, when the force Fz is applied in the Z direction (an Fz mode), the seesaw portion 30A and 30B rotate in opposite directions.

In addition, when the force Fx is applied in the positive direction of the X axis, according to displacement of the force receiving portion 40, the inner end of the seesaw portion 30A is displaced in the positive direction of the Z axis, and the inner end of the seesaw portion 30B is displaced in the negative direction of the Z axis. Namely, when the force Fx is applied in the X direction (an Fx mode), the seesaw portion 30A and 30B rotate in the same direction.

For this reason, in the embodiment, matrix operation is performed as in the following (Expression 6), and a force in each direction is calculated.

$$\begin{pmatrix} Fx \\ Fz \end{pmatrix} = \frac{1}{2} \cdot \underbrace{\begin{pmatrix} 1 & -1 \\ 1 & 1 \end{pmatrix}}_{\text{transformation matrix}} \cdot \underbrace{\begin{pmatrix} A_1 - A_2 \\ B_1 - B_2 \end{pmatrix}}_{\text{differential}} \quad \text{(Expression 6)}$$

As in (Expression 6), forces in the two directions are obtained by multiplying a differential (capacity difference) of two capacities by a transformation matrix. Since the forces Fz and Fx are both detected by two seesaw portions, and thus have the same sensitivity, both forces have the same coefficient.

As described above, even when at least two seesaw portions are provided, biaxial forces can be detected, differential detection can be performed to all the axes, and thus a force can be accurately detected. In addition, since a microstructure as a comb is not needed, the structure is hard to break. Furthermore, a point on which a force acts can be specified by the force receiving portion, and detection accuracy improves.

Embodiment 9

Figure 17A:
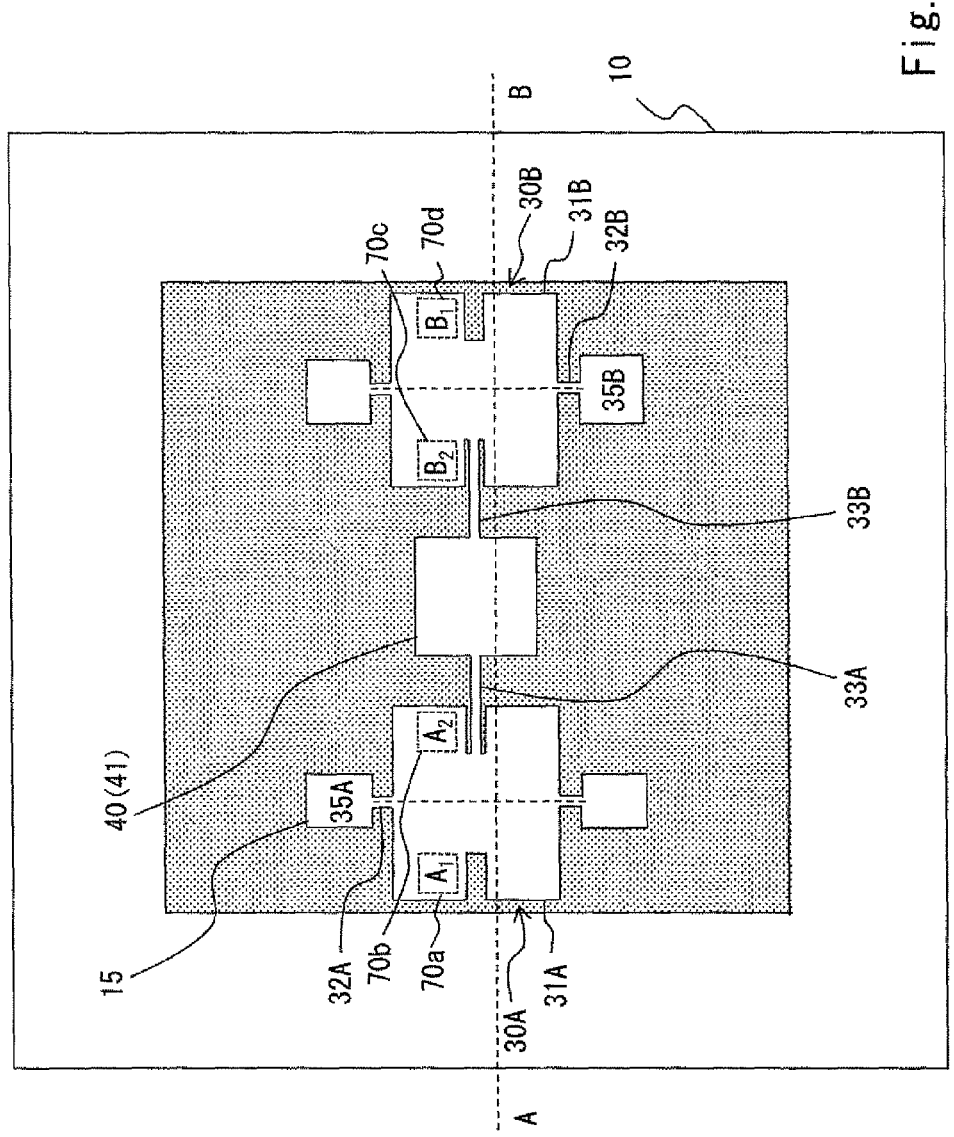
FIG. 17A is a schematic top view of a force sensor according to an embodiment 9.
Figure 17B:
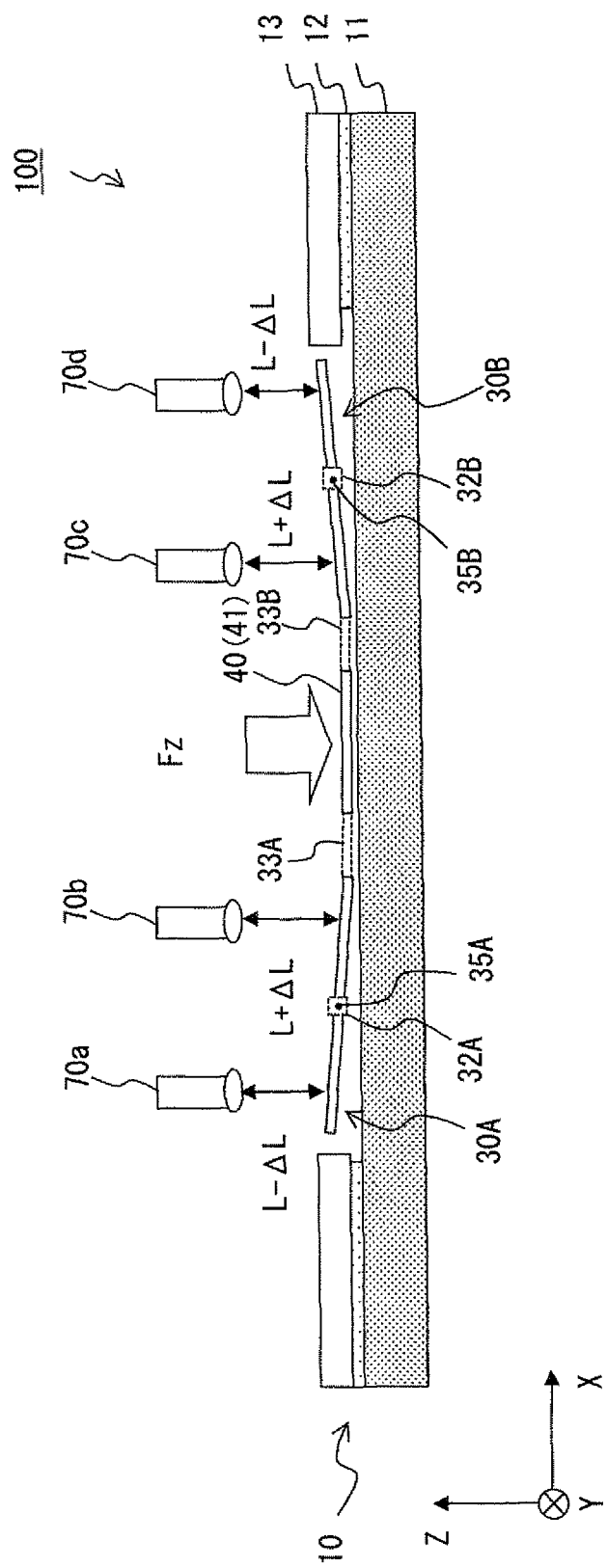
FIG. 17B is a schematic cross-sectional side view of the force sensor according to an embodiment 9.

Hereinafter, an embodiment 9 will be explained with reference to the drawings. The embodiment is an example where displacement of a movable portion is detected by an optical scheme with respect to the embodiment 8. FIG. 17A is a top view of the force sensor 100 pertaining to the embodiment. FIG. 17B is a cross-sectional side view taken along the line A-B of the force sensor 100 in FIG. 17A.

As shown in FIGS. 17A and 17B, the force sensor 100 according to the embodiment is provided with only the movable support portion 10 similarly to the embodiment 8. The movable support portion 10 is mainly provided with the seesaw portions 30A and 30B and the force receiving portion 40, and is not provided with a fixed electrode.

In the embodiment, the force sensor 100 is provided with optical distance measuring devices 70a to 70d instead of the fixed electrode. In the example of FIG. 17B, the optical distance measuring devices 70a to 70d are arranged above the seesaw portions 30A and 30B. Two of the optical distance measuring devices 70a to 70d are arranged for each seesaw portion 30 similarly to the fixed electrode. The optical distance measuring devices 70a to 70d are a laser displacement meter, an interference measure, and the like, and they measures a distance L to the seesaw portion 30 by irradiating light to the seesaw portion 30, and receiving reflected light.

Figure 17C:
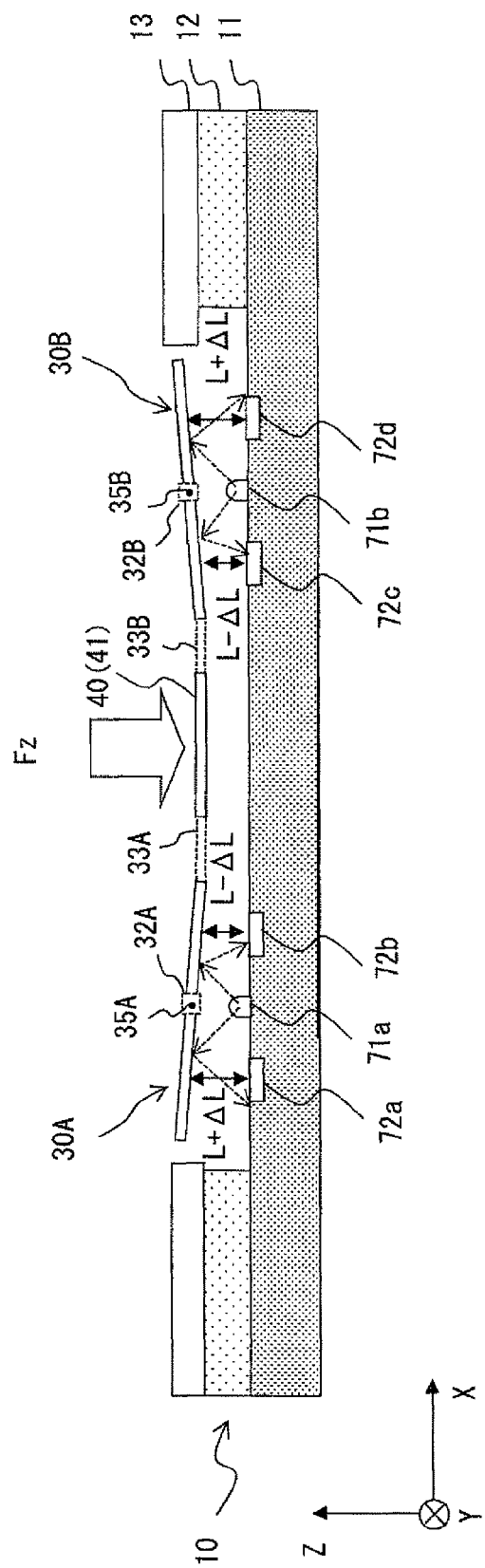
FIG. 17C is a schematic cross-sectional side view of the force sensor according to an embodiment 9.

In addition, the force sensor 100 can be configured as FIG. 17C as an other example where a force is detected by the optical scheme. In FIG. 17C, light emitting diodes 71a and 71b, and photodiodes 72a to 72d are arranged on the main surface of the first silicon layer 11 instead of fixed electrodes. The light emitting diodes 71a and 71b are arranged at positions opposed to the rotational axes 35A and 35B of the seesaw portions 30A and 30B. The photodiodes 72a to 72d are arranged at positions opposed to both ends of the seesaw portions 30A and 30B.

Distances L to both ends of the seesaw portion 30A are set as $A_1$ and $A_2$, and distances L to both ends of the seesaw portion 30B as $B_1$ and $B_2$. In addition, displacement of a distance sets as $\Delta L$. Outputs of the photodiodes 72a to 72d (optical distance measuring devices 70a to 70d) are $A_1=A_2$, and $B_1=B_2$ at the time of $\Delta L=0$. The photodiodes 72a to 72d are arranged at light reflection positions where the outputs decrease at the time of distance $L+\Delta L$, and where the outputs increase at the time of distance $L-\Delta L$.

The embodiment is an example where a distance is measured instead of an electric capacity, and an operating principle is similar to the other embodiments. Namely, since the seesaw portion 30 rotates and is displaced by force application, a distance between the seesaw portion 30 and the optical distance measuring device 70 (photodiode 72) changes.

In the example of FIG. 17B, since a time until reflected light returns from the seesaw portion 30A decreases, the optical distance measuring device 70a detects a distance $(L-\Delta L)$. Since a time until reflected light returns from the seesaw portion 30A increases, the optical distance measuring device 70b detects a distance $(L+\Delta L)$. Since a time until reflected light returns from the seesaw portion 30B increases, the optical distance measuring device 70c detects a distance $(L+\Delta L)$. Since a time until reflected light returns from the seesaw portion 30B decreases, the optical distance measuring device 70c detects the distance $(L-\Delta L)$.

In addition, in the example of FIG. 17C, since a reflected light amount from the seesaw portion 30A decreases, the photodiode 72a detects the distance $(L+\Delta L)$. Since a reflected light amount from the seesaw portion 30A increases, the photodiode 72b detects the distance $(L-\Delta L)$. Since a reflected light amount from the seesaw portion 30B increases, the photodiode 72c detects the distance $(L-\Delta L)$. Since a reflected light amount from the seesaw portion 30B decreases, the photodiode 72d detects the distance $(L+\Delta L)$.

For this reason, similarly to an electric capacity, a distance differential $2\Delta L=(L+\Delta L)-(L-\Delta L)$ is calculated, and a force is detected. Also in the optical scheme, matrix operation of (Expression 6) in the case of the biaxial force sensor is performed, matrix operation of (Expression 4) and (Expression 5) is performed in the case of the triaxial force sensor, and thereby a force of each axis can be detected.

As described above, it is also possible to configure the force sensor 100 as the force sensor of the optical scheme instead of the electric capacity scheme. Even in the case, differential detection can be performed by plural axes similarly to the embodiments 2, 8, and the like, and thus a force can be accurately detected. In addition, the force sensor 100 can be made to have a structure hard to break down by the seesaw portions, and detection accuracy can be improved by the force receiving portion. It is to be noted that displacement of the seesaw portion may be detected by a magnetic scheme in addition to the optical scheme.

Embodiment 10

Figure 18A:
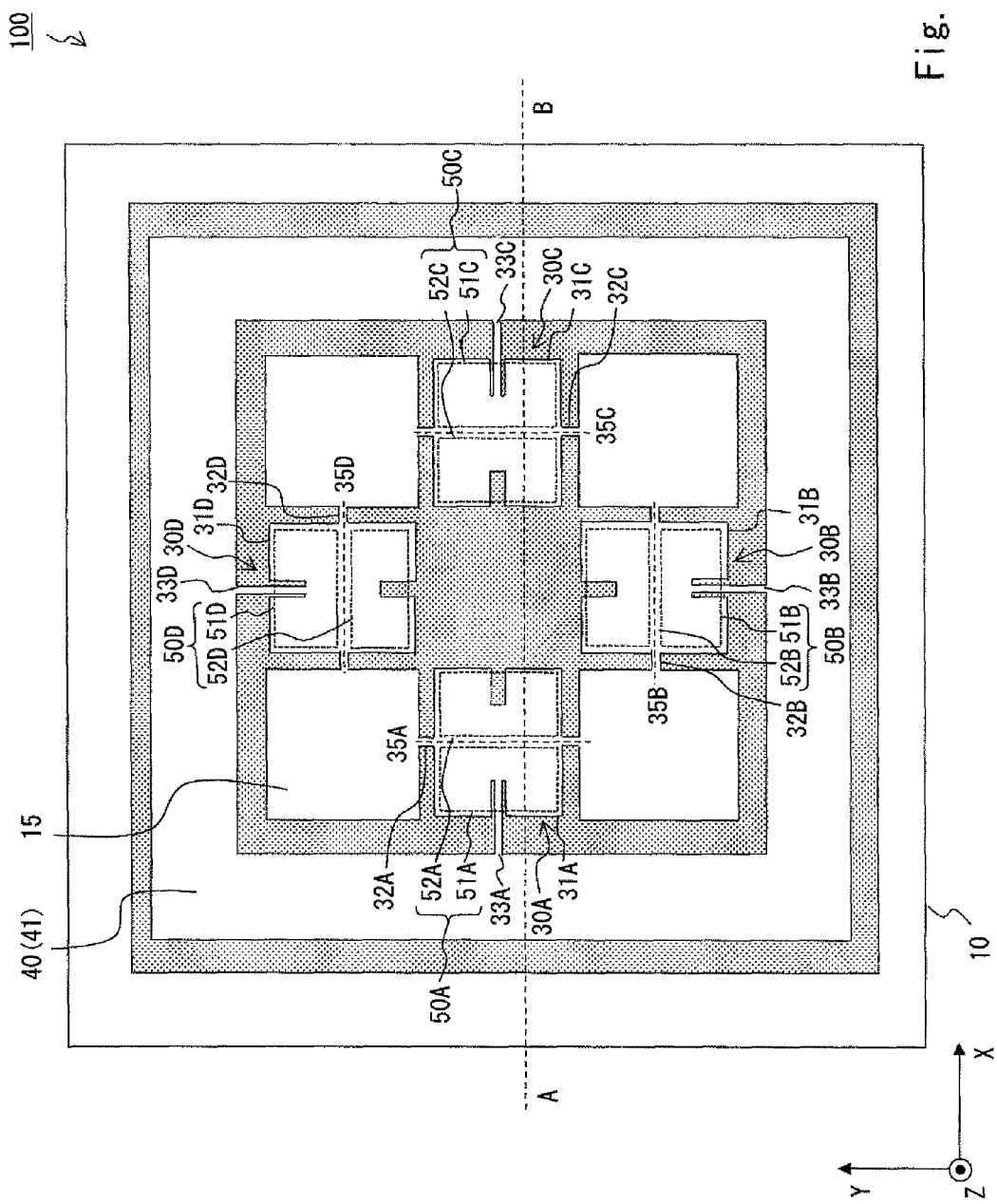
FIG. 18A is a schematic top view of a force sensor according to an embodiment 10.
Figure 18B:
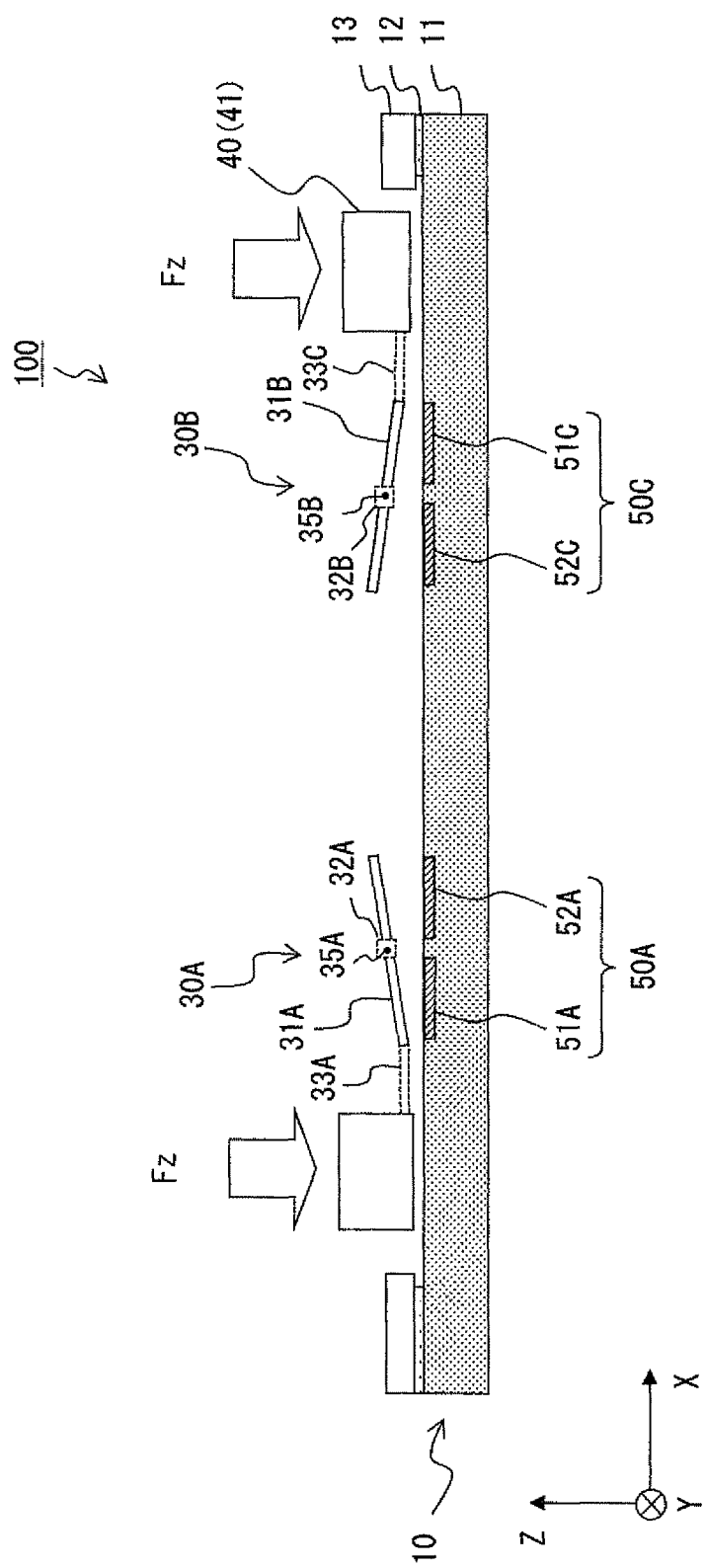
FIG. 18B is a schematic cross-sectional side view of the force sensor according to an embodiment 10.

Hereinafter, an embodiment 10 will be explained with reference to the drawings. The embodiment is an example where a force receiving portion has been arranged in a periphery with respect to the force sensor of the embodiment 2. FIG. 18A is a top view of the force sensor 100 pertaining to the embodiment. FIG. 18B is a cross-sectional side view taken along the line A-B of the force sensor 100 in FIG. 18A.

As shown in FIGS. 18A and 18B, the force sensor 100 according to the embodiment is provided with only the movable support portion 10. The movable support portion 10 is mainly provided with the seesaw portions 30A to 30D, the force receiving portion 40, and the fixed electrode pairs 50A to 50D.

The movable support portion 10 is provided with the first silicon layer 11, the insulator film 12, and the second silicon layer 13. The four seesaw portions 30A to 30D are formed at the second silicon layer 13 similarly to the embodiment 2. The force receiving portion is not formed in a center portion surrounded by the seesaw portions 30A to 30D.

The movable electrodes 31A to 31D of the seesaw portions 30A to 30D are fixed to the fixing portion 15 by the torsion beams 32A to 32D. In the embodiment, the fixing portion 15 is formed so as to be coupled to the two torsion beams 32 (seesaw portions). The fixing portion 15 has a substantially square shape in a top view, the torsion beam 32 is coupled to a center portion of a first side of the square, and an other torsion beam 32 is coupled to a center portion of a second side in contact with the first side.

The fixed electrode pairs 50A to 50D are formed on a main surface of the first silicon layer 11. The fixed electrode pairs 50A to 50D include the fixed electrodes 51A and 52A, 51B and 52B, and 51C and 52C, 51D and 52D, respectively, and are arranged at positions corresponding to the movable electrodes 31A to 31D of the seesaw portions 30A to 30D.

In the embodiment, the force receiving portion 40 is formed in a periphery of the movable support portion 10, i.e., outside the seesaw portions 30A to 30D so as to surround the seesaw portions 30A to 30D. The force receiving portion 40 includes the force receiving plate 41, and is formed in a quadrangular shape including four side portions. Each side portion of the force receiving portion 40 and the seesaw portions 30A to 30D are coupled to one another by the hinge beams 33A to 33D, respectively. The hinge beams 33A to 33D are coupled to a substantially center portion of each side portion of the force receiving portion 40. Since not bonded to the first silicon layer 11, the force receiving portion 40 is supported by the seesaw portions 30A to 30D by means of the hinge beams 33A to 33D.

An operating principle of the embodiment is similar to those of the embodiments 1 and 2. For example, when the force Fz is applied in the negative direction of the Z axis, according to displacement of the force receiving portion 40, the outer ends of the seesaw portions 30A to 30D are displaced in the negative direction of the Z axis, and the inner ends of the seesaw portions 30A to 30D are displaced in the positive direction of the Z axis. Although rotational directions of the seesaw portions 30A to 30D are opposite to those in the embodiments 1 and 2, when the force Fz is applied in the Z direction (an Fz mode), the seesaw portions 30A and 30C, and the seesaw portions 30B and 30D mutually rotate in opposite directions.

In addition, when the force Fx is applied in the positive direction of the X axis, the hinge beams 33D and 33B are twisted, and thereby the force receiving portion 40 effectively rotates and is displaced, with the hinge beams 33D and 33B being as axes. According to this displacement of the force receiving portion 40, the outer end of the seesaw portion 30A is displaced in the positive direction of the Z axis, and the outer end of the seesaw portion 30C is displaced in the negative direction of the Z axis. In this case, the seesaw portions 30B and 30D are not displaced similarly to the embodiments 1 and 2. Although rotational directions of the seesaw portions 30A and 30C are opposite to those in the embodiments 1 and 2, when the force Fx is applied in the X direction (an Fx mode), the seesaw portions 30A and 30C rotate in the same direction.

Furthermore, when the force Fy is applied in the positive direction of the Y axis, the hinge beams 33A and 33C are twisted, and thereby the force receiving portion 40 effectively rotates and is displaced, with the hinge beams 33A and 33C being as axes. According to this displacement of the force receiving portion 40, the outer end of the seesaw portion 30B is displaced in the positive direction of the Z axis, and the outer end of the seesaw portion 30D is displaced in the negative direction of the Z axis. In this case, the seesaw portions 30A and 30C are not displaced similarly to the embodiments 1 and 2. Although rotational directions of the seesaw portions 30B and 30D are opposite to those in the embodiments 1 and 2, when the force Fy is applied in the Y direction (an Fx mode), the seesaw portions 30B and 30D rotate in the same direction.

In the embodiment, since the rotational direction of the seesaw portion 30 is opposite to force application as compared with the embodiments 1 and 2, a symbol is changed in the matrix operation of (Expression 1), and thereby a force in each direction can be obtained similarly to the embodiments 1 and 2.

As described above, the force receiving portion is formed in the periphery with respect to the configuration of the embodiment 2. Even in the case, similarly to the embodiment 2, triaxial forces can be detected, differential detection can be performed to all the axes, and thus a force can be accurately detected. In addition, since a microstructure as a comb is not needed, the structure is hard to break.

Embodiment 11

Hereinafter, an embodiment 11 will be explained with reference to the drawings. The embodiment is an example where the configurations of the embodiments 5 and 6 have been applied to an acceleration sensor that detects an acceleration, which is one of dynamic quantity.

Figure 19A:
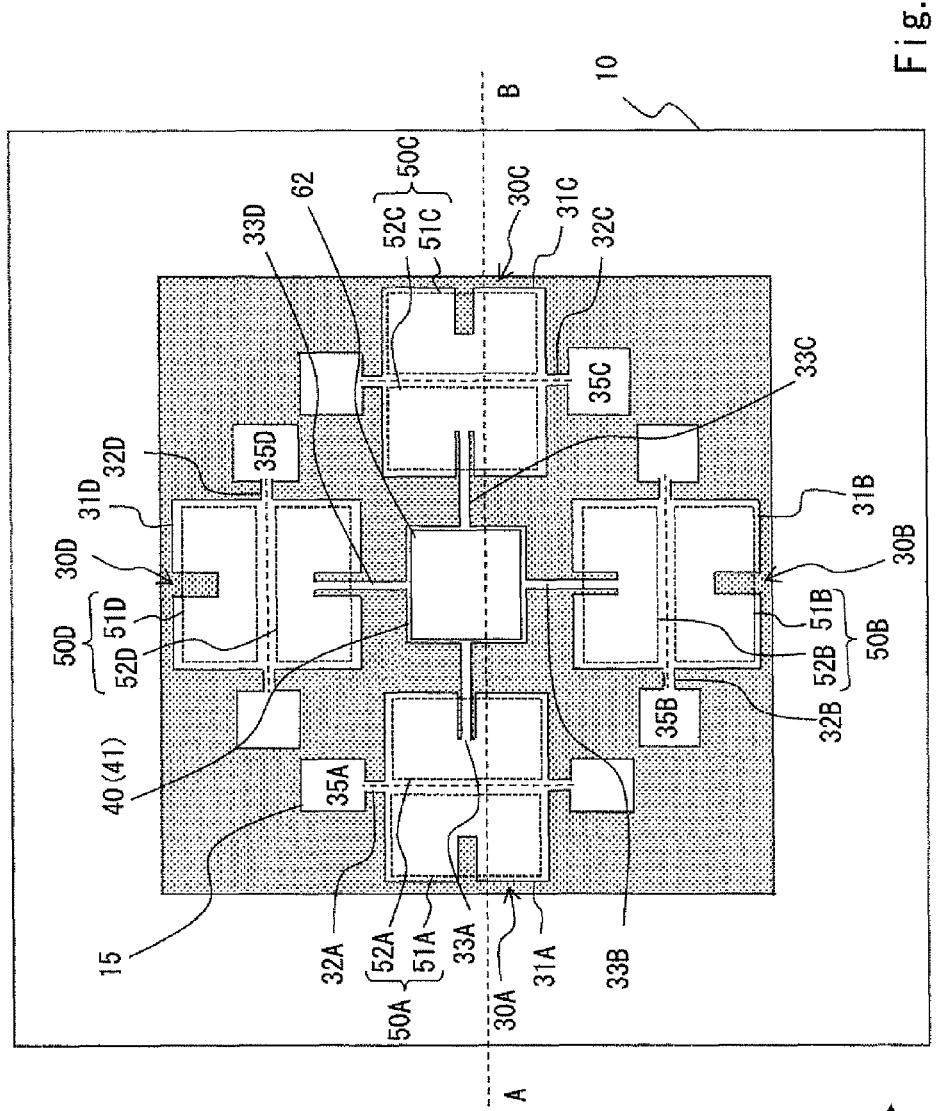
FIG. 19A is a schematic top view of an acceleration sensor according to an embodiment 11.
Figure 19B:
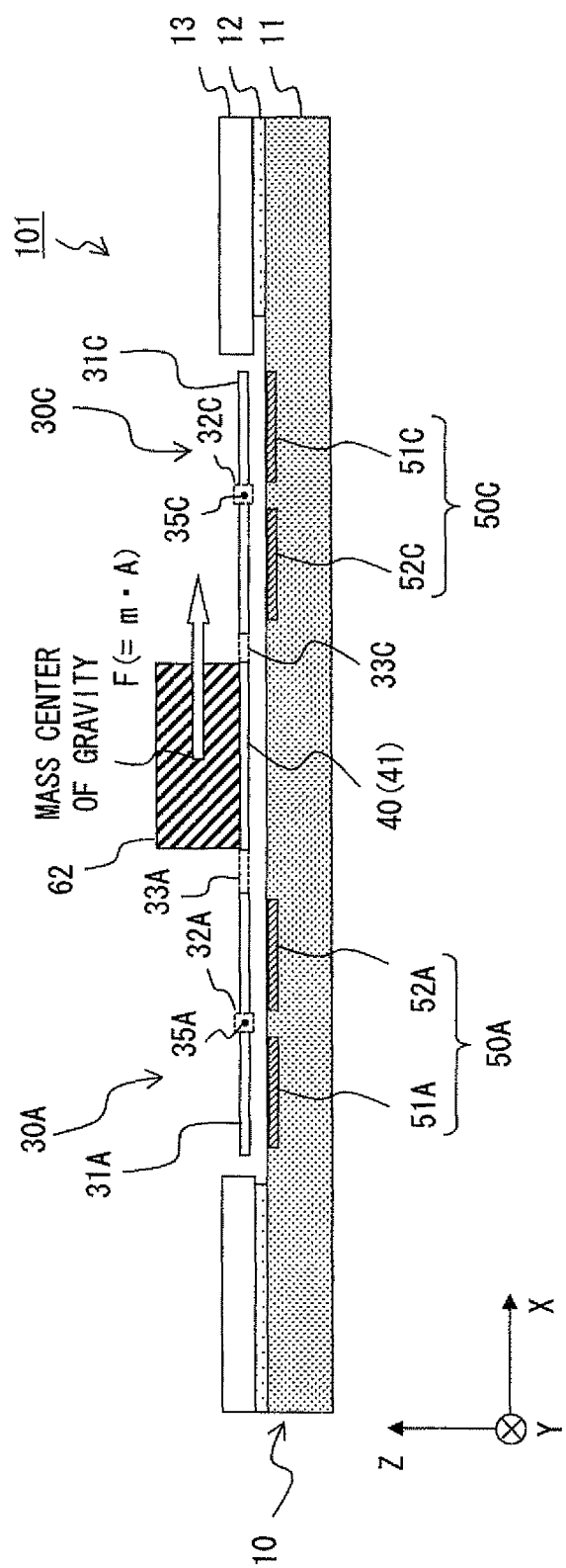
FIG. 19B is a schematic cross-sectional side view of the acceleration sensor according to an embodiment 11.

FIG. 19A is a top view of an acceleration sensor 101 pertaining to the embodiment. FIG. 19B is a cross-sectional side view taken along a line A-B of the acceleration sensor 101 in FIG. 19A. FIG. 19B is an example where the acceleration sensor 101 is provided with a mass body 62 instead of the projection 61 in the configuration of FIG. 10 of the embodiment 5.

As shown in FIGS. 19A and 19B, the mass body 62 is formed on a force applying side (positive side of the Z axis) of the force receiving portion 40. The mass body 62 has the same substantially square shape as the force receiving portion 40 in a top view. A thickness (height) of the mass body 62 is thicker than that of the second silicon layer 13, and the mass body 62 projects. The mass body 62 is the member whose mass is heavier than that of the projection and, for example, includes Au or the like.

Figure 20A:
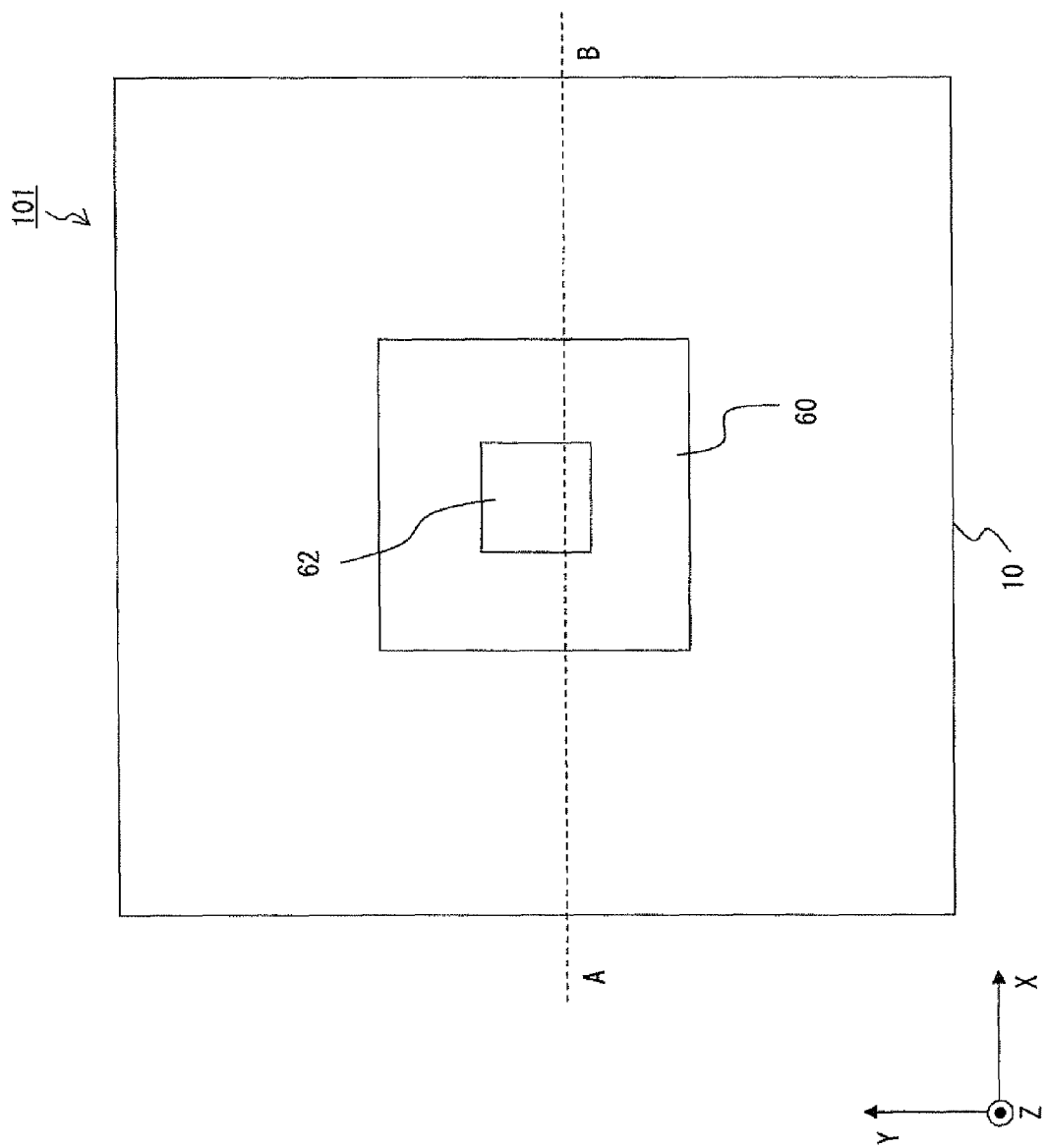
FIG. 20A is a schematic top view of the acceleration sensor according to an embodiment 11.
Figure 20B:
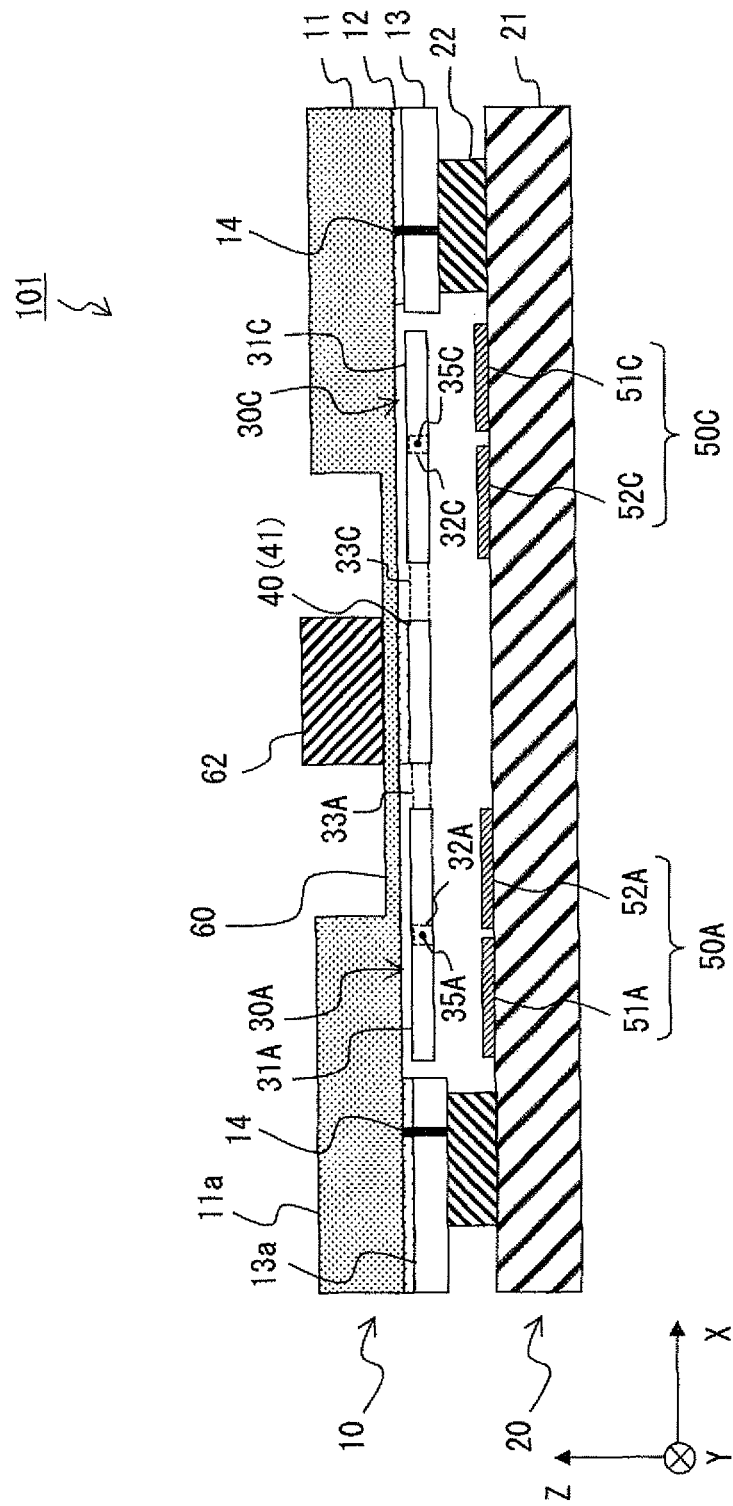
FIG. 20B is a schematic cross-sectional side view of the acceleration sensor according to an embodiment 11.

FIG. 20A is a top view of the acceleration sensor 101 pertaining to the embodiment. FIG. 20B is a cross-sectional side view taken along the line A-B of the acceleration sensor 101 in FIG. 20A. FIGS. 20A and 20B are examples where the acceleration sensor 101 is provided with the mass body 62 instead of the projection 61 in the configuration of FIGS. 12A and 12B of the embodiment 6.

As shown in FIGS. 20A and 20B, the mass body 62 is formed on a force applying side (positive side of the Z axis) of the center of the diaphragm 60. The mass body 62 has the same substantially square shape as the force receiving portion 40 in a top view, and a thickness (height) of the mass body 62 is substantially the same as the first silicon layer 11.

As described above, the mass body (large mass body) is used for a projection of the force sensor, thereby an inertial force can be received by the force receiving portion, and the acceleration sensor that detects an acceleration can be configured. When the acceleration sensor receives an acceleration Az, the mass body translates in the Z direction. When the acceleration sensor receives an acceleration Ax (Ay), a force acts on the mass body by the inertial force, and thus this force is detected by a principle similar to the other embodiments. As a result of this, triaxial acceleration detection can be performed.

Accordingly, similarly to the embodiments 5 and 6, triaxial accelerations can be detected, differential detection can be performed to all the axes, and thus an acceleration can be accurately detected. In addition, since a microstructure as a comb is not needed, the structure is hard to break.

Embodiment 12

Hereinafter, an embodiment 12 will be explained with reference to the drawings. In the embodiment, an example of a force detection circuit that detects a force using the force sensor of the embodiment 1 will be explained.

Figure 21:
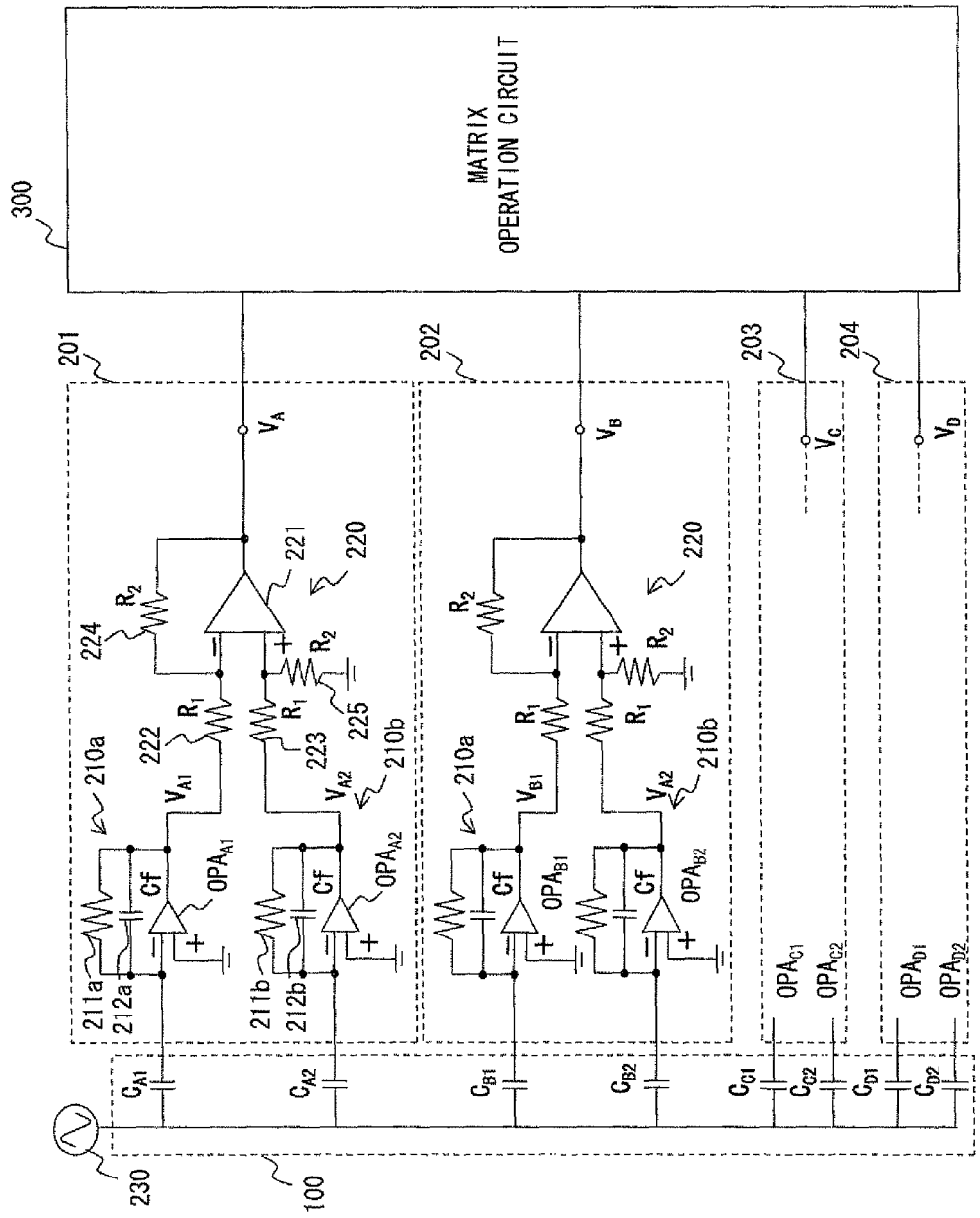
FIG. 21 is a circuit diagram showing a circuit configuration of a detection circuit according to an embodiment 12.
Figure 22A:
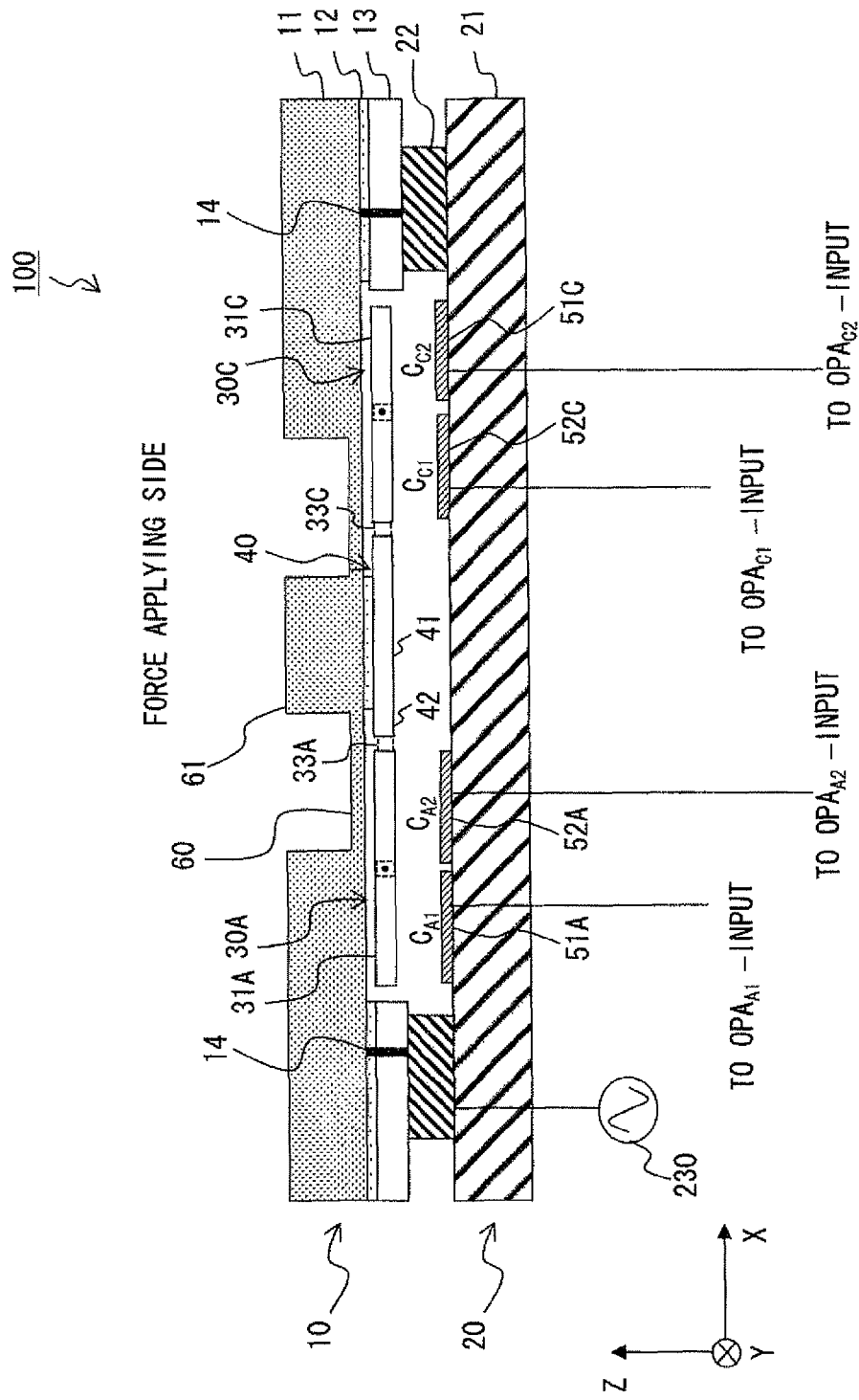
FIG. 22A is a schematic cross-sectional side view of the force sensor according to an embodiment 12 showing a relation of connection between the force sensor and the detection circuit.
Figure 22B:
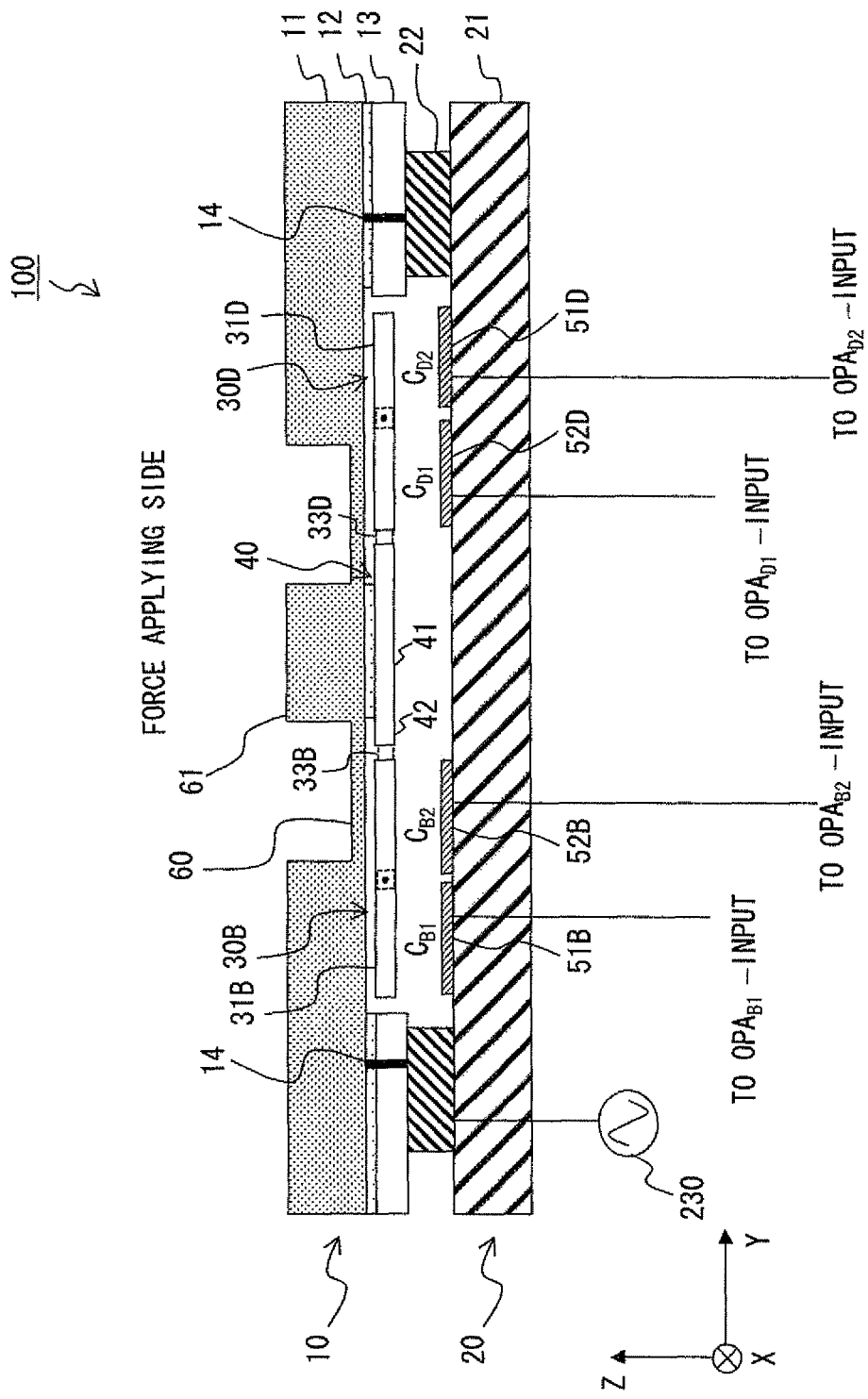
FIG. 22B is a schematic cross-sectional side view of the force sensor according to an embodiment 12 showing a relation of connection between the force sensor and the detection circuit.

FIGS. 21, 22A, and 22B are one example of connection of the force detection circuit and the force sensor, and are the example using a charge amplifier and a difference circuit (differential circuit). The force detection circuit is connected to the force sensor 100 of the embodiment 1, and is provided with differential operation circuits 201 to 204, and a matrix operation circuit 300. It can be also said that a force sensor system is provided with the force sensor 100, the differential operation circuits 201 to 204, and the matrix operation circuit 300. In this example, capacity change between electrodes can be taken out as a voltage output, and a force can be detected with high accuracy.

It is to be noted that here, capacities of the seesaw portion 30A is set as $C_{A1}$ and $C_{A2}$, capacities of the seesaw portion 30B as $C_{B1}$ and $C_{B2}$, capacities of the seesaw portion 30C as $C_{C1}$ and $C_{C2}$, and capacities of the seesaw portion 30D as $C_{D1}$ and $C_{D2}$.

The differential operation circuits 201 to 204 are provided for each seesaw portion 30 (fixed electrode pair 50). The differential operation circuit 201 is connected to the capacities $C_{A1}$ and $C_{A2}$, and outputs a differential voltage $V_A$ indicating a capacity difference between the capacities $C_{A1}$ and $C_{A2}$. The differential operation circuit 202 is connected to the capacities $C_{B1}$ and $C_{B2}$, and outputs a differential voltage $V_B$ indicating a capacity difference between the capacities $C_{B1}$ and $C_{B2}$. The differential operation circuit 203 is connected to the capacities $C_{C1}$ and $C_{C2}$, and outputs a differential voltage $V_C$ indicating a capacity difference between the capacities $C_{C1}$ and $C_{C2}$. The differential operation circuit 204 is connected to the capacities $C_{D1}$ and $C_{D2}$, and outputs a differential voltage $V_D$ indicating a capacity difference between the capacities $C_{D1}$ and $C_{D2}$.

Since the differential operation circuits 201 to 204 have the same circuit configuration, only the configuration of the differential operation circuit 201 will be explained. The differential operation circuit 201 is provided with charge amplifiers 210a and 210b, and a differential amplifier 220. The charge amplifier 210a converts the capacity of the capacity $C_{A1}$ into a voltage $V_{A1}$, and outputs it. The charge amplifier 210a is provided with an operational amplifier $OPA_{A1}$, a resistor 211a, and a capacitor 212a.

An alternating-current power supply 230 is connected to the movable electrode 31A of the seesaw portion 30A through metal of the bonding portion 22, and the second silicon layer 13, and the fixed electrode 51A is connected to an inverting input terminal of the operational amplifier $OPA_{A1}$. Namely, one end of the capacity $C_{A1}$ between the movable electrode 31A of the seesaw portion 30A and the fixed electrode 51A is connected to the alternating-current power supply 230, and the other end thereof is connected to the inverting input terminal of the operational amplifier $OPA_{A1}$. A non-inverting input terminal (+) of the operational amplifier $OPA_{A1}$ is connected to a GND. The resistor 211a and the capacitor 212a are connected in parallel between the inverting input terminal and an output terminal of the operational amplifier $OPA_{A1}$.

Given that an input voltage of the operational amplifier $OPA_{A1}$ is $V_0$, and a capacity of the capacitor 212a is $C_f$, an output voltage $V_{A1}$ of the operational amplifier $OPA_{A1}$ is obtained by the following (Expression 7). Namely, the voltage $V_{A1}$ according to the capacity of the capacity $C_{A1}$ is output.

$$V_{A1} = -\frac{C_{A1}}{C_f} \cdot V_0 \quad \text{(Expression 7)}$$

The charge amplifier 210b converts the capacity of the capacity $C_{A2}$ into a voltage $V_{A2}$, and outputs it. The charge amplifier 210b is provided with an operational amplifier $OPA_{A2}$, a resistor 211b, and a capacitor 212b.

The alternating-current power supply 230 is connected to the movable electrode 31A of the seesaw portion 30A through the metal of the bonding portion 22, and the second silicon layer 13, and the fixed electrode 52A is connected to an inverting input terminal of the operational amplifier $OPA_{A2}$. Namely, one end of the capacity $C_{A2}$ between the movable electrode 31A of the seesaw portion 30A and the fixed electrode 52A is connected to the alternating-current power supply 230, and the other end thereof is connected to the inverting input terminal of the operational amplifier $OPA_{A2}$. A non-inverting input terminal (+) of the operational amplifier $OPA_{A2}$ is connected to the GND. The resistor 211b and the capacitor 212b are connected in parallel between the inverting input terminal and an output terminal of the operational amplifier $OPA_{A2}$.

The differential amplifier 220 outputs the differential voltage $V_A$ of the voltages $V_{A1}$ and $V_{A2}$ output from the charge amplifiers 210a and 210b. The differential amplifier 220 is provided with an operational amplifier 221, and resistors 222 to 225.

The resistor 222 is connected between the output terminal of the operational amplifier $OPA_{A1}$ and an inverting input terminal of the operational amplifier 221. The resistor 223 is connected between the output terminal of the operational amplifier $OPA_{A2}$ and a non-inverting input terminal of the operational amplifier 221. Furthermore, the non-inverting input terminal of the operational amplifier 221 is connected to the GND through the resistor 225. The resistor 224 is connected between the inverting input terminal and an output terminal of the operational amplifier 221.

The output voltage $V_A$ of the operational amplifier 221 is obtained by the following (Expression 8). Namely, according to a ratio of resistors R1 and R2, a differential voltage obtained by deducting the voltage $V_{A2}$ from the voltage $V_{A1}$ is output.

$$V_A = -\frac{R_2}{R_1} \cdot \underbrace{(V_{A1} - V_{A2})}_{\text{differential}} \quad \text{(Expression 8)}$$

The matrix operation circuit 300 includes a logic circuit and the like, and performs matrix operation using differential voltages $V_A$ to $V_D$ that the differential operation circuits 201 to 204 have generated. The matrix operation circuit 300 performs operation of the following (Expression 9). Namely, the differential voltages $V_A$ to $V_D$ are multiplied by a transformation matrix of (Expression 9), and Fx, Fy, and Fz are calculated.

$$\begin{pmatrix} Fx \\ Fy \\ Fz \\ 0 \end{pmatrix} = \frac{1}{4} \cdot \underbrace{\begin{pmatrix} 2 & 0 & -2 & 0 \\ 0 & 2 & 0 & -2 \\ 1 & 1 & 1 & 1 \\ 0 & 0 & 0 & 0 \end{pmatrix}}_{\text{transformation matrix}} \cdot \begin{pmatrix} V_A \\ V_B \\ V_C \\ V_D \end{pmatrix} \quad \text{(Expression 9)}$$

Figure 23:
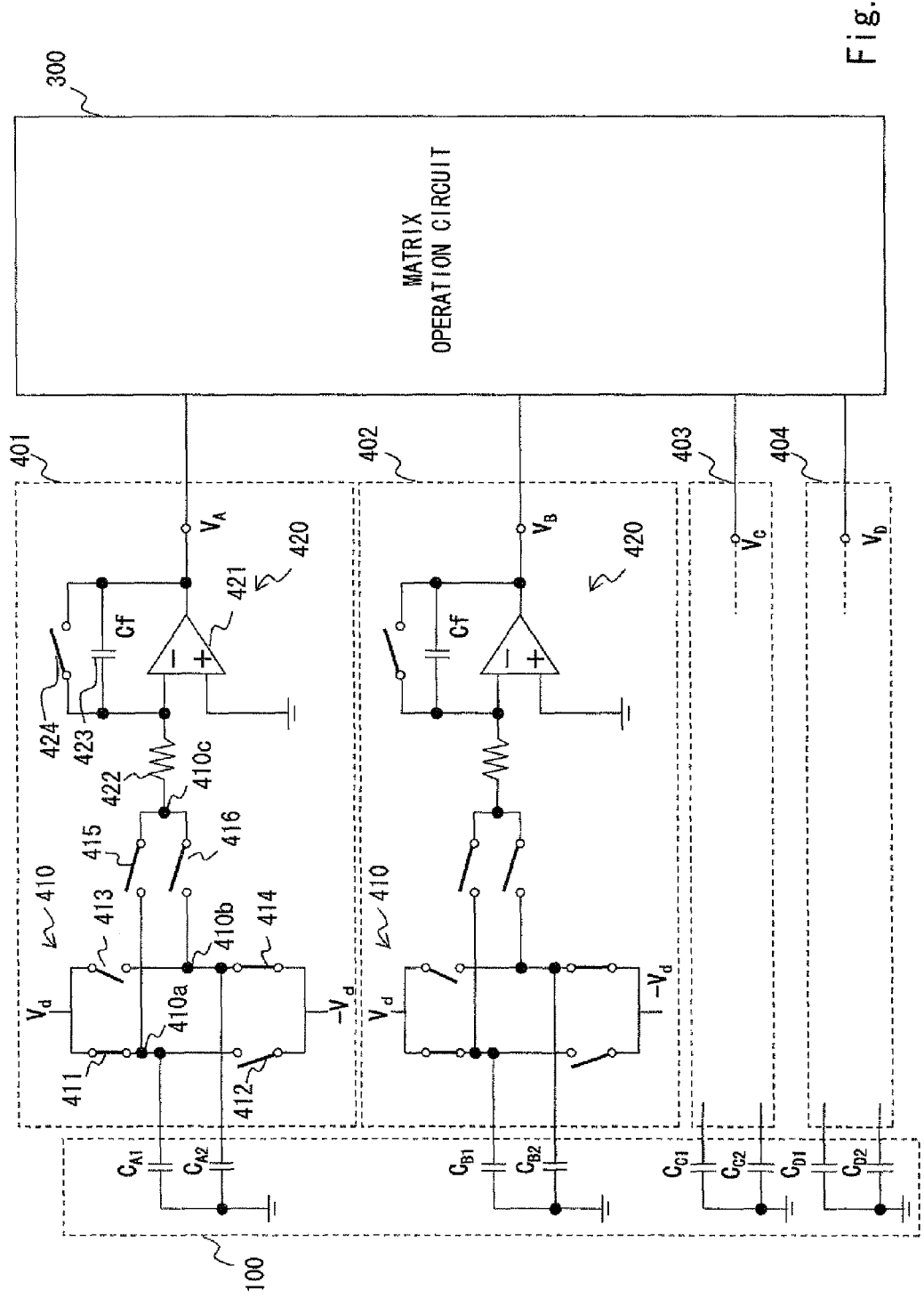
FIG. 23 is a circuit diagram showing a circuit configuration of a detection circuit according to an embodiment 12.
Figure 24A:
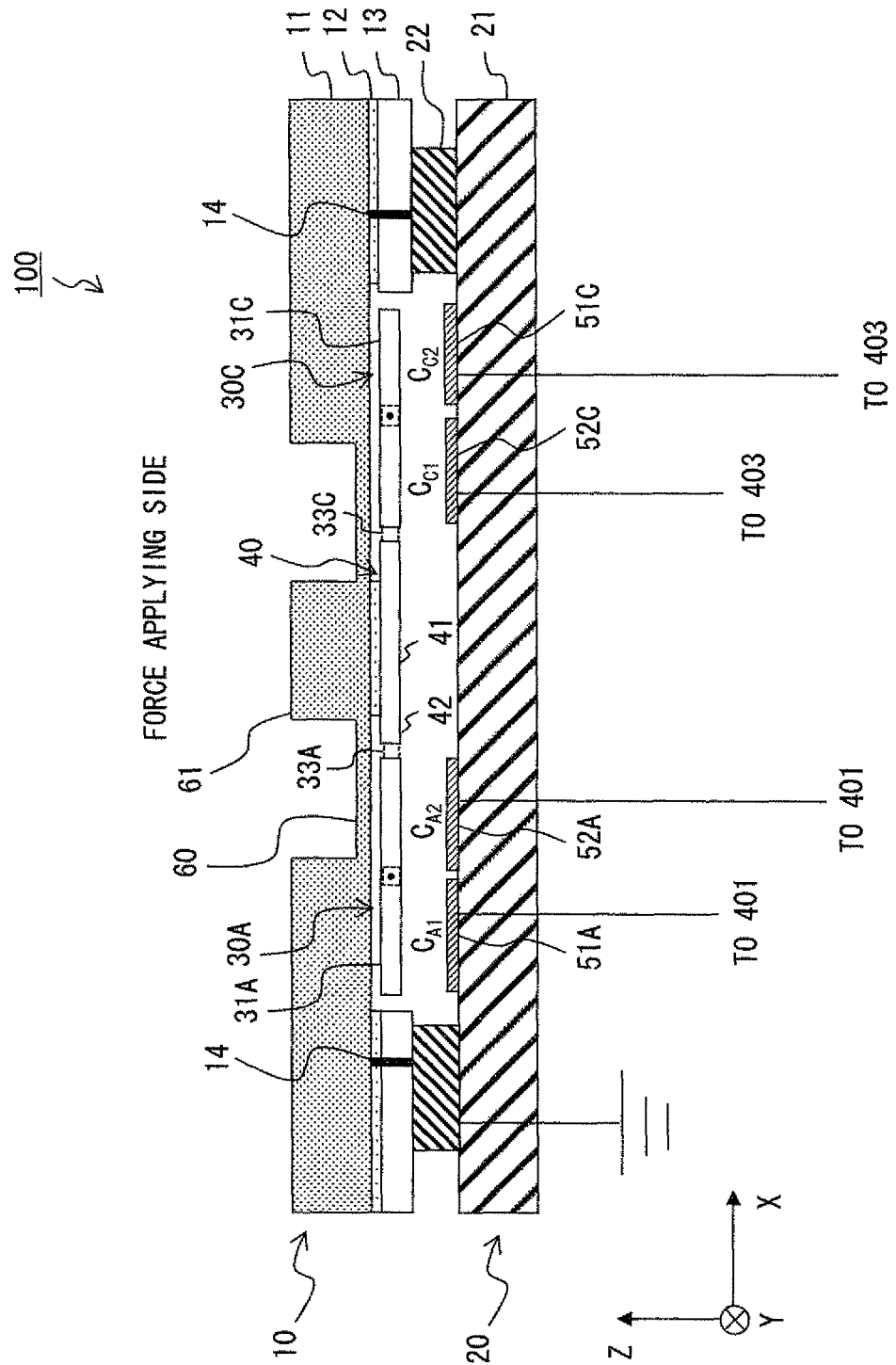
FIG. 24A is a schematic cross-sectional side view of the force sensor according to an embodiment 12 showing a relation of connection between the force sensor and the detection circuit.
Figure 24B:
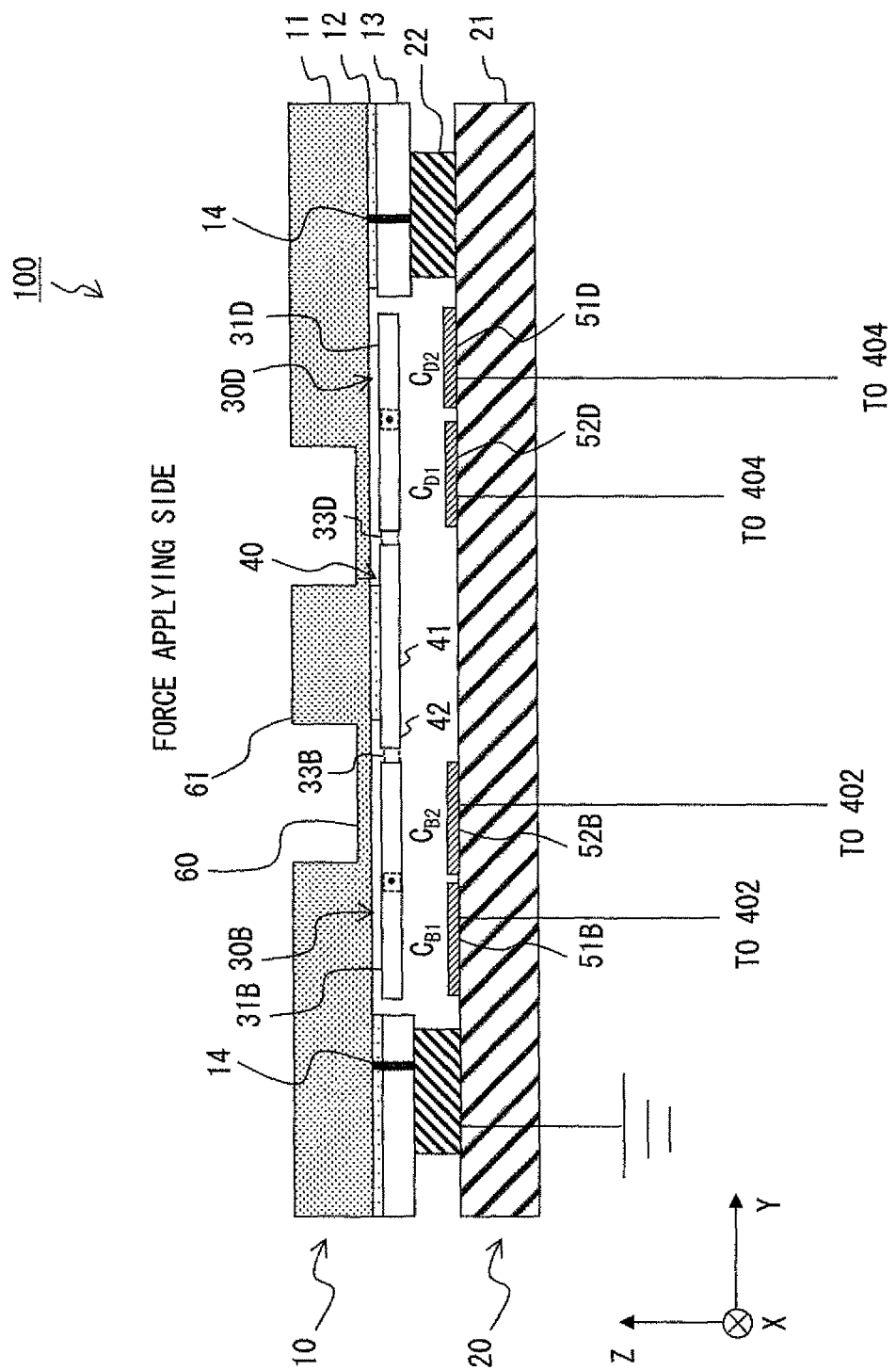
FIG. 24B is a schematic cross-sectional side view of the force sensor according to an embodiment 12 showing a relation of connection between the force sensor and the detection circuit.

FIGS. 23, 24A, and 24B are one examples of connection of a force detection circuit and a force sensor, and are the example employing a switched capacitor scheme. The force detection circuit is connected to the force sensor 100 of the embodiment 1, and is provided with differential operation circuits 401 to 404, and the matrix operation circuit 300. It can be also said that a force sensor system is provided with the force sensor 100, the differential operation circuits 401 to 404, and the matrix operation circuit 300. This example is adapted for an IC since a detection circuit can be configured with a digital signal processing circuit, and is suitable for a case of being incorporated in an LSI of the sealing substrate 21.

The differential operation circuits 401 to 404 are provided for each seesaw portion 30 (fixed electrode pair 50). The differential operation circuit 401 is connected to the capacities $C_{A1}$ and $C_{A2}$, and outputs the differential voltage $V_A$ indicating the capacity difference between the capacities $C_{A1}$ and $C_{A2}$. The differential operation circuit 402 is connected to the capacities $C_{B1}$ and $C_{B2}$, and outputs the differential voltage $V_B$ indicating the capacity difference between the capacities $C_{B1}$ and $C_{B2}$. The differential operation circuit 403 is connected to the capacities $C_{C1}$ and $C_{C2}$, and outputs the differential voltage $V_C$ indicating the capacity difference between the capacities $C_{C1}$ and $C_{C2}$. The differential operation circuit 404 is connected to the capacities $C_{D1}$ and $C_{D2}$, and outputs the differential voltage $V_D$ indicating the capacity difference between the capacities $C_{D1}$ and $C_{D2}$.

Since the differential operation circuits 401 to 404 have the same circuit configuration, only the configuration of the differential operation circuit 401 will be explained. The differential operation circuit 401 is provided with a switching circuit 410 and a charge amplifier 420. The switching circuit 410 switches charge/discharge of the capacities $C_{A1}$ and $C_{A2}$, and outputs the capacity difference between the capacities $C_{A1}$ and $C_{A2}$.

The switching circuit 410 is provided with switches 411 to 416. The switches 411 and 412 are connected in series between a power supply Vd and a power supply −Vd, and the switches 413 and 414 are also connected in series between the power supply Vd and the power supply −Vd. A GND is connected to the movable electrode 31A of the seesaw portion 30A through metal of the bonding portion 22, and the second silicon layer 13, and the fixed electrode 51A is connected to a node 410a between the switches 411 and 412. Namely, one of the capacity $C_{A1}$ between the movable electrode 31 of the seesaw portion 30A and the fixed electrode 51A is connected to the GND, and the other end thereof is connected to the node 410a.

The GND is connected to the movable electrode 31A of the seesaw portion 30A through metal of the bonding portion 22, and the second silicon layer 13, and the fixed electrode 52A is connected to a node 410b between the switches 413 and 414. Namely, one of the capacity $C_{A2}$ between the movable electrode 31 of the seesaw portion 30A and the fixed electrode 51B is connected to the GND, and the other end thereof is connected to the node 410b. Since the first silicon layer 11 and the second silicon layer 13 have the same potential, i.e., serve as the GND, the force sensor 100 is not easily affected by disturbance from outside. For this reason, the force sensor of the embodiment can be configured as the sensor with small noise. The switch 415 is connected between the node 410a and a node 410c, and the switch 416 is connected between the node 410b and the node 410c.

For example, the switch 411 is turned on, the switch 412 is turned off, and the power supply Vd is applied to the capacity $C_{A1}$ to be charged. The switch 413 is turned off, the switch 414 is turned on, and the power supply −Vd is applied to the capacity $C_{A2}$ to be charged. When the switches 415 and 416 are turned on in a state where the capacities $C_{A1}$ and $C_{A2}$ have been charged, a charge corresponding to a capacity obtained by deducting the capacity $C_{A2}$ from the capacity $C_{A1}$ is output to the node 410c.

The charge amplifier 420 inputs a charge according to a capacity difference between the capacities $C_{A1}$ and $C_{A2}$ that the switching circuit 410 has generated, and outputs the differential voltage $V_A$. The charge amplifier 420 is provided with an operational amplifier 421, a resistor 422, a capacitor 423, and a switch 424. The resistor 422 is connected to the node 410c and an inverting input terminal of the operational amplifier 421. The capacitor 423 and the switch 424 are connected between the inverting input terminal and an output terminal of the operational amplifier 421. A non-inverting input terminal of the operational amplifier 421 is connected to a GND.

The matrix operation circuit 300, similarly to FIG. 21, performs matrix operation by (Expression 9) using the differential voltages $V_A$ to $V_D$ that the differential operation circuits 401 to 404 have generated, and calculates a force in each direction.

As described above, in the embodiment 1 and the other embodiments, the detection circuit as in the embodiment is used, thereby matrix operation is performed based on a differential detection result of the force sensor, and a force can be accurately detected.

It is to be noted that the present invention is not limited to the above-described embodiments, and that appropriate change can be made without departing from the spirit of the invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dynamic quantity MEMS sensor comprising:
   a force receiving portion;
   a first movable portion that rotates in a first rotational direction around a first rotational axis according to dynamic quantity in a first direction that the force receiving portion receives, and rotates in the first rotational direction around the first rotational axis according to dynamic quantity in a second direction different from the first direction that the force receiving portion receives;
   a second movable portion that rotates in a second rotational direction around a second rotational axis according to the dynamic quantity in the first direction that the force receiving portion receives, and rotates in an opposite direction to the second rotational direction around the second rotational axis according to the dynamic quantity in the second direction that the force receiving portion receives,
   a first coupling portion that couples the force receiving portion and the first movable portion;
   a second coupling portion that couples the force receiving portion and the second movable portion; and
   a support portion that supports the first movable portion and the second movable portion rotatably around the first rotational axis and the second rotational axis,
   wherein the first coupling portion and the second coupling portion have a flexible and twistable beam shape, and
   at least the dynamic quantity in the first direction and the dynamic quantity in the second direction can be detected.

2. The dynamic quantity MEMS sensor according to claim 1, wherein the force receiving portion is arranged between the first movable portion and the second movable portion.

3. The dynamic quantity MEMS sensor according to claim 1, wherein the force receiving portion is arranged so as to surround the first movable portion and the second movable portion.

4. The dynamic quantity MEMS sensor comprising:
   a force receiving portion;
   a first movable portion that rotates in a first rotational direction around a first rotational axis according to dynamic quantity in a first direction that the force receiving portion receives, and rotates in the first rotational direction around the first rotational axis according to dynamic quantity in a second direction different from the first direction that the force receiving portion receives;

a second movable portion that rotates in a second rotational direction around a second rotational axis according to the dynamic quantity in the first direction that the force receiving portion receives, and rotates in an opposite direction to the second rotational direction around the second rotational axis according to the dynamic quantity in the second direction that the force receiving portion receives, a first coupling portion that couples the force receiving portion and the first movable portion;

a second coupling portion that couples the force receiving portion and the second movable portion; and a support portion that supports the first movable portion and the second movable portion rotatably around the first rotational axis and the second rotational axis, wherein the first coupling portion extends in a direction that intersects with a direction along the first rotational axis, the second coupling portion extends in a direction that intersects with a direction along the second rotational axis, and at least the dynamic quantity in the first direction and the dynamic quantity in the second direction can be detected.

5. The dynamic quantity MEMS sensor comprising:

a force receiving portion;

a first movable portion that rotates in a first rotational direction around a first rotational axis according to dynamic quantity in a first direction that the force receiving portion receives, and rotates in the first rotational direction around the first rotational axis according to dynamic quantity in a second direction different from the first direction that the force receiving portion receives;

a second movable portion that rotates in a second rotational direction around a second rotational axis according to the dynamic quantity in the first direction that the force receiving portion receives, and rotates in an opposite direction to the second rotational direction around the second rotational axis according to the dynamic quantity in the second direction that the force receiving portion receives, a first coupling portion that couples the force receiving portion and the first movable portion;

a second coupling portion that couples the force receiving portion and the second movable portion; and a support portion that supports the first movable portion and the second movable portion rotatably around the first rotational axis and the second rotational axis, wherein the first movable portion has a first concave portion that hollows from one end toward the first rotational axis, and the first coupling portion is coupled to a hollow of the first concave portion, the second movable portion has a second concave portion that hollows from one end toward the second rotational axis, and the second coupling portion is coupled to a hollow of the second concave portion, and at least the dynamic quantity in the first direction and the dynamic quantity in the second direction can be detected.

6. The dynamic quantity MEMS sensor comprising:

a force receiving portion;

a first movable portion that rotates in a first rotational direction around a first rotational axis according to dynamic quantity in a first direction that the force receiving portion receives, and rotates in the first rotational direction around the first rotational axis according to dynamic quantity in a second direction different from the first direction that the force receiving portion receives;

a second movable portion that rotates in a second rotational direction around a second rotational axis according to the dynamic quantity in the first direction that the force receiving portion receives, and rotates in an opposite direction to the second rotational direction around the second rotational axis according to the dynamic quantity in the second direction that the force receiving portion receives, a first coupling portion that couples the force receiving portion and the first movable portion;

a second coupling portion that couples the force receiving portion and the second movable portion; and a support portion that supports the first movable portion and the second movable portion rotatably around the first rotational axis and the second rotational axis, wherein the first coupling portion and the second coupling portion are formed from a semiconductor material, and at least the dynamic quantity in the first direction and the dynamic quantity in the second direction can be detected.

7. The dynamic quantity MEMS sensor according to claim 1, wherein the support portion is narrow in width, thick in thickness, and short in length so that the first movable portion and the second movable portion can rotate, and so that the first movable portion and the second movable portion cannot be displaced in thickness directions of the first movable portion and the second movable portion.

8. The dynamic quantity MEMS sensor according to claim 1, wherein rotational rigidity of the first coupling portion and the second coupling portion is lower than that of the support portion.

9. The dynamic quantity MEMS sensor according to claim 1, comprising:

a support substrate that supports the first movable portion and the second movable portion; and a flexible diaphragm that is formed at the support substrate, and is connected to the force receiving portion.

10. The dynamic quantity MEMS sensor according to claim 1, comprising:

a support substrate that supports the first movable portion and the second movable portion through the support portion; and a flexible diaphragm that is formed at the support substrate, and is connected to the force receiving portion, wherein rigidity in a thickness direction of the diaphragm is higher than that in thickness directions of the first coupling portion, the second coupling portion, and the support portion.

11. The dynamic quantity MEMS sensor according to claim 1, comprising a projecting portion dynamically connected to the force receiving portion.

12. The dynamic quantity MEMS sensor according to claim 1, comprising a mass body that is dynamically connected to the force receiving portion, and can be displaced according to an acceleration.

13. The dynamic quantity MEMS sensor according to claim 1, comprising a sealing substrate that seals the force receiving portion, the first movable portion, and the second movable portion.

14. The dynamic quantity MEMS sensor according to claim 1, comprising:
- a support substrate that supports the first movable portion and the second movable portion; and
- a sealing substrate that is bonded to the support substrate, and seals the force receiving portion, the first movable portion, and the second movable portion.

15. The dynamic quantity MEMS sensor according to claim 13, wherein the sealing substrate includes a semiconductor integrated circuit substrate.

16. The dynamic quantity MEMS sensor according to claim 13, wherein
- the force receiving portion includes a contact portion that comes into contact with a side of the sealing substrate prior to the first movable portion and the second movable portion when the force receiving portion is displaced,
- the force receiving portion includes a force receiving plate that receives dynamic quantity in the first direction and dynamic quantity in the second direction, and
- the contact portion is formed so as to expand an end of the force receiving plate.

17. The dynamic quantity MEMS sensor according to claim 16, wherein a contact portion on the side of the sealing substrate with which the contact portion comes into contact is an electrode having the same potential as the force receiving portion, or an insulator.

18. The dynamic quantity MEMS sensor according to claim 1, wherein
- the first movable portion has a first movable electrode and a second movable electrode sandwiching the first rotational axis therebetween, and
- the second movable portion has a third movable electrode and a fourth movable electrode sandwiching the second rotational axis therebetween, the dynamic quantity sensor comprising:
- a first fixed electrode that is included in the first movable electrode and a first electric capacity;
- a second fixed electrode that is included in the second movable electrode and a second electric capacity;
- a third fixed electrode that is included in the third movable electrode and a third electric capacity; and
- a fourth fixed electrode that is included in the fourth movable electrode and a fourth electric capacity.

19. The dynamic quantity MEMS sensor according to claim 18, wherein in a state where the force receiving portion has not received dynamic quantity, the first electric capacity and the second electric capacity are substantially equal to each other, and the third electric capacity and the fourth electric capacity are substantially equal to each other.

20. A dynamic quantity MEMS sensor system comprising:
- a dynamic quantity MEMS sensor according to claim 18; and
- a differential operation circuit that calculates a difference between the first electric capacity and the second electric capacity, and a difference between the third electric capacity and the fourth electric capacity.

21. The dynamic quantity MEMS sensor system according to claim 20, comprising a matrix operation circuit that multiplies the calculated difference between the electric capacities by a transformation matrix, and calculates dynamic quantity in the first direction and the second direction.

22. The dynamic quantity MEMS sensor according to claim 1, comprising:
- a first measuring unit that measures a first position of one side from the first rotational axis in the first movable portion;
- a second measuring unit that measures a second position of the other side from the first rotational axis in the first movable portion;
- a third measuring unit that measures a third position of one side from the second rotational axis in the second movable portion; and
- a fourth measuring unit that measures a fourth position of the other side from the second rotational axis in the second movable portion.

23. The dynamic quantity MEMS sensor according to claim 22, wherein the first measuring unit, the second measuring unit, the third measuring unit, and the fourth measuring unit measure distances to the first movable portion and the second movable portion by an optical scheme.

24. A dynamic quantity MEMS sensor system comprising:
- a dynamic quantity MEMS sensor according to claim 22;
- a differential operation circuit that calculates a difference between the first position and the second position, and a difference between the third position and the fourth position; and
- a matrix operation circuit that multiplies the calculated difference between the positions by a transformation matrix, and calculates dynamic quantity in the first direction and the second direction.

* * * * *